United States Patent
Hibino et al.

[11] Patent Number: 5,959,665
[45] Date of Patent: Sep. 28, 1999

[54] FILM SCANNER COMPRISING A DISPLAY INFORMATION STORAGE MEANS WHICH STORES DISPLAY INFORMATION INCLUDING CHARACTER INFORMATION FOR NARRATION

[75] Inventors: Hideo Hibino, Kawasaki; Kazuyuki Kazami, Tokyo; Norikazu Yokonuma; Hisashi Okutsu, both of Yokohama, all of Japan

[73] Assignee: Nikon Corporation, Tokyo, Japan

[21] Appl. No.: 08/947,861

[22] Filed: Oct. 9, 1997

Related U.S. Application Data

[63] Continuation of application No. 08/675,669, Jul. 3, 1996, abandoned.

[30] Foreign Application Priority Data

Jul. 6, 1995 [JP] Japan ..................................... 7-171115
Sep. 6, 1995 [JP] Japan ..................................... 7-229436

[51] Int. Cl.[6] .............................. H04N 5/253; H04N 9/47
[52] U.S. Cl. ........................................................... 348/96
[58] Field of Search .............................. 348/96, 97, 98; 355/40; 360/3; 358/408, 474; 379/100.02; 396/639

[56] References Cited

U.S. PATENT DOCUMENTS

| | | |
|---|---|---|
| 4,482,924 | 11/1984 | Brownstein . |
| 4,485,406 | 11/1984 | Brownstein . |
| 4,506,300 | 3/1985 | Fearnside . |
| 4,974,096 | 11/1990 | Wash ........................................ 358/302 |
| 4,987,439 | 1/1991 | Cloutier .................................... 355/40 |
| 5,018,017 | 5/1991 | Sasaki et al. ........................... 358/209 |
| 5,025,283 | 6/1991 | Robinson ................................. 355/40 |
| 5,027,140 | 6/1991 | Cloutier .................................... 354/76 |
| 5,289,227 | 2/1994 | Kinjo ........................................ 354/402 |
| 5,384,664 | 1/1995 | Koeler ........................................ 360/3 |
| 5,448,377 | 9/1995 | Kinoshita et al. ...................... 358/452 |
| 5,508,783 | 4/1996 | Iwagaki et al. .......................... 355/40 |
| 5,541,644 | 7/1996 | Nanba ....................................... 348/96 |

FOREIGN PATENT DOCUMENTS

A-5-75922  3/1993  Japan .

*Primary Examiner*—Douglas W. Olms
*Assistant Examiner*—David R Vincent
*Attorney, Agent, or Firm*—Oliff & Berridge, PLC

[57] ABSTRACT

A film image signal generation apparatus according to the present invention, includes: a film displacement device which displaces a developed film, which is first in a film cartridge, to an image area; an image signal conversion device which converts an image of a film frame, which is opposed to the image area, into a first image signal; a control information storage circuit which stores control information which specifies at least an order for film frame display; a display information storage circuit which stores display information related to the film frame display as a second image signal; and a control circuit which controls the film displacement device, the image signal conversion device, and the display information storage circuit so as selectively to output either the first image signal or the second image signal according to the control information stored in the control information storage circuit.

27 Claims, 53 Drawing Sheets

Fig. 6 (DISPLACEMENT MODE B, D)

(STEP DISPLACEMENT MODE)

FIG. 35
PRIOR ART
FIG. 35(a)     FIG. 35(b)     FIG. 35(c)
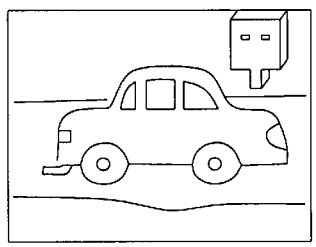 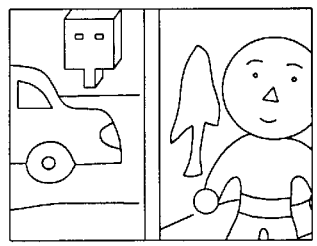 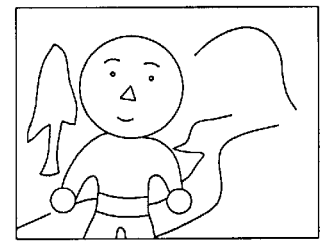
FIG. 36
SCREEN DISPLAY A
FIG. 36(a)     FIG. 36(b)     FIG. 36(c)
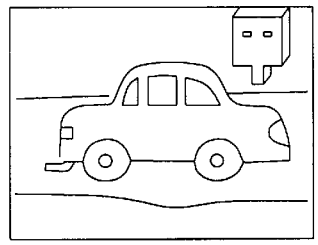 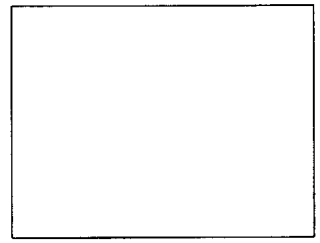 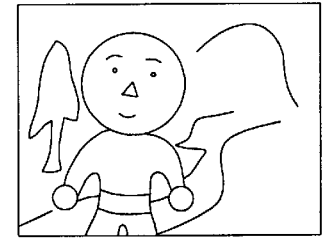

FIG. 37
SCREEN DISPLAY B
FIG. 37(a)     FIG. 37(b)     FIG. 37(c)
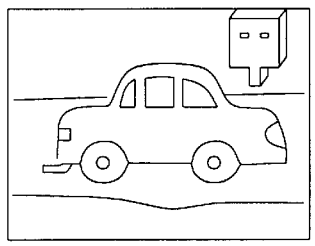 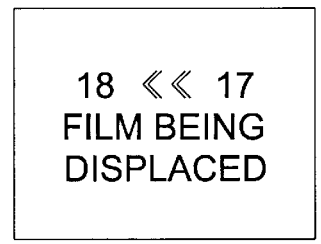 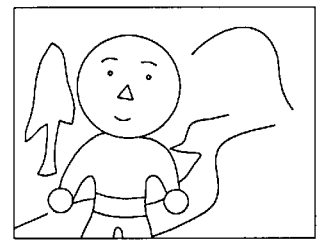
FIG. 38
SCREEN DISPLAY C
FIG. 38(a)     FIG. 38(b)     FIG. 38(c)
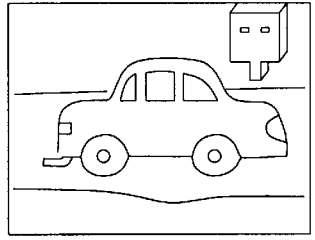 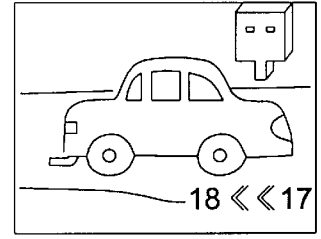 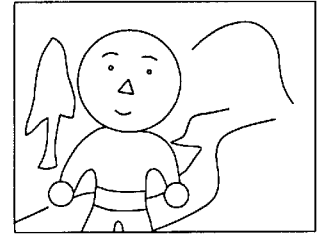

FIG. 39
SCREEN DISPLAY D
FIG. 39(a)     FIG. 39(b)     FIG. 39(c)
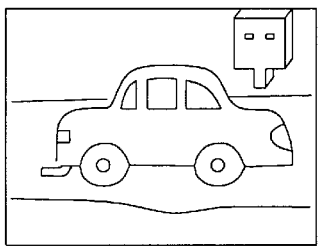 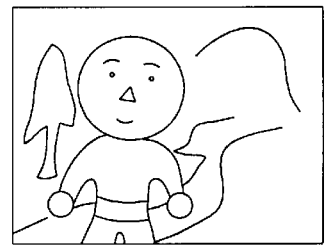
| 1 | 2 | 3 | 4 | 5 | 6 |
|---|---|---|---|---|---|
| 7 | 8 | 9 | 10 | 11 | 12 |
| 13 | 14 | 15 | 16 | 17 | 18 |
| 19 | 20 | 21 | 22 | 23 | 24 |
| 25 | 26 | 27 | 28 | 29 | 30 |
| 31 | 32 | 33 | 34 | 35 | 36 |

SCREEN DISPLAY E

FIG. 41
SCREEN DISPLAY F
FIG. 41(a)          FIG. 41(b)          FIG. 41(c)
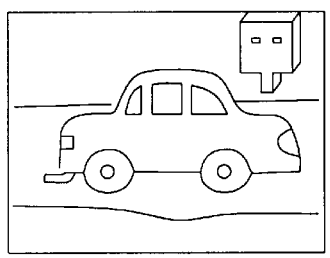
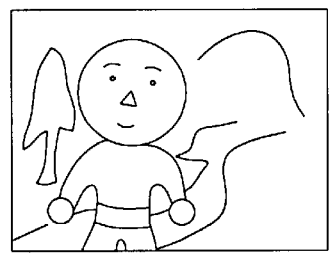

FIG. 42
SCREEN DISPLAY G
FIG. 42(a)  FIG. 42(b)  FIG. 42(c)
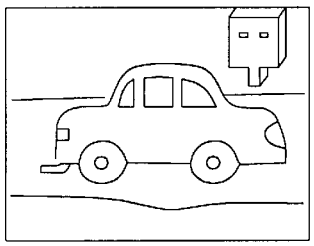
```
C ABC ABC ABC ABC ABC ABC
BC ABC ABC ABC ABC ABC AB
 ABC ABC ABC ABC ABC ABC
BC ABC ABC ABC ABC ABC AB
ABC              ABC
BC A  A B C D E  ABC
ABC ABC ABC ABC ABC ABC A
C ABC ABC ABC ABC ABC ABC
ABC ABC ABC ABC ABC ABC A
C ABC ABC ABC ABC ABC ABC
```
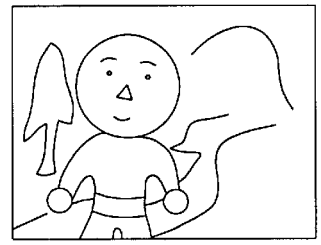

FIG. 43
SCREEN DISPLAY I
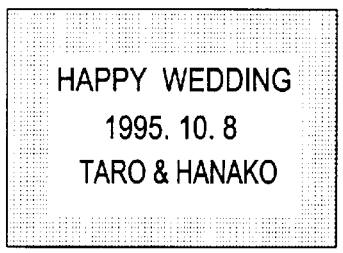
FIG. 43(a)
FIG. 43(b)
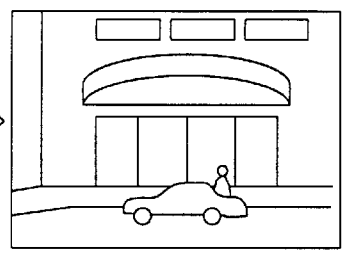
FIG. 43(c)
FIG. 43(d)
FIG. 43(e)
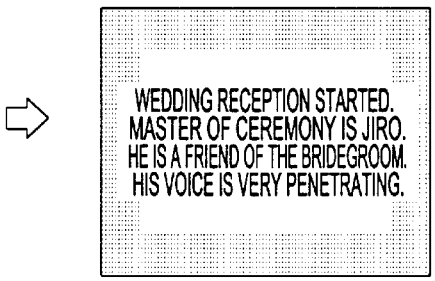
FIG. 43(f)
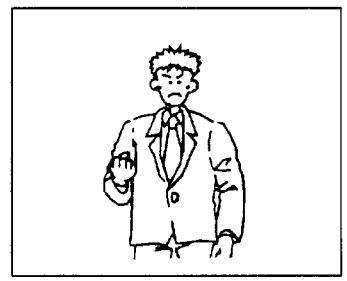
FIG. 43(g)
FIG. 43(h)

FIG. 44(a)

FRAMES FOR DATA ALTERATION

No.  1, 3, 8, 11,
     17, 26

SCREEN DISPLAY J

FIG. 44(b)

| 1 | 2 | 3 | 4 | 5 | 6 |
|---|---|---|---|---|---|
| 7 | 8 | 9 | 10 | 11 | 12 |
| 13 | 14 | 15 | 16 | 17 | 18 |
| 19 | 20 | 21 | 22 | 23 | 24 |
| 25 | 26 | 27 | 28 | 29 | 30 |
| 31 | 32 | 33 | 34 | 35 | 36 |

SCREEN DISPLAY K

FIG. 44(c)

SCREEN DISPLAY L

FIG. 44(d)

FRAMES FOR DATA ALTERATION

| BEFORE CHANGE | | AFTER CHANGE |
|---|---|---|
| 1 : PANORAMA PRINT | → | L PRINT |
| | | 2 EXTRA PRINTS |
| | | 3 EXTRA PRINTS |
| 3 : | | 96.1.1. |
| 8 : NO DATE | | 1 EXTRA PRINT |
| 11 : | | 2 EXTRA PRINTS |
| 17 : | | ADD TEXT ("ATHLETIC MEETING") |
| 26 : | | 3 EXTRA PRINTS |

SCREEN DISPLAY M

FIG. 45
SCREEN DISPLAY N
FIG. 45(a)
```
FRAME FOR DATA ALTERATION
 BEFORE CHANGE   AFTER CHANGE
1: PANORAMA PRINT    L PRINT
                     2 EXTRA PRINTS
3:                   3 EXTRA PRINTS
8: NO DATE           96.1.1
11:                  1 EXTRA PRINT
17:                  2 EXTRA PRINTS
```
FIG. 45(b)
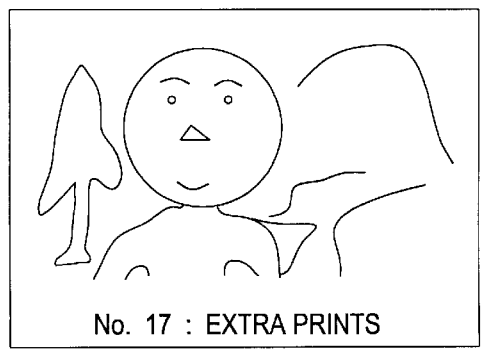
No. 17 : EXTRA PRINTS
```
FRAME FOR DATA ALTERATION
 BEFORE CHANGE   AFTER CHANGE
1: PANORAMA PRINT    L PRINT
                     2 EXTRA PRINTS
3:                   3 EXTRA PRINTS
8: NO DATE           96.1.1
11:                  1 EXTRA PRINT
17:                  2 EXTRA PRINTS
```
FIG. 45(c)

FILM SCANNER COMPRISING A DISPLAY INFORMATION STORAGE MEANS WHICH STORES DISPLAY INFORMATION INCLUDING CHARACTER INFORMATION FOR NARRATION

This is a Continuation of application Ser. No. 08/675,669 filed Jul. 3, 1996 now abandoned.

BACKGROUND OF THE INVENTION

1. Field of the Invention

The present invention relates to a film image signal generation apparatus which outputs images of still photographs such as ones upon a photographic film as an image signal such as a video signal.

2. Description of the Related Art

As apparatuses for converting an image upon a photographic film which has been developed into an image signal such as a video signal or the like and then outputting this signal, there are disclosed (in U.S. Pat. Nos. 4,482,924, 4,485,406, and 4,506,300) apparatuses which output an image on a film as a video signal which has been shot by using a CCD camera. If this output signal is then input into a video monitor, it is possible to view the image on the film upon the screen of the monitor. Further, it is possible to edit the image onto a video tape, or to output it using a video printer or the like.

SUMMARY OF THE INVENTION

The objective of the present invention is to propose a film image signal generation apparatus upon which a story can be composed using images of still photographs, and which can then replay this story which has been thus composed.

In order to attain this object, a film image signal generation apparatus according to the present invention, comprises: a film image signal generation apparatus, comprising: a film displacement device which displaces a developed film, which is first in a film cartridge, to an image area; an image signal conversion device which converts an image of a film frame, which is opposed to the image area, into a first image signal; a control information storage circuit which stores control information which specifies at least an order for film frame display; a display information storage circuit which stores display information related to the film frame display as a second image signal; and a control circuit which controls the film displacement device, the image signal conversion device, and the display information storage circuit so as selectively to output either the first image signal or the second image signal according to the control information stored in the control information storage circuit.

BRIEF DESCRIPTION OF THE DRAWINGS

FIG. 35 is a figure relating to a prior art film image signal generation apparatus, showing a sequence of images which are displayed upon a monitor during film frame forwarding, with (a) illustrating the display of a predecessor film frame, (b) illustrating the display between this predecessor film frame and a successor film frame, and (c) illustrating the display of this successor film frame;

FIG. 36 is a similar figure but relating to the preferred embodiment of the film image signal generation apparatus of the present invention, showing a sequence of images which are displayed in a screen display mode (A) upon a monitor during film frame forwarding, with (a) illustrating the display of a predecessor film frame, (b) illustrating the display between this predecessor film frame and a successor film frame, and (c) illustrating the display of this successor film frame;

FIG. 37 is a similar figure relating to the preferred embodiment of the film image signal generation apparatus of the present invention, showing a sequence of images which are displayed in another screen display mode (B) upon a monitor during film frame forwarding, with (a) illustrating the display of a predecessor film frame, (b) illustrating the display between this predecessor film frame and a successor film frame, and (c) illustrating the display of this successor film frame;

FIG. 38 is a similar figure relating to the preferred embodiment of the film image signal generation apparatus of the present invention, showing a sequence of images which are displayed in another screen display mode (C) upon a monitor during film frame forwarding, with (a) illustrating the display of a predecessor film frame, (b) illustrating the display between this predecessor film frame and a successor film frame, and (c) illustrating the display of this successor film frame;

FIG. 39 is a similar figure relating to the preferred embodiment of the film image signal generation apparatus of the present invention, showing a sequence of images which are displayed in another screen display mode (D) upon a monitor during film frame forwarding, with (a) illustrating the display of a predecessor film frame, (b) illustrating the display between this predecessor film frame and a successor film frame, and (c) illustrating the display of this successor film frame;

FIG. 41 is a similar figure relating to the preferred embodiment of the film image signal generation apparatus of the present invention, showing a sequence of images which are displayed in another screen display mode (F) upon a monitor during film frame forwarding, with (a) illustrating the display of a predecessor film frame, (b) illustrating the display between this predecessor film frame and a successor film frame, and (c) illustrating the display of this successor film frame;

FIG. 42 is a similar figure relating to the preferred embodiment of the film image signal generation apparatus of the present invention, showing a sequence of images which are displayed in another screen display mode (G) upon a monitor during film frame forwarding, with (a) illustrating the display of a predecessor film frame, (b) illustrating the display between this predecessor film frame and a successor film frame, and (c) illustrating the display of this successor film frame;

FIG. 43 is a figure relating to the preferred embodiment of the film image signal generation apparatus of the present invention, showing in order a sequence of images which are displayed in another screen display mode (I) upon a monitor so as to provide a story, with (a) illustrating the display of the title of the story, (b) illustrating a display for narration continuing on from the title display of (a), (c) illustrating the display of a film frame following on from the narration of (b), (d) illustrating another display for narration continuing on from the film frame display of (c), (e) illustrating the display of the next film frame following on from the narration of (d), (f) illustrating another display for narration continuing on from the film frame display of (e), and (g) illustrating the display of the next film frame following on from the narration of (f);

FIG. 44 is a figure relating to the preferred embodiment of the film image signal generation apparatus of the present invention, showing a display on a monitor screen for informing the user for which frames rewriting of the magnetic information is to be performed, with (a) illustrating the case of another screen display mode (J) in which only the frame numbers of the frames for which rewriting of the magnetic information is to be performed are displayed, (b) illustrating the case of another screen display mode (K) in which a matrix showing all the film frame numbers is displayed with the frame numbers of the frames for which rewriting of the magnetic information is to be performed being shown as flashing, (c) illustrating the case of another screen display mode (L) in which a matrix showing film frame numbers and film frame thumbnail illustrations is displayed with the thumbnail illustrations of the frames for which rewriting of the magnetic information is to be performed being shown as flashing, and (d) illustrating the case of another screen display mode (M) in which the frame numbers of the frames for which rewriting of the magnetic information is to be performed and the contents of the magnetic information before and after such rewriting are displayed;

FIG. 45 is a figure relating to the preferred embodiment of the signal generation apparatus of the present invention, showing a display on a monitor screen in another screen display mode (N) for informing the user for which frames rewriting of the magnetic information is to be performed, with (a) illustrating the display which is provided during displacement of the film in order to bring the next film frame for which rewriting of the magnetic information is to be performed (exemplarily film frame No. 17) to oppose the image area, in which the frame numbers of the remaining film frames for which rewriting of the magnetic information remains to be done, only, and the contents of their magnetic information before and after such rewriting, are shown, (b) illustrating the display which is provided just before rewriting of the magnetic information for this film frame No. 17, in which an image of the film frame just before rewriting of its magnetic information and the magnetic information which is to be rewritten are shown as a superimposed display, and (c) illustrating the display which is provided after the display (b) during the subsequent displacement of the film in order to bring the next film frame for which rewriting of the magnetic information is to be performed to oppose the image area, in which the frame numbers of the remaining film frames for which rewriting of the magnetic information remains to be done, only, and the contents of their magnetic information before and after such rewriting, are shown;

DESCRIPTION OF THE PREFERRED EMBODIMENTS

Figure 1:
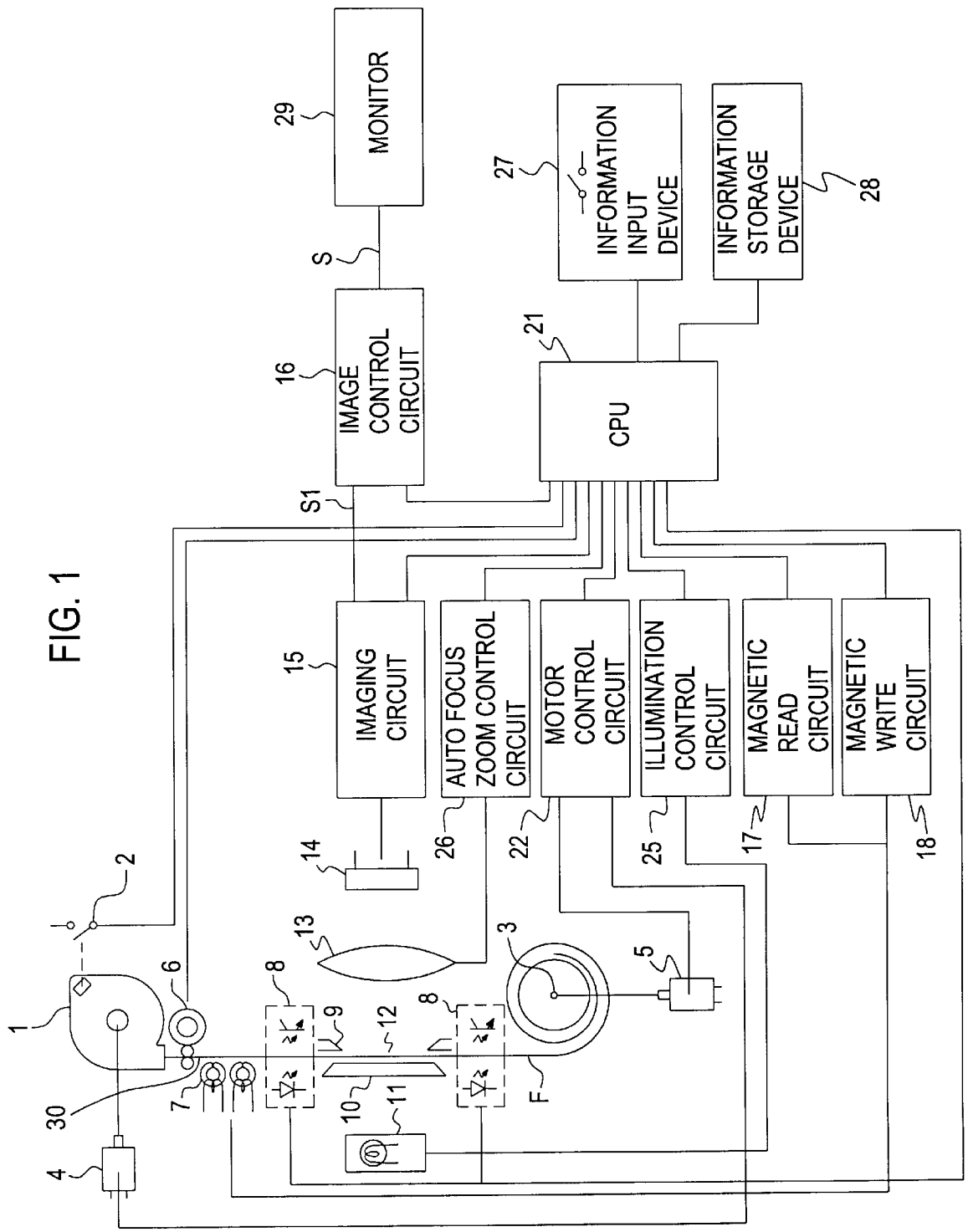
FIG. 1 is a schematic view showing the overall structure of the preferred embodiment of the film image signal generation apparatus of the present invention.

In the following, the preferred embodiment of the film image signal generation apparatus of the present invention will be explained with reference to FIGS. 1 through 45. As shown in FIG. 1, a film F which has been projected from a film cartridge 1 which has been loaded into the apparatus reaches a take up spool 3 and is wound up thereupon. A detection switch 2 which is provided near the film cartridge 1 is driven together with a display mechanism which displays whether or not the film F provided in the film cartridge 1 is a developed one, and thus determines whether or not this film F has been developed. A rewind motor 4 projects the film F from the film cartridge 1 or rewinds it back thereinto by rotationally driving a film cartridge shaft which is not shown in the drawing. A wind on motor 5 winds up the film F as it is thus projected, by rotationally driving a spool shaft, which also is not shown in the drawing, of the take up spool 3. A film encoder 6 which is provided in the vicinity of the film cartridge 1 so as to contact the film F comprises a rotating member which is rotated together with the displacement of the film, and thereby the speed of displacement of the film F, and its amount of displacement, are measured. A magnetic head 7 is fitted so as to be capable of being contacted with the film F, and a magnetic read circuit 17 and a magnetic write circuit 18 are connected to this magnetic head 7, so as to be able to read magnetic information which is recorded in a magnetic recording layer 30 provided upon the film F and also to write the information upon the film F. A pair of photointerruptors 8 are provided for detecting perforations in the film F.

An aperture 9 and a diffusion plate 10 are provided between the above described pair of photointerruptors 8, and the film F which is fed out of the film cartridge 1 is held in a planar state between this aperture 9 and this diffusion plate 10. Further, the diffusion plate 10 converts the light from an illumination light source 11 into white colored light, and this white colored light is regulated by the aperture 9 to an image area 12, and passes through the portion of the film F confronting the image area 12. This transmitted light then passes through a focusing lens 13 and is incident upon a CCD 14, so that an image of the image area 12 on the film F is focused upon this CCD 14. This optical image is converted by the CCD 14 into an output signal, which is then converted by an imaging circuit 15 into a picture signal S1. This picture signal S1 is then further processed by an image control circuit 16, and is output to a monitor 29 as a picture signal S from this film image signal generation apparatus. The monitor 29 displays an image which corresponds to the picture signal S. A home TV set, a CRT monitor, a liquid crystal display device or the like may be employed as the monitor 29.

The detection switch 2, the film encoder 6, the photointerruptors 8, the imaging circuit 15, and the image control circuit 16 are all connected to a CPU 21. Further, the rewind motor 4 and the wind on motor 5 are connected to this CPU 21 via a motor control circuit 22, the illumination light source 11 is connected to the CPU 21 via an illumination control circuit 25, and the lens 13 is connected to the CPU 21 via an autofocus-zoom control circuit 26.

An information input device 27, which comprises a group of control switches and a group of information input keys, is also connected to the CPU 21. This information input device 27 comprises a switch (or switches; the details are optional and not shown in the figure) for setting a film displacement mode, a switch for setting an image display mode, a thrusting switch for commanding the start of projection of the film F, a single frame rewind switch, a single frame advance switch, an all frames rewind switch, a film cartridge eject switch, and a frame designation switch. Moreover, an information storage device 28 is connected to the CPU 21, and stores magnetic information from the film F, information which has been input via the information input device 27, images taken from the film F, and the like.

This film image signal generation apparatus has the following film displacement modes, of which any one may be selected at will by the operator. In the film displacement mode A, when a film cartridge 1 is loaded, the film F therein is wound on forwards until the last frame thereon confronts the image area 12, and the image of the last film frame and the magnetic information corresponding thereto are combined by the image control circuit 16 and are output as the picture signal S. Further, during this winding on process the magnetic information for all of the film frames is read out, and this information is stored in the information storage device 28. Thereafter, operation of this device proceeds according to the commands issued by the operator.

In the film displacement mode B, when a film cartridge 1 is loaded, the film F therein is wound on forwards until the first frame thereon confronts the image area 12, and the image of the first film frame and the magnetic information corresponding thereto are combined by the image control circuit 16 and are output as the picture signal S. Further, during this winding on process the magnetic information for the first film frame is read out, and this information is stored in the information storage device 28. Thereafter, operation of this device proceeds according to the commands issued by the operator.

In the film displacement mode C, when a film cartridge 1 is loaded, the film F therein is wound on forwards until a specified frame thereon confronts the image area 12, and the image of this specified film frame and the magnetic information corresponding thereto are combined by the image control circuit 16 and are output as the picture signal S. Further, during this winding on process the magnetic information for this specified film frame is read out, and this information is stored in the information storage device 28. Thereafter, operation of this device proceeds according to the commands issued by the operator.

In the film displacement mode D, when a film cartridge 1 is loaded, then the film F therein is wound on forwards until the first frame thereon confronts the image area 12 and temporarily the winding on operation is interrupted, and then after a predetermined time interval the winding on of the film F is recommenced and the film F is wound on to the next film frame; and this process is repeated in order for each film frame from the first to the last. Thereby, repeatedly from the first film frame to the last, in order, each image upon the film F and the magnetic information corresponding thereto are combined by the image control circuit 16 and are output as the picture signal S for this predetermined time interval. Further, the magnetic information for all of the frames upon the film F is read out during this winding on process, and this information is stored in the information storage device 28.

The film displacement mode E is a story mode, in which a story is composed and is replayed. When the story is being composed, each image upon the film F and the magnetic information corresponding thereto are displayed upon the monitor 29 in order from the first film frame to the last, and the operator inputs narration, display order, and display time for each film frame as it is displayed. This narration and other information is recorded in the information storage device 28. When the story is to be replayed, the film frames and the narration respectively corresponding thereto are displayed upon the monitor 29 for the specified time periods in the specified order.

In the film displacement mode F, a group of film frame is selected based upon the information which is recorded in the magnetic recording layer upon the film F or the film cartridge 1, and then the selected film frames are displayed in order upon the monitor 29.

In a step displacement mode, for a plurality of film frames for which a mutual relationship has been established, the film F is wound on forwards until each frame confronts the image area 12 and temporarily the winding on operation is interrupted, and then after a predetermined time interval the winding on of the film F is recommenced and the film F is wound on; and this process is repeated, so that each image upon the film F and the magnetic information corresponding thereto in order from the first film frame to the last are output as the picture signal S for this predetermined time interval. Further, the magnetic information for all of the frames upon the film F is read out during this winding on process, and this information is stored in the information storage device 28.

And, in a frame designation mode, the film F therein is wound on forwards until a specified frame thereon confronts the image area 12, and the image of this specified film frame and the magnetic information corresponding thereto are combined by the image control circuit 16 and are output as the picture signal S. Further, during this winding on process the magnetic information for this specified film frame is read out, and this information is stored in the information storage device 28.

In the following, the overall operational sequence of this film image signal generation apparatus will be explained with reference to the flow charts shown in FIGS. 2 and 3. In the first step S301 of FIG. 2, the system waits in a loop until a film cartridge 1 is loaded into the apparatus, then proceeding to the next step S302. In this step S302, a cartridge ID which is written upon the film cartridge 1 is read in by a read in sensor which is not shown in the figures, and in the next step S303 this is stored in the information storage device 28. Then in the step S304 a decision is taken as to whether or not the thrusting switch is being pressed or not, and if it is being pressed then the flow of control proceeds to the step S305, while if it is decided that the thrusting switch is not being pressed then the flow of control is transferred to the step S312.

Figure 3:
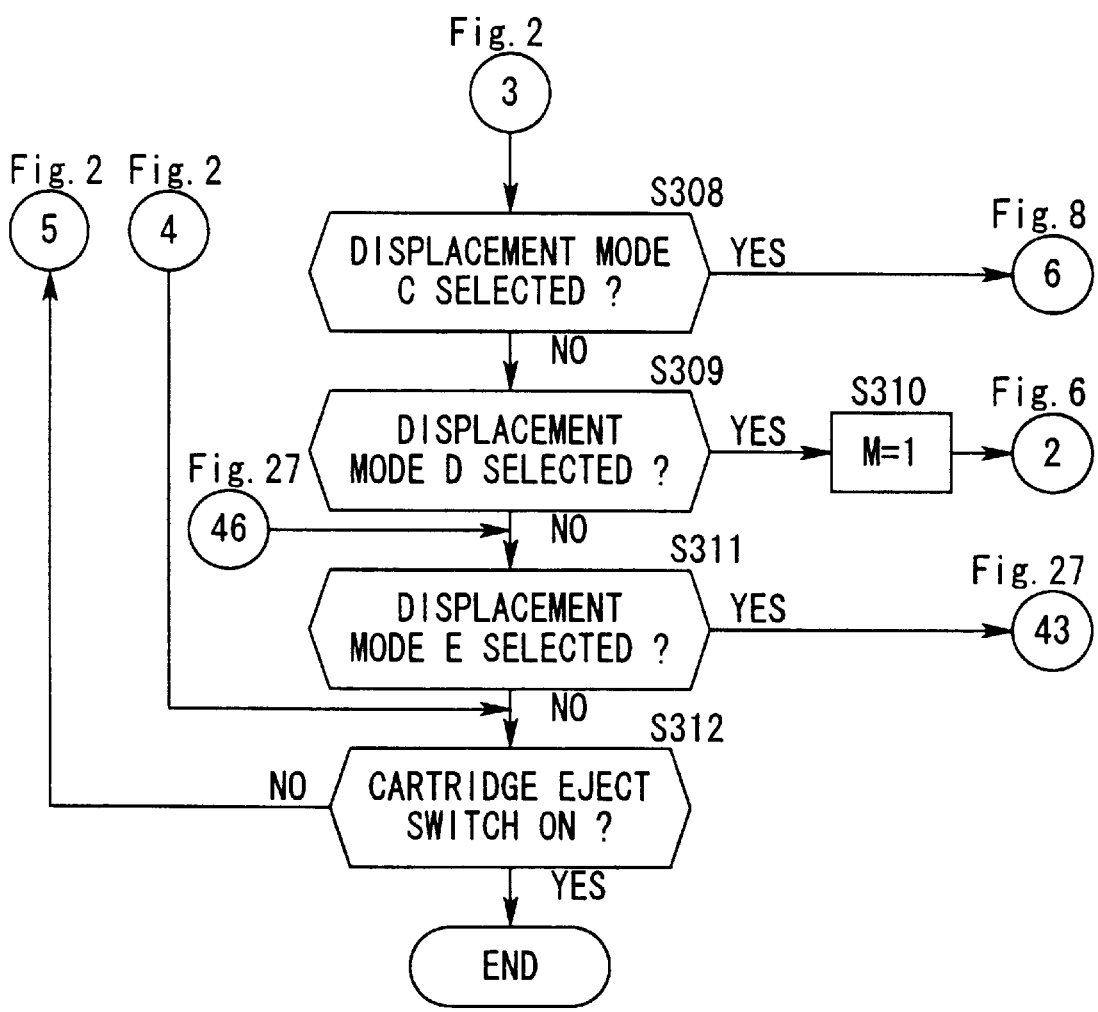
FIG. 3 is another flow chart showing another portion of the operational sequence of this preferred embodiment of the film image signal generation apparatus of the present invention.
Figure 4:
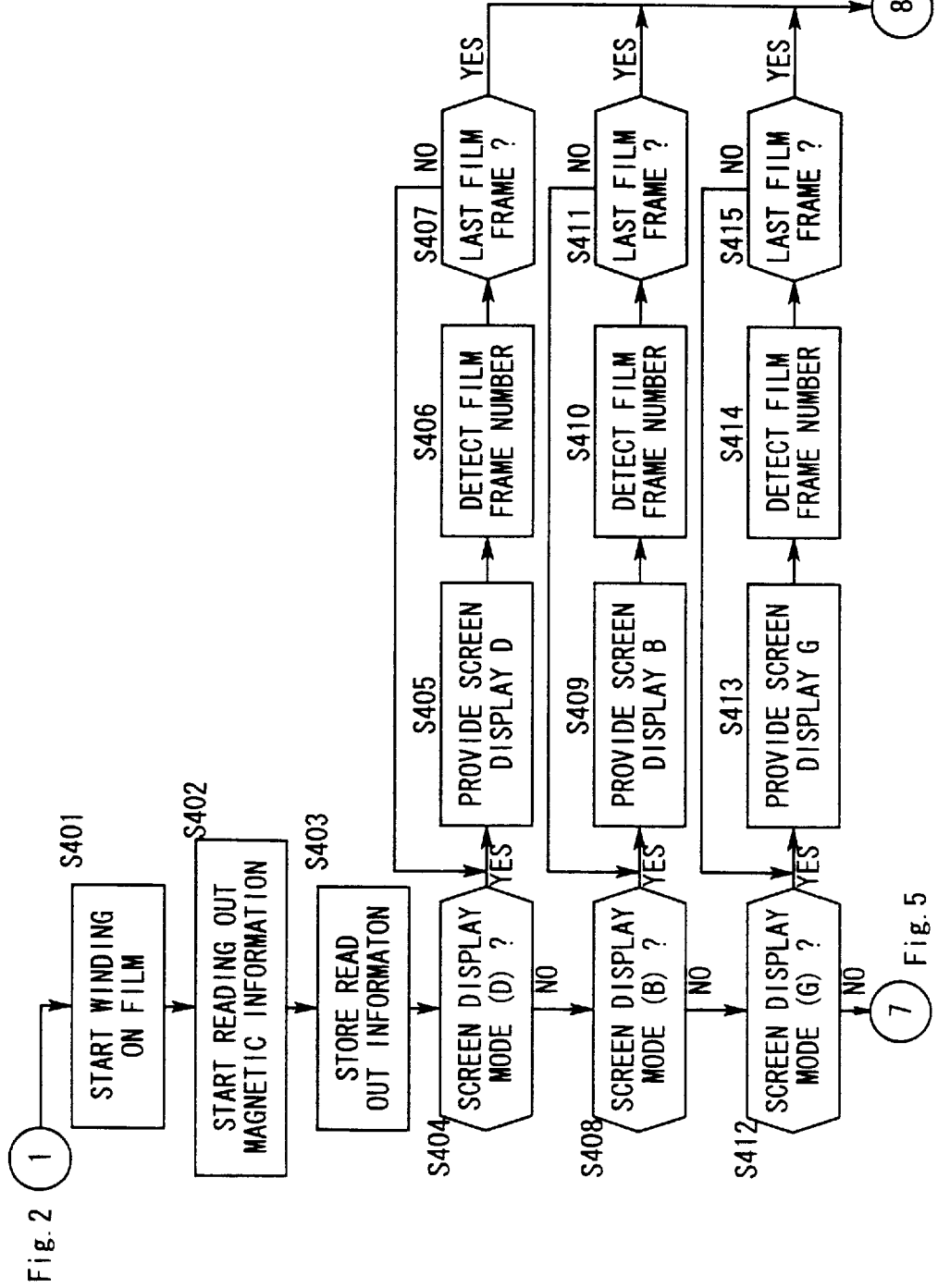
FIG. 4 is another flow chart showing another portion of the operational sequence of this preferred embodiment of the film image signal generation apparatus of the present invention.

In the step S305, a decision is taken as to whether or not the film displacement mode A is the one currently selected, and if so then the flow of control is transferred to the step S401 of the FIG. 4 flow chart, while if the currently selected film displacement mode is not the film displacement mode A then the flow of control proceeds to the step S306. In the step S306, similarly, a decision is taken as to whether or not the film displacement mode B is the one currently selected, and if so then the flow of control is transferred to the step S307, while if the currently selected film displacement mode is not the film displacement mode B then the flow of control proceeds to the step S308 of the FIG. 3 flow chart. In the step S307, the value of a variable M is set to zero, and then the flow of control is transferred to the step S501 of the FIG. 6 flow chart. In the step S308, similarly, a decision is taken as to whether or not the film displacement mode C is the one currently selected, and if so then the flow of control is transferred to the step S601 of the FIG. 8 flow chart, while if the currently selected film displacement mode is not the film displacement mode C then the flow of control proceeds to the step S309. In the step S309, similarly, a decision is taken as to whether or not the film displacement mode D is the one currently selected, and if so then the flow of control is transferred to the step S310, while if the currently selected film displacement mode is not the film displacement mode D then the flow of control proceeds to the step S311. In the step S310, the value of the variable M is set to one, and then the flow of control is transferred to the step S501 of the FIG. 6 flow chart. Similarly, in the step S311, a decision is taken as to whether or not the film displacement mode E is the one currently selected, and if so then the flow of control is transferred to the step S1604 of the FIG. 27 flow chart, while if the currently selected film displacement mode is not the film displacement mode E then the flow of control proceeds to the step S312. In this step S312, a decision is taken as to whether or not the film cartridge eject switch is being pressed and if so then the film cartridge is ejected and this sequence terminates, while if on the other hand the film cartridge eject switch is not being pressed then the flow of control loops back to the step S304 of the FIG. 2 flow chart. In this manner, it is determined which of the film displacement modes A through E is currently selected, and the flow of control is transferred to an appropriate point of the control program.

Film Displacement Mode A

Figure 2:
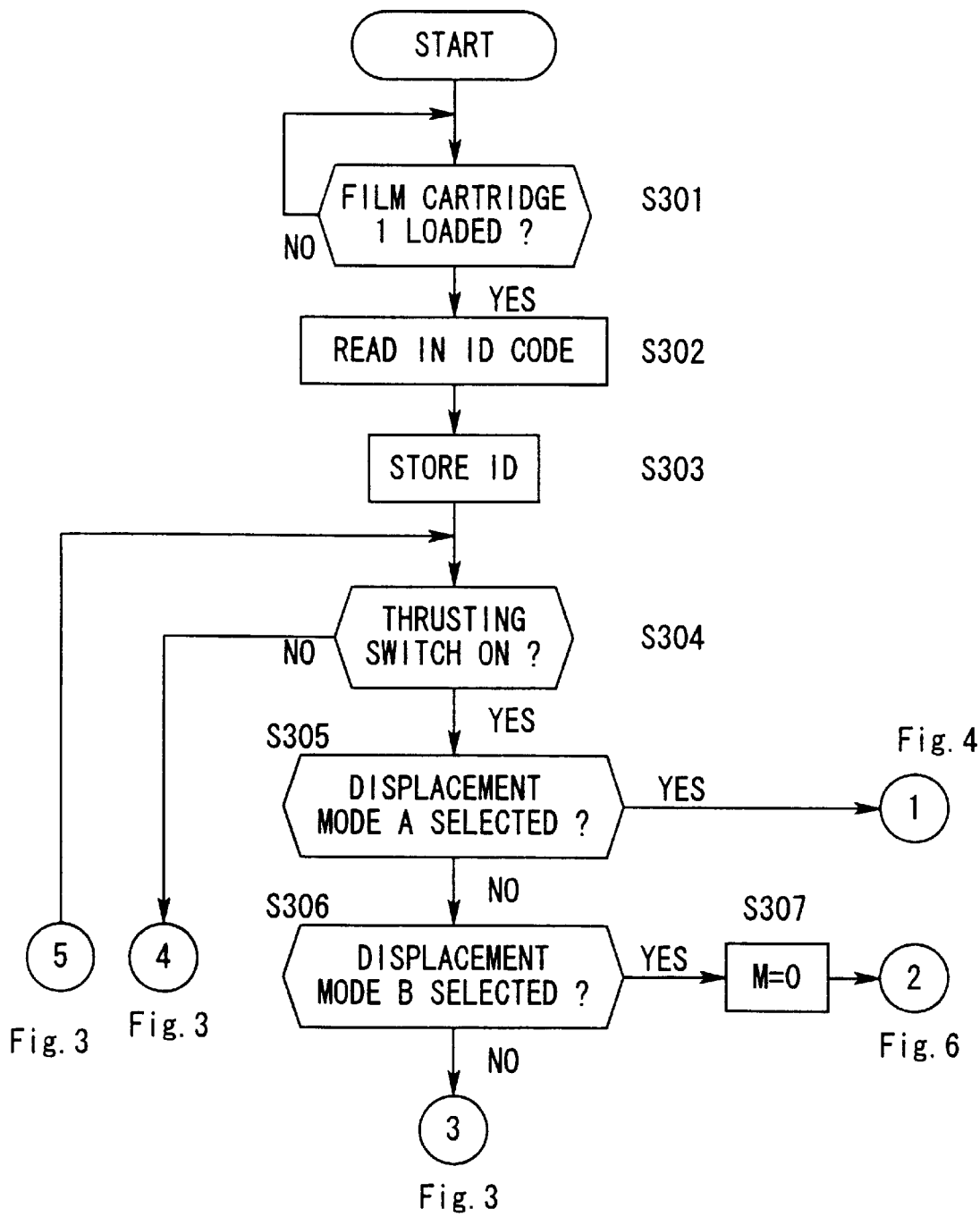
FIG. 2 is a flow chart showing a portion of the operational sequence of this preferred embodiment of the film image signal generation apparatus of the present invention.
Figure 5:
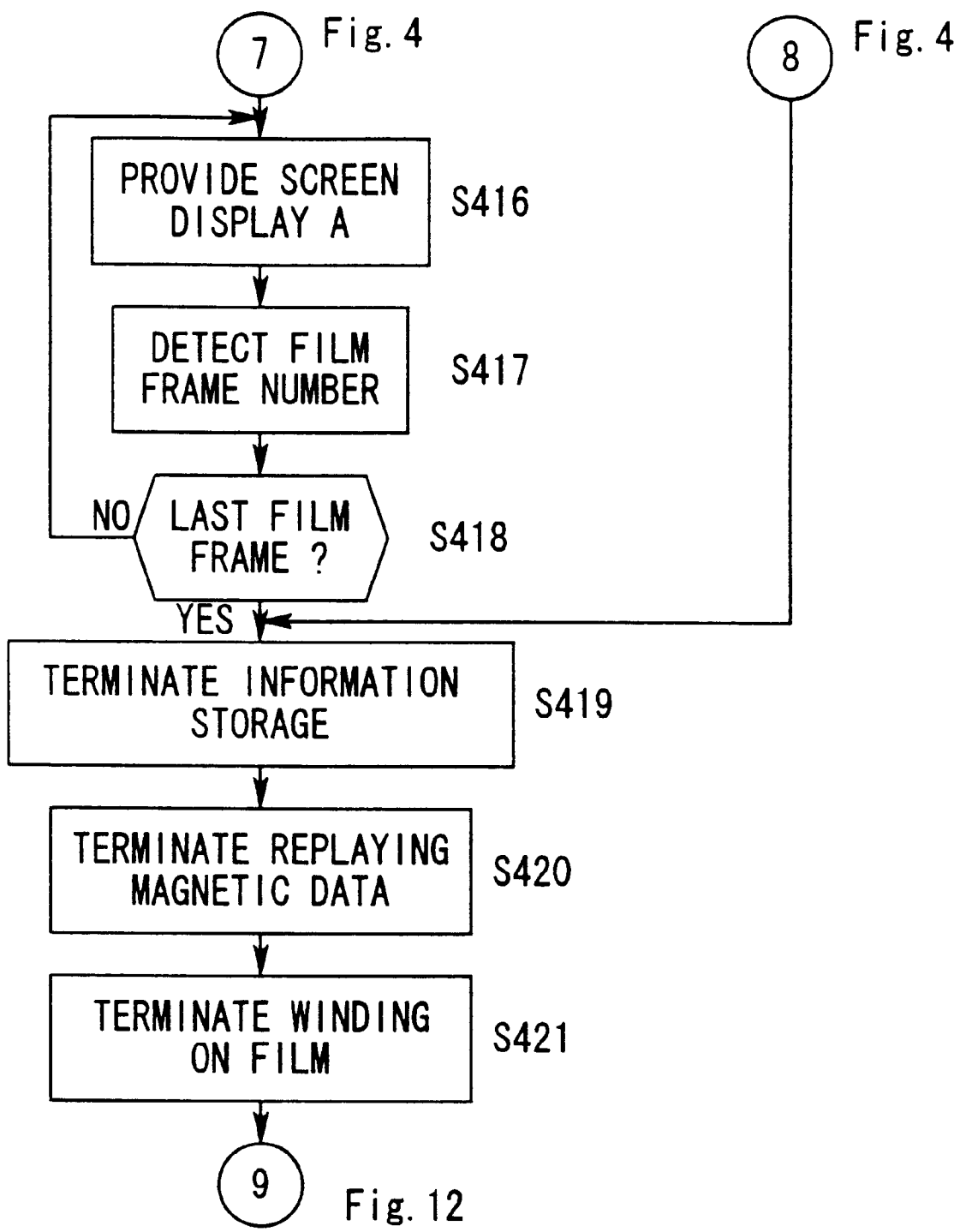
FIG. 5 is another flow chart showing another portion of the operational sequence of this preferred embodiment of the film image signal generation apparatus of the present invention.

When it is detected in the step S305 of the FIG. 2 flow chart that the film displacement mode A is selected, the flow of control follows the flow charts shown in FIGS. 4 and 5. In the first step S401 the rewind motor 4 and the wind on motor 5 are operated so as to start the winding on of the film F, and in the next step S402 the reading out of magnetic information from the film F by the magnetic head 7 and by the magnetic read circuit 17 is commenced. Next in the step S403 the magnetic information which has been read out in the previous step S402 is stored in the information storage device 28.

In the next step S404 a decision is taken as to whether or not the screen display mode which is currently selected is the (D) screen display mode, and if in fact the (D) screen display mode is currently selected then the flow of control proceeds to the step S405, while if not then the flow of control is transferred to the step S408. In the step S405, the image control circuit 16 is controlled by the CPU 21 so as to provide a display upon the monitor 29 as shown in FIG. 39(b). That is to say, along with displaying the film frame numbers laid out in the form of a matrix, that one of these frame numbers which designates the position of the area on the film which is passing the image area 12 is displayed as flashing. In this figure, the number of 17 is flashing. Hereinafter, this type of screen display will be referred to as the screen display D. With this type of display, it is possible for the operator to be aware of the state of forwarding of the film F. In the next step S406, the frame number of the frame which is currently opposed to the image area 12 is detected from the magnetic information. And in the next step S407 a decision is taken as to whether or not the frame number which has thus been detected in the step S406 is equal to the number of the last film frame, and if in fact this is the last film frame then the flow of control is transferred to the step S419 of the FIG. 5 flow chart, while otherwise the flow of control loops back to the step S405, so as to continue providing the display of the screen display D upon the screen of the monitor 29.

If the result of the decision in the step S404 is NO, then in the step S408 a decision is taken as to whether or not the screen display mode which is currently selected is the screen display mode (B), and if in fact the screen display mode (B) is currently selected then the flow of control proceeds to the step S409, while if not then the flow of control is transferred to the step S412. In the step S409, the image control circuit 16 is controlled by the CPU 21 so as to provide a display upon the monitor 29 as shown in FIG. 37(b), which says that the film is being forwarded and displays the frame numbers which designate the portion of the film which is passing the image area 12. Thus the exemplary display shown in FIG. 37(b) means that the film F is currently positioned with its portion between frames numbers 17 and 18 in opposition to the image area 12, and that the film is currently being forwarded. Hereinafter, this type of screen display will be referred to as the screen display B. Thus, it is possible for the operator to be aware of the state of forwarding of the film F by looking at the monitor 29. In the next step S410, the frame number of the frame which is currently opposed to the image area 12 is detected from the magnetic information. And in the next step S411 a decision is taken as to whether or not the frame number which has thus been detected in the step S410 is equal to the number of the last film frame, and if in fact this is the last film frame then the flow of control is transferred to the step S419 of the FIG. 5 flow chart, while otherwise the flow of control loops back to the step S409, so as to continue providing the display of the screen display B upon the screen of the monitor 29.

If the result of the decision in the step S408 is NO, then in the step S412 a decision is taken as to whether or not the screen display mode which is currently selected is the screen display mode (G), and if in fact the screen display mode (G) is currently selected then the flow of control proceeds to the step S413, while if not then the flow of control is transferred to the step S416 of the FIG. 5 flow chart. In the step S413, the image control circuit 16 is controlled by the CPU 21 so as to provide a display upon the monitor 29 as shown in FIG. 42(b), which merely consists of a predetermined pattern. Hereinafter, this type of screen display will be referred to as the screen display G. In this manner only the predetermined pattern is displayed, without any image from or directly related to the film being displayed upon the monitor 29. In the next step S414, the frame number of the frame which is currently opposed to the image area 12 is detected from the magnetic information. And in the next step S415 a decision is taken as to whether or not the frame number which has thus been detected in the step S414 is equal to the number of the last film frame, and if in fact this is the last film frame then the flow of control is transferred to the step S419 of the FIG. 5 flow chart, while otherwise the flow of control loops back to the step S413, so as to continue providing the display of the screen display G upon the screen of the monitor 29.

If the result of the decision in the step S412 is NO, then in the step S416 of the FIG. 5 flow chart the image control circuit 16 is controlled by the CPU 21 so as to provide a display upon the monitor 29 as shown in FIG. 36(b), which is blank. Hereinafter, this type of screen display will be referred to as the screen display A. In the next step S417, the frame number of the frame which is currently opposed to the image area 12 is detected from the magnetic information. And in the next step S418 a decision is taken as to whether or not the frame number which has thus been detected in the step S417 is equal to the number of the last film frame, and if in fact this is the last film frame then the flow of control is transferred to the step S419, while otherwise the flow of control loops back to the step S416, so as to continue providing the display of the blank screen display A upon the screen of the monitor 29.

In the step S419, after reading in the magnetic information from the film F, the information storage is terminated and the flow of control proceeds to the step S420. In the next step S420, the reading in of magnetic information is terminated. And in the next step S421 the motors 4 and 5 are stopped in the state in which the last film frame positioned at the image area 12 and the winding on of the film is terminated, and then the flow of control is transferred to the step S801 of the FIG. 12 flow chart.

Thus as described above, in the film displacement mode A, during the time period while the film F is being wound forwards until the last film frame comes to be positioned at the image area 12, the image control circuit 16 is controlled by the CPU 21 so as not to output the first picture signal S1 which is output by the CCD 14. In this manner, during the time period until an image of the last film frame is displayed, an image of the frame on the film F which has been forwarded as far as the image area 12, in other words an image of the portion of the film which is currently positioned there during film forwarding, is not displayed upon the monitor 29 (with the screen display modes (D), (B), (G), and (A)). Further, by outputting a second picture signal S2 during the forwarding of the film, any desired information or the like can be output upon the monitor 29 (with the screen display modes (D), (B), and (G)).

Moreover, as an alternative, it would also be acceptable for the screen display mode (D), (B) or (G) to be selected as the default when no screen display mode was input, although the screen display mode (A) is selected in this preferred embodiment of the film image signal generation apparatus of the present invention. Further, it would also be acceptable to provide a switch for switching over the screen display mode, so that it was possible to change the screen display mode while the film was being forwarded.

Film Displacement Mode B

Figure 6:
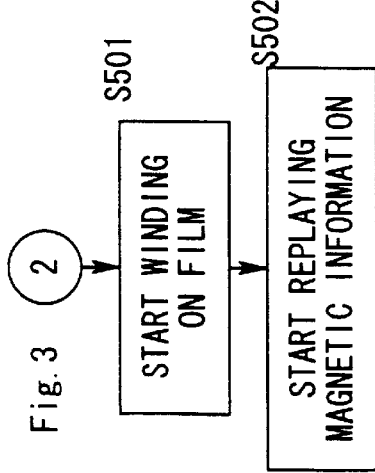
FIG. 6 is another flow chart showing another portion of the operational sequence of this preferred embodiment of the film image signal generation apparatus of the present invention.
Figure 7:
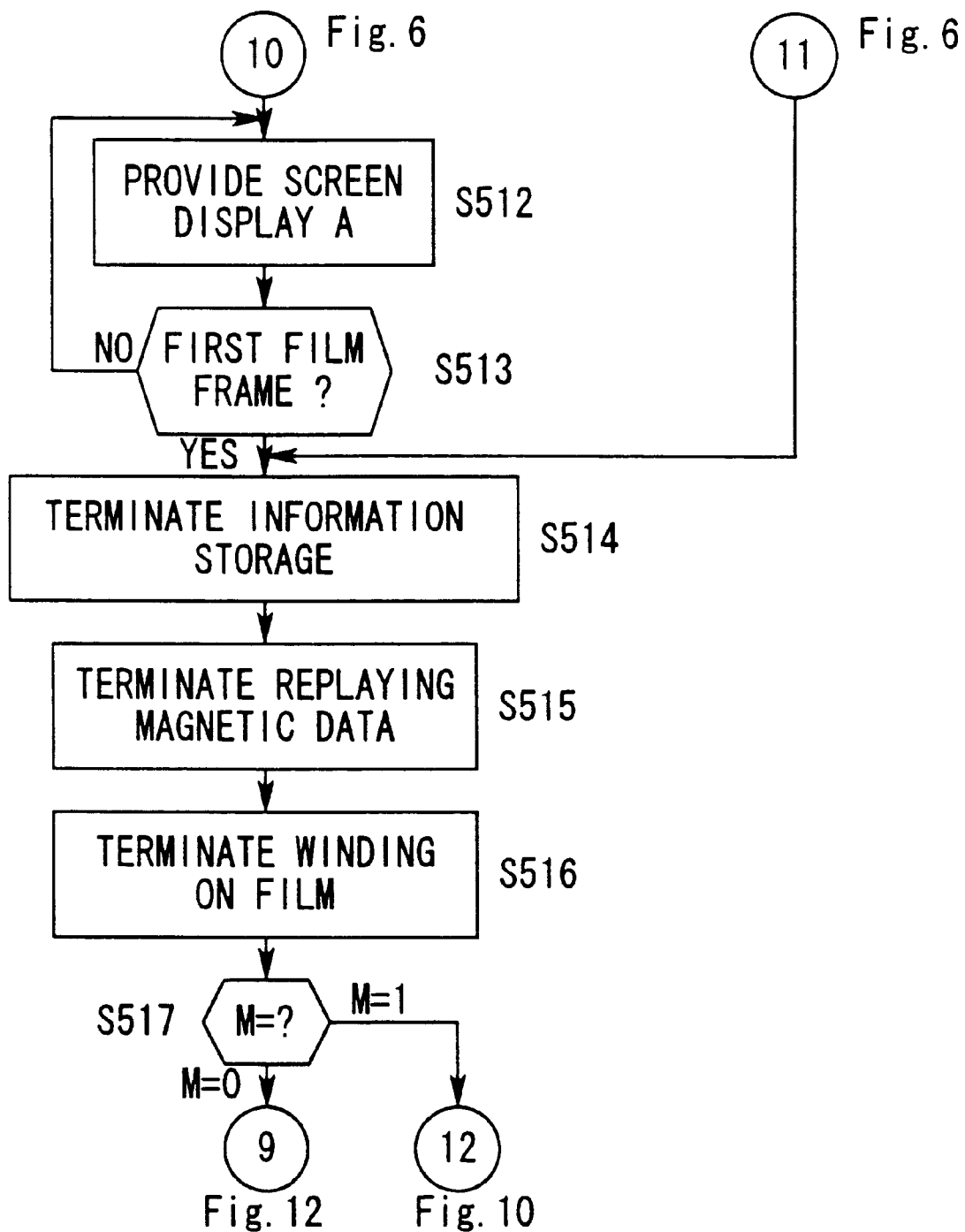
FIG. 7 is another flow chart showing another portion of the operational sequence of this preferred embodiment of the film image signal generation apparatus of the present invention.

When it is detected in the step S306 of the FIG. 2 flow chart that the film displacement mode B is selected, then the flow of control follows the flow charts shown in FIGS. 6 and 7. Moreover, if it is detected in the step S309 of the FIG. 3 flow chart that the film displacement mode D is selected, then also during film forwarding until the first film frame control is performed according to the flow charts of FIGS. 6 and 7. In the first step S501 the rewind motor 4 and the wind on motor 5 are operated so as to start the winding on of the film F. In the next step S502 the reading out of magnetic information from the film F by the magnetic head 7 and by the magnetic read circuit 17 is commenced. Next in the step S503 the magnetic information which has been read out in the previous step S502 is stored in the information storage device 28. In the next step S504 a decision is taken as to whether or not the screen display mode which is currently selected is the screen display mode (B), and if in fact the screen display mode (B) is currently selected then the flow of control proceeds to the step S505, while if not then the flow of control is transferred to the step S508. In the step S505, a picture signal for the screen display B is output to the monitor 29. In the next step S506, the frame number of the frame which is currently opposed to the image area 12 is detected from the magnetic information. And in the next step S507 a decision is taken as to whether or not the frame number which has thus been detected in the step S506 is equal to the number of the first film frame, and if in fact this is the first film frame then the flow of control is transferred to the step S514 of the FIG. 7 flow chart, while otherwise the flow of control loops back to the step S505, so as to continue providing the display of the screen display B upon the monitor 29.

If the result of the decision in the step S504 is NO, then in the step S508 a decision is taken as to whether or not the screen display mode which is currently selected is the screen display mode (G), and if in fact the screen display mode (G) is currently selected then the flow of control proceeds to the step S509, while if not then the flow of control is transferred to the step S512 of the FIG. 7 flow chart. In the step S509, a picture signal S for the screen display G is output to the monitor 29. In the next step S510, the frame number of the frame which is currently opposed to the image area 12 is detected from the magnetic information. And in the next step S511 a decision is taken as to whether or not the frame number which has thus been detected in the step S510 is equal to the number of the first film frame, and if in fact this is the first film frame then the flow of control is transferred to the step S514 of the FIG. 7 flow chart, while otherwise the flow of control loop s back to the step S509, so as to continue providing the display of the screen display G upon the screen of the monitor 29.

If the result of the decision in the step S508 is NO, then in the step S512 of the FIG. 7 flow chart, as shown in FIG. 36, the CPU 21 controls to display nothing on the monitor 29 (screen display A). In the next step S513, a decision is taken as to whether or not the frame number of the film frame which is currently opposed to the image area 12 is equal to the number of the first film frame, and if in fact this is the first film frame then the flow of control is transferred to the step S514, while otherwise the flow of control loops back to the step S512, so as to continue providing the display of the screen display A upon the screen of the monitor 29. In the step S514, after all of the magnetic information has been read in from the film F, the information storage is terminated and the flow of control proceeds to the step S515. In the next step S515, the reading in of magnetic information is terminated. And in the next step S516 the motors 4 and 5 are stopped in the state in which the first film frame positioned at the image area 12 and the winding on of the film is terminated. Then in the next step S517 a decision is taken as to what is the current value of the variable M, and if M is equal to unity (which implies that the film displacement mode D is selected) then the flow of control is transferred to the step S701 of the FIG. 10 flow chart, while if the value of M is zero (which implies that the film displacement mode B is selected) then the flow of control is transferred to the step S801 of the FIG. 12 flow chart.

Thus as described above, in the film displacement mode B, during the time period while the film F is being wound forwards until the first film frame comes to be positioned at the image area 12, the image control circuit 16 is controlled by the CPU 21 so as not to output the first picture signal S1. In this manner, in the film displacement mode B, during the time period until an image of the first film frame is displayed, an image of the image area 12, in other words an image of the portion of the film which is currently positioned there during film forwarding, is not displayed upon the monitor 29 (with the screen display modes (D), (B), (G), and (A)). Further, by taking advantage of this time period, any desired information or the like can be output upon the monitor 29 (with the screen display modes (D), (B), and (G)).

Moreover, although in this preferred embodiment of the film image signal generation apparatus of the present invention the construction was such that the screen display mode (A) was selected as the default when no screen display mode was input, as an alternative, it would also be acceptable to select the screen display mode (D), (B), or (G).

Film Displacement Mode C

Figure 8:
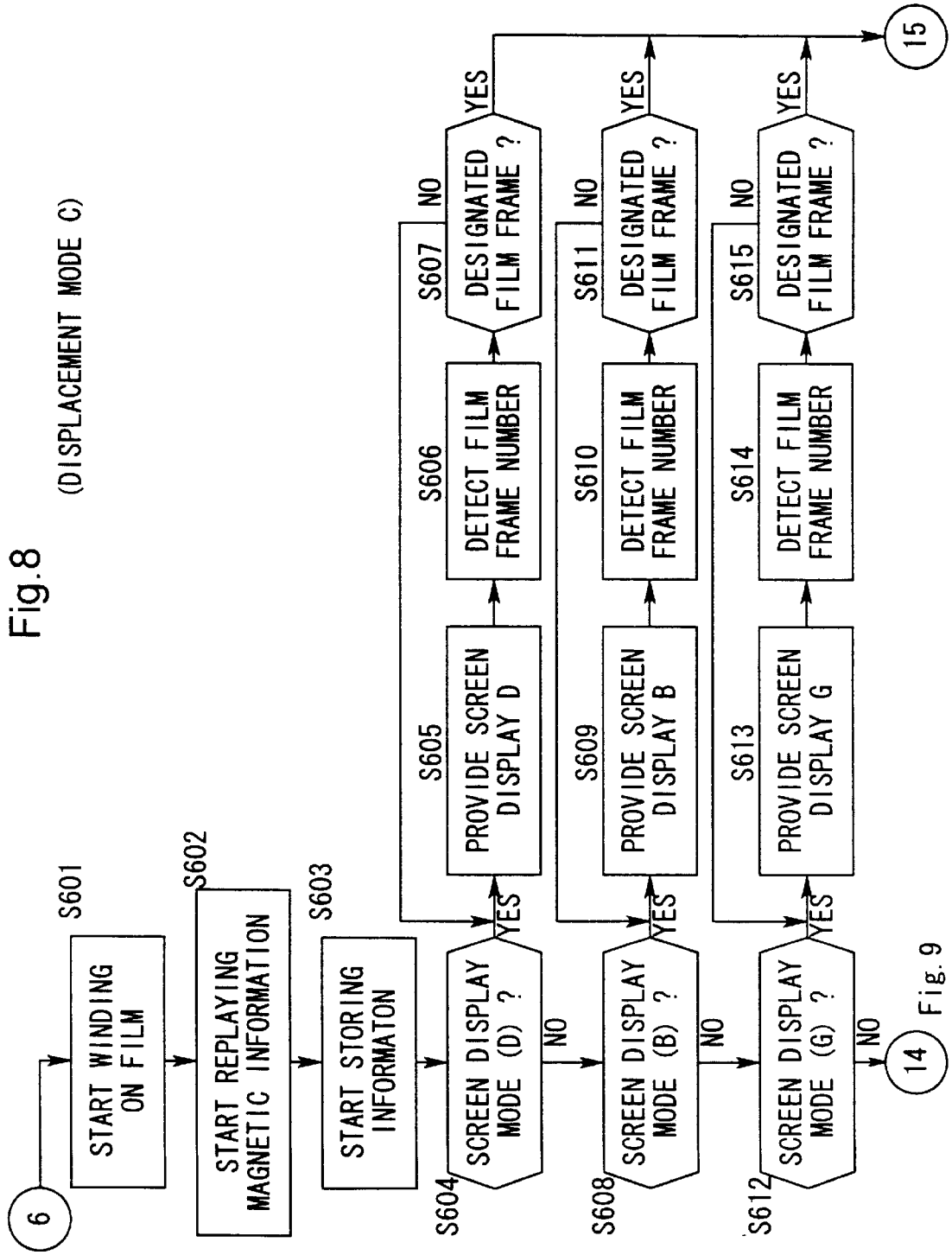
FIG. 8 is another flow chart showing another portion of the operational sequence of this preferred embodiment of the film image signal generation apparatus of the present invention.
Figure 9:
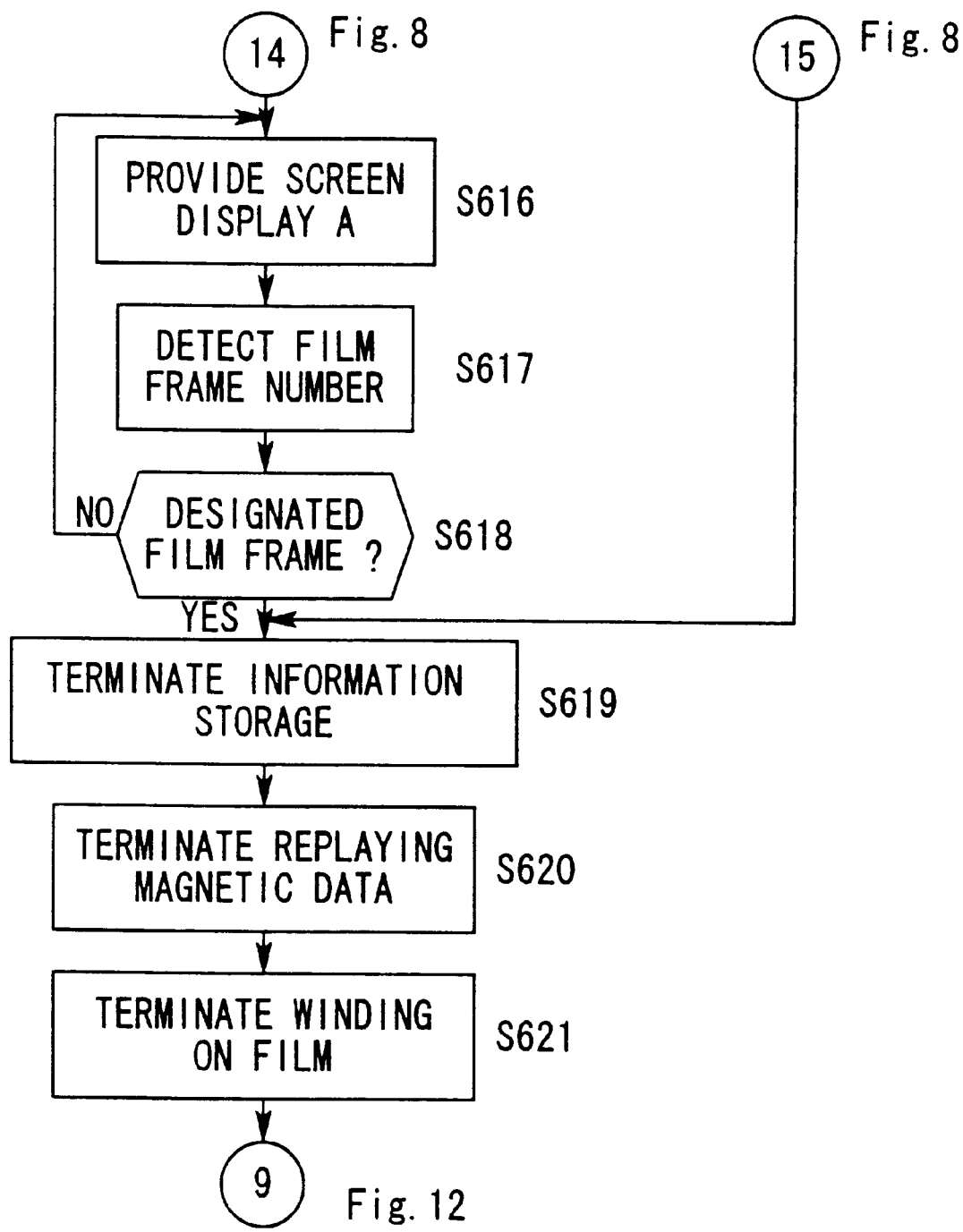
FIG. 9 is another flow chart showing another portion of the operational sequence of this preferred embodiment of the film image signal generation apparatus of the present invention.

When it is detected in the step S308 of the FIG. 3 flow chart that the film displacement mode C is selected, then the flow of control follows the flow charts shown in FIGS. 8 and 9. In the first step S601 the rewind motor 4 and the wind on motor 5 are operated so as to start the winding on of the film F. In the next step S602 the reading out of magnetic information from the film F by the magnetic head 7 and by the magnetic read circuit 17 is commenced. Next in the step S603 the magnetic information which has been read out in the previous step S602 is stored in the information storage device 28.

In the next step S604 a decision is taken as to whether or not the screen display mode which is currently selected is the screen display mode (D), and if in fact the screen display mode (D) is currently selected then the flow of control proceeds to the step S605, while if not then the flow of control is transferred to the step S608. In the step S605, a picture signal for the screen display D is output to the monitor 29. In the next step S606, the frame number of the frame which is currently opposed to the image area 12 is detected from the magnetic information. And in the next step S607 a decision is taken as to whether or not the frame number which has thus been detected in the step S606 is equal to the number of the designated film frame, and if in fact this is the designated film frame then the flow of control is transferred to the step S619 of the FIG. 9 flow chart, while otherwise the flow of control loops back to the step S605, so as to continue providing the display of the screen display D upon the monitor 29.

If the result of the decision in the step S604 is NO, then in the step S608 a decision is taken as to whether or not the screen display mode which is currently selected is the screen display mode (B), and if in fact the screen display mode (B) is currently selected then the flow of control proceeds to the step S609, while if not then the flow of control is transferred to the step S612. In the step S609, a picture signal for the screen display B is output to the monitor 29. In the next step S610, the frame number of the frame which is currently opposed to the image area 12 is detected from the magnetic information. And in the next step S611 a decision is taken as to whether or not the frame number which has thus been detected in the step S610 is equal to the number of the designated film frame, and if in fact this is the designated film frame then the flow of control is transferred to the step S619 of the FIG. 9 flow chart, while otherwise the flow of control loops back to the step S609, so as to continue providing the display of the screen display B upon the screen of the monitor 29.

If the result of the decision in the step S608 is NO, then in the step S612 a decision is taken as to whether or not the screen display mode which is currently selected is the screen display mode (G), and if in fact the screen display mode (G) is currently selected then the flow of control proceeds to the step S613, while if not then the flow of control is transferred to the step S616 of the FIG. 9 flow chart. In the step S613, a picture signal for the screen display G is output to the monitor 29. In the next step S614, the frame number of the frame which is currently opposed to the image area 12 is detected from the magnetic information. And in the next step S615 a decision is taken as to whether or not the frame number which has thus been detected in the step S614 is equal to the number of the designated film frame, and if in fact this is the designated film frame then the flow of control is transferred to the step S619 of the FIG. 9 flow chart, while otherwise the flow of control loops back to the step S613, so as to continue providing the display of the screen display G upon the screen of the monitor 29.

If the result of the decision in the step S612 is NO, then in the step S616 of the FIG. 9 flow chart, the image control circuit 16 is controlled so that no picture is displayed on the monitor 29 (screen display A). In the next step S617, the frame number of the frame which is currently opposed to the image area 12 is detected from the magnetic information. And in the next step S618 a decision is taken as to whether or not this frame number detected in the previous step S617 is equal to the number of the designated film frame, and if in fact this is the designated film frame then the flow of control is transferred to the step S619, while otherwise the flow of control loops back to the step S616, so as to continue providing the display of the screen display A upon the screen of the monitor 29. In the step S619, after all of the magnetic information has been read in from the film F, the magnetic storage is terminated and the flow of control proceeds to the step S620. In the next step S620, the reading in of magnetic information is terminated. And in the next step S621 the motors 4 and 5 are stopped in the state in which the designated film frame positioned at the image area 12 and the winding on of the film is terminated; and then the flow of control is transferred to the step S801 of the FIG. 12 flow chart.

Thus as described above, in the film displacement mode C, during the time period while the film F is being wound forwards until the designated film frame comes to be positioned at the image area 12, the image control circuit 16 is controlled by the CPU 21 so as not to output the first picture signal S1. In this manner, in the film displacement mode C, during the time period until an image of the designated film frame is displayed, an image of the image area 12, in other words an image of the portion of the film which is currently positioned there during film forwarding, is not displayed upon the monitor 29 (with the screen display modes (D), (B), (G), and (A)). Further, by taking advantage of this time period, any required information or the like can be output upon the monitor 29 (with the screen display modes (D), (B), and (G)).

Moreover, although in this preferred embodiment of the film image signal generation apparatus of the present invention the construction was such that the screen display mode (A) was selected as the default when no screen display mode was input, as an alternative, it would also be acceptable to select the screen display mode (D), (B), or (G). Further, it would also be acceptable to provide a switch for switching over the screen display mode, so that it was possible to change the screen display mode while the film was being forwarded.

Film Displacement Mode D

Figure 10:
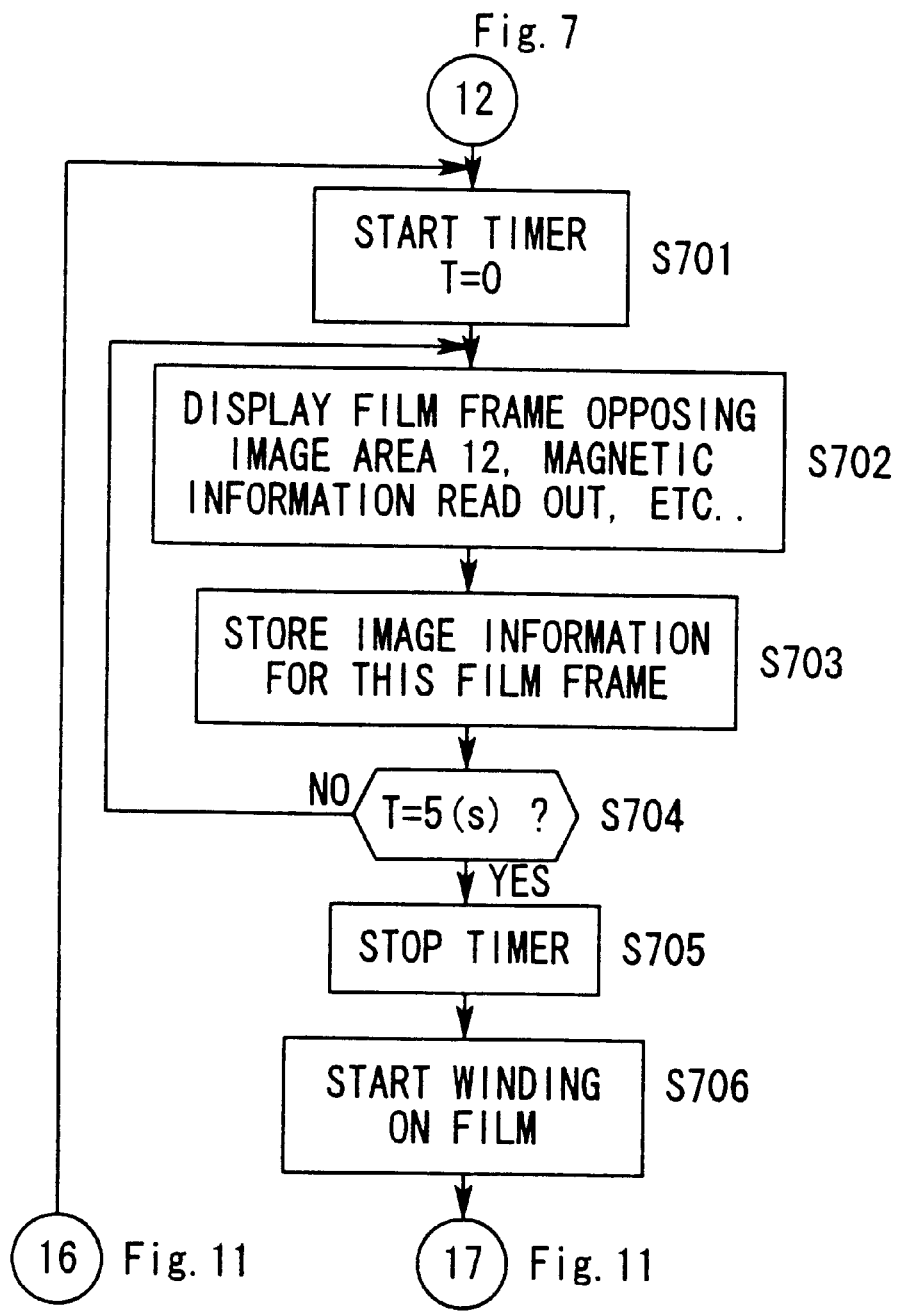
FIG. 10 is another flow chart showing another portion of the operational sequence of this preferred embodiment of the film image signal generation apparatus of the present invention.
Figure 11:
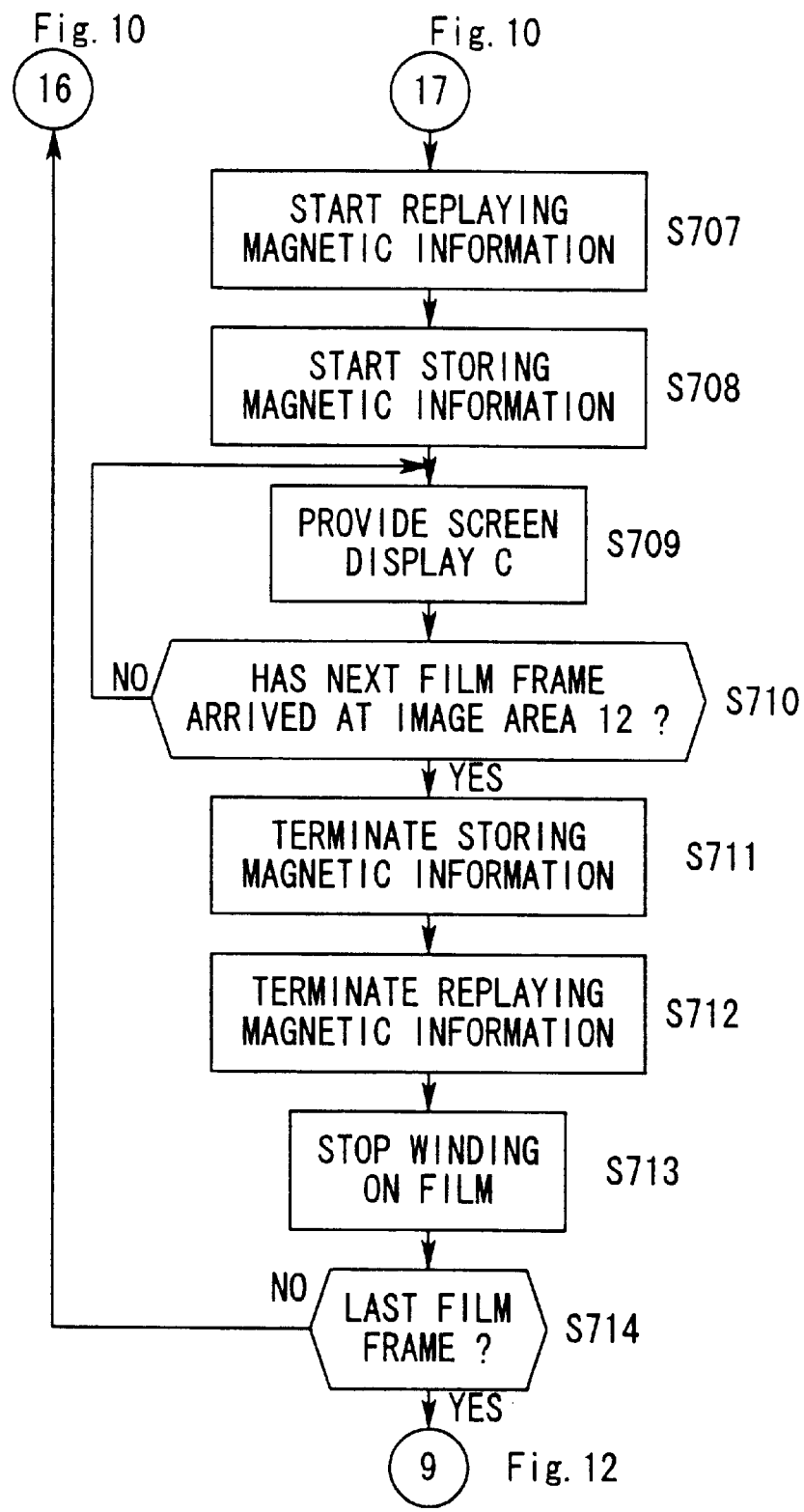
FIG. 11 is another flow chart showing another portion of the operational sequence of this preferred embodiment of the film image signal generation apparatus of the present invention.

When it is detected in the step S309 of the FIG. 3 flow chart that the film displacement mode D is selected, then the flow of control follows the flow charts shown in FIGS. 10 and 11. From the state in which the first film frame is opposed to the image area 12 (the step S516 of the FIG. 7 flow chart), in the first step S701 a timer is set to zero and is started so as to count time. In the next step S702 an image (the first picture signal S1) of the film frame which is currently opposed to the image area 12 is output to the monitor 29. Further, at the same time, the magnetically recorded information upon the film F, the film frame number, and the like (the second picture signal S2) is output by the image control circuit 16 as a superimposed display. In the next step S703, the image of the frame which was read out in the previous step S702 is stored in the information storage device 28. In the next step S704 a decision is taken as to whether or not the time value T counted by the timer has yet reached 5 seconds, and if it has then the flow of control proceeds to the step S705, while if the time value T is still less than 5 seconds then the flow of control loops back to the step S702. In this manner the image of the current film frame, and the information associated therewith, are displayed on the monitor for a period of 5 seconds. In the step S705 the timer is stopped, and the flow of control proceeds to the step S706. In this step S706 the wind on motor 5 is started and the winding on of the film is commenced.

In the step S707 of the FIG. 11 flow chart the reading out of the magnetically recorded information on the film by the magnetic head 7 and by the magnetic read circuit 17 is started. In the next step S708 this magnetic information read out in the previous step S707 is stored in the information storage device 28. In the next step S709, the frame image which was stored in the step S703 and the frame number of the film frame which is currently opposed to the image area 12 are displayed upon the monitor 29, as shown in FIG. 38. Hereinafter, this type of screen display will be referred to as screen display C. In the next step S710 a decision is taken as to whether or not the next film frame has yet come to be positioned in opposition to the image area 12, and if it has then the flow of control continues to the next step S711, while if the next film frame has not yet reached the image area 12 then the flow of control loops back to the step S709, so as to continue providing the screen display C. In the next step S711 the storage of the magnetic information is terminated since it has now all been read out, and the flow of control proceeds to the next step S712. In this step S712 the reading out of the magnetic information is terminated. In the next step S713 the wind on motor 5 is stopped, so as to stop winding on the film F in its state with the next film frame positioned so as to oppose the image area 12. And in the next step S714 a decision is taken as to whether or not the film frame which now is opposing the image area 12 is the last frame upon the film F. If so, then the flow of control proceeds to the step S801 of the FIG. 12 flow chart, while if not then the flow of control returns to the step S701 of the FIG. 10 flow chart. In this manner, the steps S701 through S713 are repeatedly executed until the last frame on the film F reaches the image area 12, and the film is advanced in a stepwise manner at intervals of about 5 seconds.

In the above described film displacement mode D, with regard to the steps S709 through S711, during the time period while the next film frame is being brought to oppose the image area 12, an image of the previous film frame and the frame information for the film frame which is currently opposed to the image area 12 are displayed upon the monitor 29. Since images of the film frame which was displayed before forwarding and of the next film frame are displayed in immediate sequence, a moving image presentation becomes possible, in particular in the case of film frames which have been shot using continuous shooting. In this case, it would be acceptable that the image of the previous film frame without the frame information was displayed.

Figure 12:
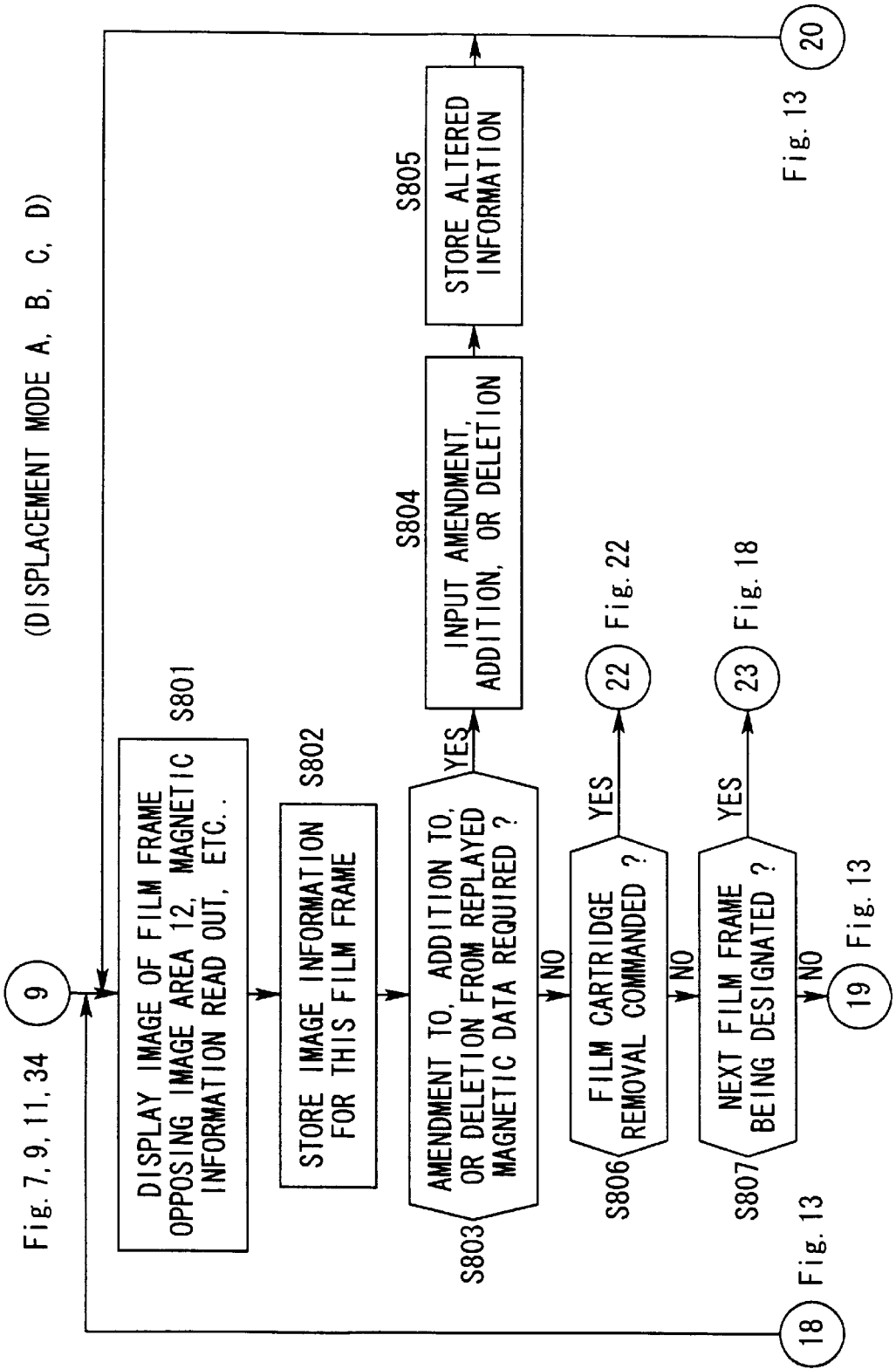
FIG. 12 is another flow chart showing another portion of the operational sequence of this preferred embodiment of the film image signal generation apparatus of the present invention.

In the step S801 of the FIG. 12 flow chart, an image (the first picture signal S1) of the film frame which is currently opposed to the image area 12, the magnetically recorded information upon the film F, the frame number of the film frame which is currently opposed to the image area 12, and the like (the second picture signal S2) are superimposed by the image control circuit 16 and output to the monitor 29 for display. In the next step S802, the image of the frame which was read in by the previous step S801 is stored in the information storage device 28. In the next step S803, a decision is taken as to whether or not any amendment to, addition to, or deletion from the magnetically recorded information is required, and if such alteration is required then the flow of control proceeds to the next step S804, while if not then the flow of control is transferred to the step S806. In the step S804, the contents of this required amendment to, addition to, or deletion from the magnetically recorded information is input from the information input device 27, and then the flow of control continues to the next step S805. In this step S805, the magnetic information as altered by this amendment, addition, or deletion which was input in the step S804 is stored in the information storage device 28, and then the flow of control returns to the step S801.

Figure 22:
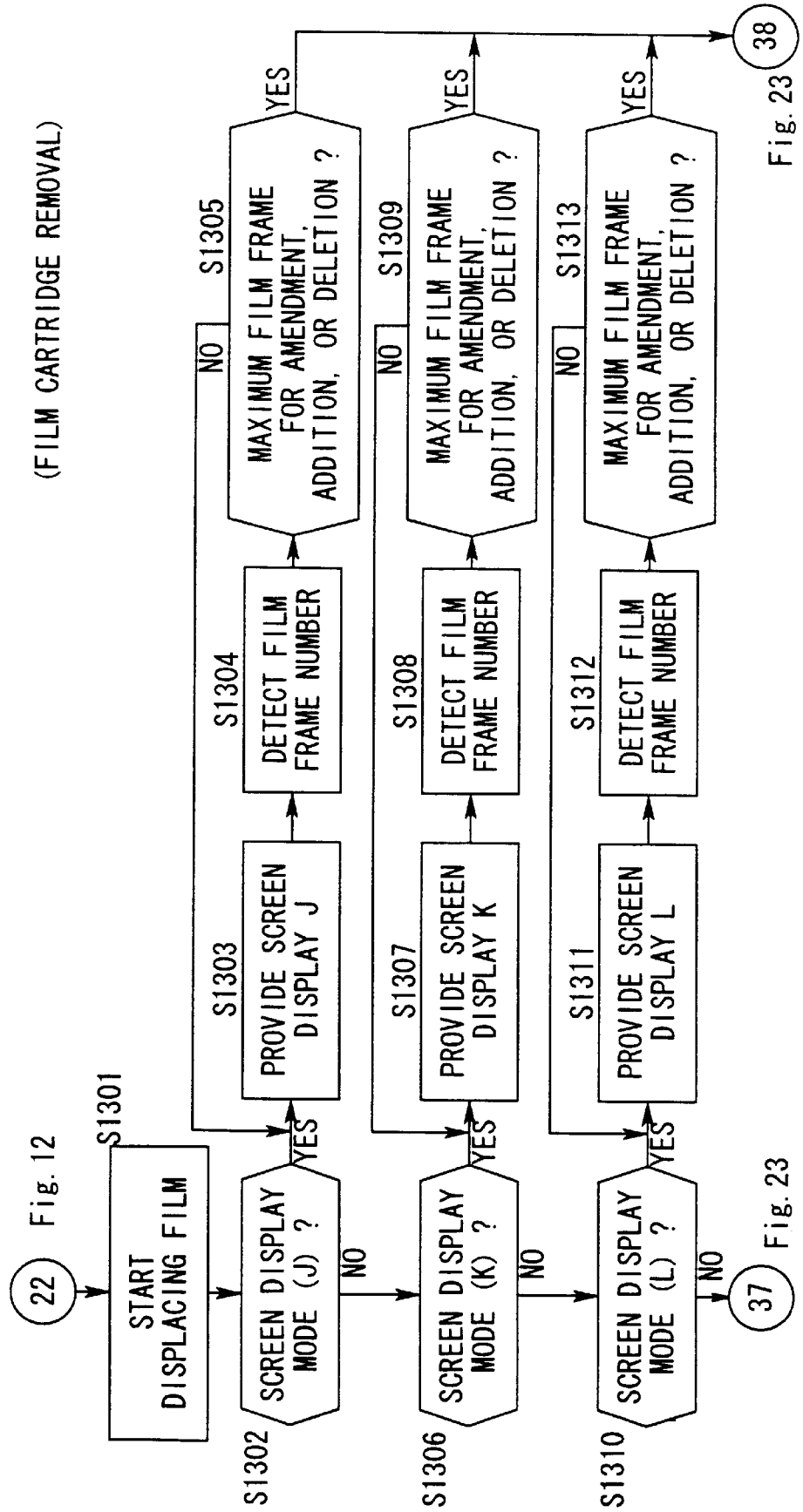
FIG. 22 is another flow chart showing another portion of the operational sequence of this preferred embodiment of the film image signal generation apparatus of the present invention.

In the step S806 a decision is taken as to whether or not the film cartridge removal switch is being pressed in order to command removal of the film cartridge which is currently loaded, and if the film cartridge removal switch is being pressed then the flow of control is transferred to the step S1301 of the FIG. 22 flow chart, while if the film cartridge removal switch is not being pressed then the flow of control continues to the step S807. In the step S807, a decision is taken as to whether or not the next film frame number for display is being designated, and if the next film frame number for display is being designated then the flow of control is transferred to the step S1101 of the FIG. 18 flow chart, while if no next film frame number for display is being designated then the flow of control is transferred to the step S808 of the FIG. 13 flow chart. In this step S808, a decision is taken as to whether or not the all frames rewind switch is being pressed, and if so then the flow of control is transferred to the step S1201 of the FIG. 20 flow chart, while if this all frames rewind switch is not being pressed then the flow of control proceeds to the step S809. In this next step S809, a decision is taken as to whether or not the story mode is selected, and if it is then the flow of control is transferred to the step S1601 of the FIG. 27 flow chart, while if the story mode is not selected the flow of control proceeds to the next step S810. In this step S810, decision is taken as to whether or not the single frame rewind switch is being pressed, and if so then the flow of control proceeds to the step S811, while if this single frame rewind switch is not being pressed then the flow of control is transferred to the step S813. In the step S811, a decision is taken as to whether or not the film frame which is currently opposing the image area 12 is the first film frame, and if it is then the flow of control proceeds to the step S812, while if this is not the first film frame then the flow of control is transferred to the step S901 of the FIG. 14 flow chart. In the step S812 an error indication is displayed, and then the flow of control loops back to the step S801. On the other hand, in the step S813, a decision is taken as to whether or not the single frame advance switch is being pressed, and if so then the flow of control proceeds to the step S814, while if this single frame advance switch is not being pressed then the flow of control loops back to the step S801. In the next step S814, a decision is taken as to whether or not the film frame which is currently opposing the image area 12 is the last frame on the film F, and if it is then the flow of control proceeds to the step S815, while if this is not the last film frame then the flow of control is transferred to the step S901 of the FIG. 14 flow chart. In the step S815 an error indication is displayed, and then the flow of control loops back to the step S801.

Figure 14:
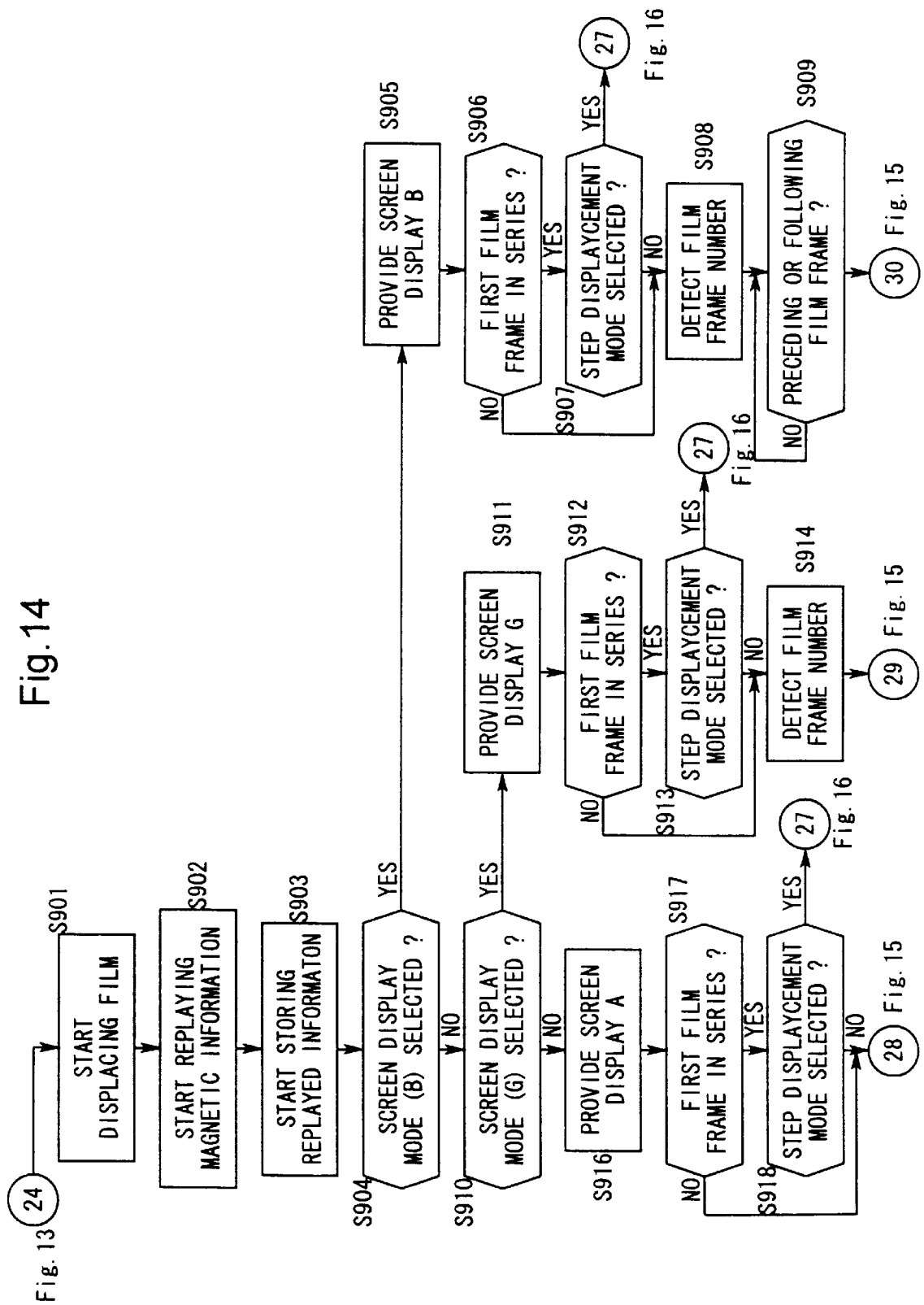
FIG. 14 is another flow chart showing another portion of the operational sequence of this preferred embodiment of the film image signal generation apparatus of the present invention.
Figure 15:
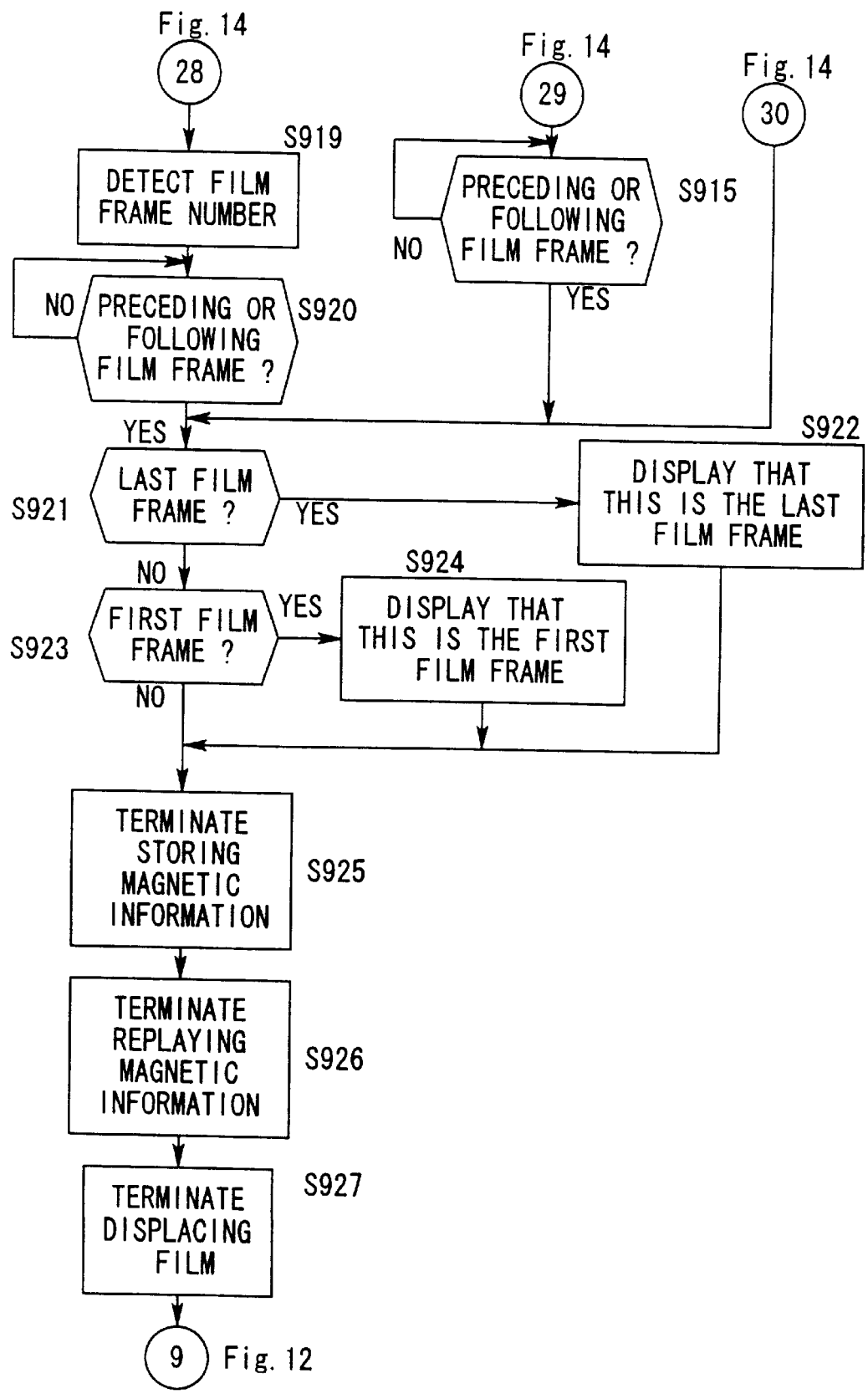
FIG. 15 is another flow chart showing another portion of the operational sequence of this preferred embodiment of the film image signal generation apparatus of the present invention.

In the step S901 of the FIG. 14 flow chart the rewind motor 4 and the wind on motor 5 are started, and the displacing of the film F is commenced. If the flow of control has arrived at this step S901 from the step S810 in which it was decided that the single frame rewind switch was being pressed, then the film F is rewound by the rewind motor 4; while on the other hand, if the flow of control has arrived at this step S901 from the step S813 in which it was decided that the single frame advance switch was being pressed, then the film F is wound forward by the wind on motor 5. In the step S902 the reading out of the magnetically recorded information on the film F by the magnetic head 7 and by the magnetic read circuit 17 is started. In the next step S903 the storage of this magnetic information read out in the previous step S902 in the information storage device 28 is started. In the next step S904 a decision is taken as to whether or not the screen display mode (B) is selected, and if so then the flow of control proceeds to the step S905, while if the screen display mode (B) is not selected then the flow of control is transferred to the step S910. In the step S905, the picture signal S for the screen display B is output to the monitor 29. In the next step S906, a decision is taken based upon the magnetic information which was read in in the step S902 as to whether or not the film frame which is currently opposed to the image area 12 is the first film frame in series (the first film frame which is to be displayed) from a set of film frames which have been mutually associated, and if the result is YES then the flow of control proceeds to the step S907, while if the result is NO then the flow of control skips to the step S908. In the step S907 a decision is taken as to whether or not the step displacement mode is selected, and if it is then the flow of control is transferred to the step S1001 of the FIG. 16 flow chart, while if the step displacement mode is not selected then the flow of control continues to the next step S908. In this step S908, the frame number of the film frame which currently is opposed to the image area 12 is detected from the magnetic information upon the film F. Then in the next step S909 a decision is taken as to whether or not the preceding frame upon the film F (that is the next frame in the case of film rewinding) or the following film frame (that is the next frame in the case of winding the film forwards) has been reached, and the flow of control loops around until this condition is satisfied. Then the flow of control is transferred to the step S921 of the FIG. 15 flow chart.

If in the step S904 it is decided that the screen display mode (B) is not selected then the flow of control is transferred to the step S910, in which a decision is taken as to whether or not the screen display mode (G) is selected, and if so then the flow of control proceeds to the step S911, while if the screen display mode (G) is not selected then the flow of control is transferred to the step S916. In the step S911, the picture signal S for the screen display G is output to the monitor 29. In the next step S912, a decision is taken based upon the magnetic information which was read in in the step S902 as to whether or not the film frame which is currently opposed to the image area 12 is the first film frame in series (the first film frame which is to be displayed) from a set of film frames which have been mutually associated, and if the result is YES then the flow of control proceeds to the step S913, while if the result is NO then the flow of control skips to the step S914. In the step S913 a decision is taken as to whether or not the step displacement mode is selected, and if it is then the flow of control is transferred to the step S1001 of the FIG. 16 flow chart, while if the step displacement mode is not selected then the flow of control continues to the next step S914. In this step S914, the frame number of the film frame which currently is opposed to the image area 12 is detected from the magnetic information upon the film F. Then in the next step S915 of the FIG. 15 flow chart a decision is taken as to whether or not the preceding film frame or the following film frame has been reached, and the flow of control loops around until this condition is satisfied. Then the flow of control is transferred to the step S921.

In the step S916, the image control circuit 16 is controlled so as to display no picture on the monitor 29 as shown in FIG. 36 (the screen display A). In the next step S917, a decision is taken based upon the magnetic information which was read in in the step S902 as to whether or not the film frame which is currently opposed to the image area 12 is the first film frame in series (the first film frame which is to be displayed) from a set of film frames which have been mutually associated, and if the result is YES then the flow of control proceeds to the step S918, while if the result is NO then the flow of control skips to the step S919 of the FIG. 15 flow chart. In the step S918 a decision is taken as to whether or not the step displacement mode is selected, and if it is then the flow of control is transferred to the step S1001 of the FIG. 16 flow chart, while if the step displacement mode is not selected then the flow of control continues to the next step S919. In this step S919, the frame number of the film frame which currently is opposed to the image area 12 is detected from the magnetic information upon the film F. Then in the next step S920 a decision is taken as to whether or not the preceding film frame or the following film frame has been reached, and the flow of control loops around until this condition is satisfied. Then the flow of control is transferred to the step S921. In this step S921, a decision is taken as to whether the film frame which currently is opposed to the image area 12 is the last frame upon the film F, and if it is then the flow of control continues to the step S922, while if the current film frame is not the last film frame then the flow of control is transferred to the step S923. In the step S922 the fact that this is the last film frame is displayed upon the monitor 29, and then the flow of control is transferred to the step S925. In the step S923, a decision is taken as to whether the film frame which currently is opposed to the image area 12 is the first frame upon the film F, and if it is then the flow of control continues to the step S924, while if the current film frame is not the first film frame then the flow of control is transferred to the step S925. In the step S924 the fact that this is the first film frame is displayed upon the monitor 29, and then the flow of control is transferred to the step S925. In this step S925 the storage of the magnetic information from the film F is terminated, since now it has all been read in, and the flow of control proceeds to the step S926. In this next step S926, the reading in of magnetic information from the film F is terminated. And in the next step S927 the motors 4 and 5 are stopped with the preceding or the following film frame positioned at the image area 12 and the displacement of the film is terminated, and then the flow of control is transferred to the step S801 of the FIG. 12 flow chart, and hereinafter an image of the preceding or the following film frame is displayed, as described above.

Thus, as described above, when either the single frame rewind switch or the single frame advance switch has been pressed, during the time period while the film is being displaced until the preceding frame upon the film F (that is the next frame in the case of film rewinding) or the following film frame (that is the next frame in the case of winding the film forwards) arrives at a position to oppose the image area 12, the image control circuit 16 is controlled by the CPU 21 so as not to output the first picture signal S1. In this manner, during the time period until an image of the proper film frame is output, no image of the image area 12, that is to say, of the portion of the film F that is passing the image area 12 while the film is being displaced, is displayed upon the monitor 29 (film image modes (B), (G), and (A)). Further, this time period is taken advantage of for displaying information which is actually required upon the screen of the monitor 29 (film image modes (B) and (G)).

The Step Displacement Mode

Figure 16:
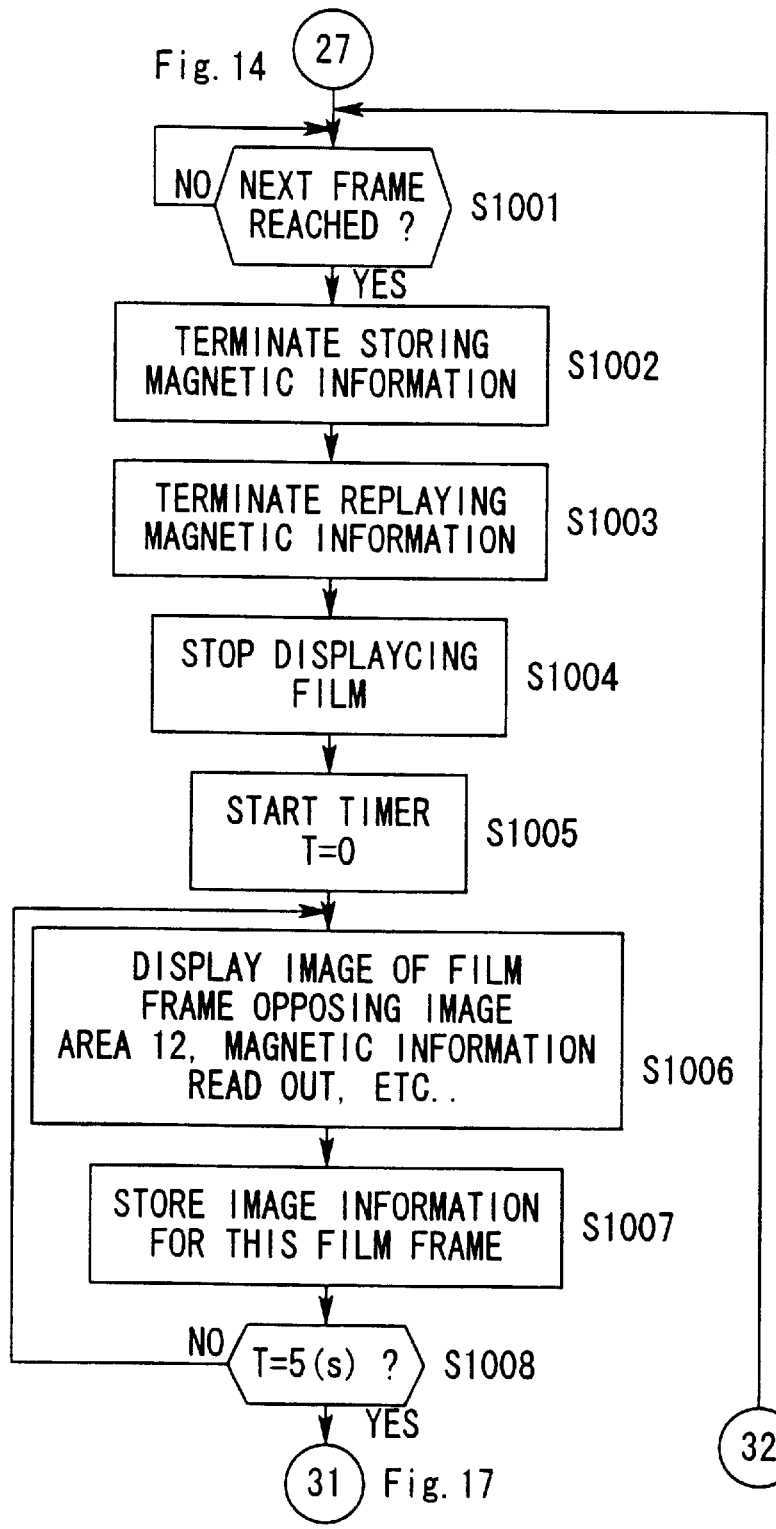
FIG. 16 is another flow chart showing another portion of the operational sequence of this preferred embodiment of the film image signal generation apparatus of the present invention.
Figure 17:
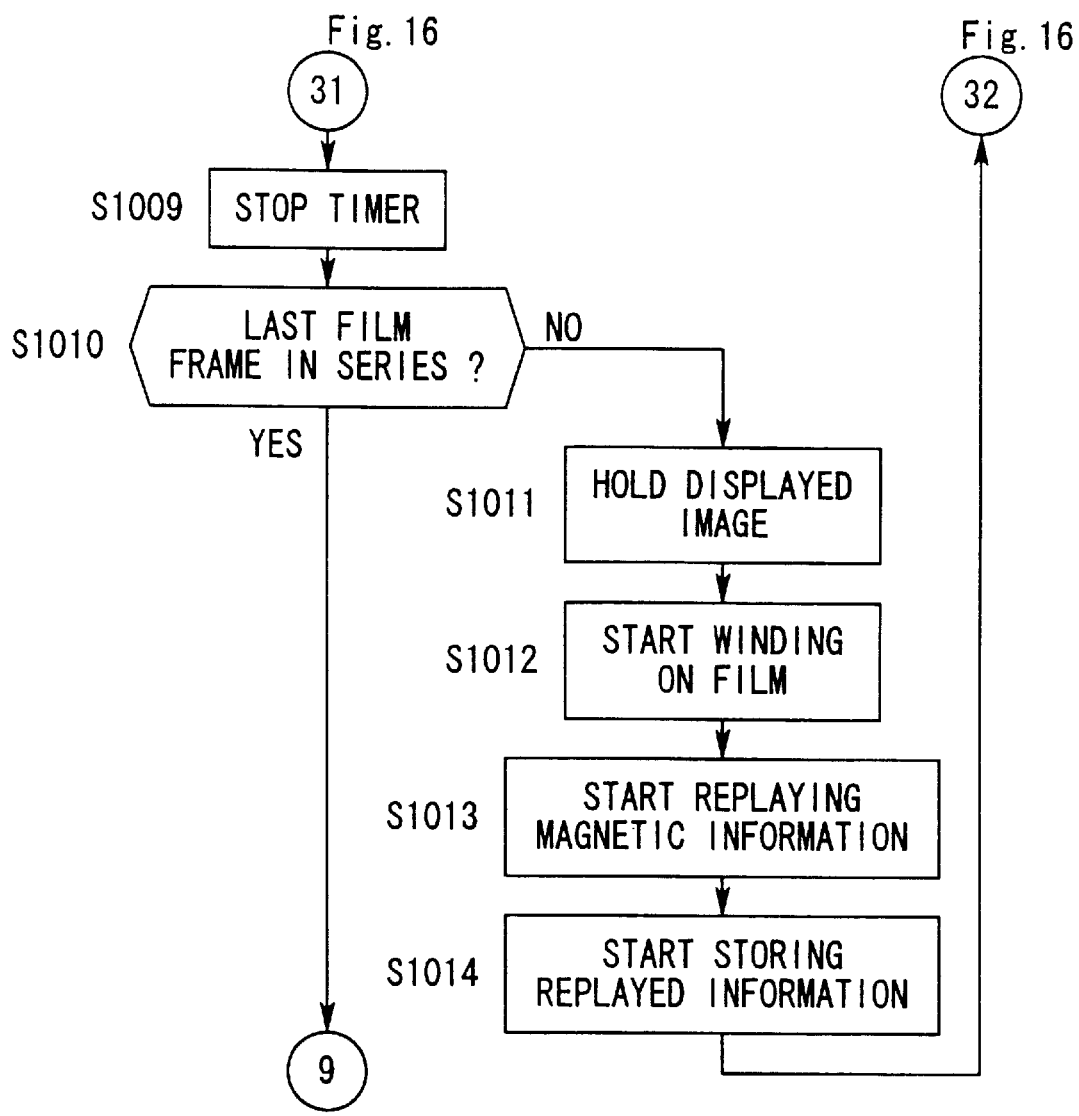
FIG. 17 is another flow chart showing another portion of the operational sequence of this preferred embodiment of the film image signal generation apparatus of the present invention.

When the step displacement mode switch has been pressed then the flow of control is transferred to the programs whose flow charts are shown in FIGS. 16 and 17. In the first step S1001 of FIG. 16,. the program loops around until the next film frame reaches a position so as to oppose the image area 12, and when this condition is satisfied the flow of control continues to the next step S1002. In this step S1002 the storage of the magnetic information is terminated since it has now all been read out, and the flow of control proceeds to the next step S1003. In this step S1003 the reading out of the magnetic information is terminated. In the next step S1004 the wind on motor 5 is stopped, so as to stop displacing the film F which is now positioned so that the next film frame is opposed to the image area 12. In the next step S1005 the timer is set to zero and is started so as to count time. In the next step S1006 an image of the film frame which is currently opposed to the image area 12 is output to the monitor 29. Further, at the same time, the magnetically recorded information upon the film F and a message informing the operator of the film frame number is output by the image control circuit 16 as a superimposed display. In the next step S1007 the image of the frame which was read in by the previous step S1006 is stored in the information storage device 28. And in the next step S1008 a decision is taken as to whether or not the time value T counted by the timer has yet reached 5 seconds, and if it has then the flow of control proceeds to the step S1009 of the FIG. 17 flow chart, while if the time value T is still less than 5 seconds then the flow of control loops back to the step S1006. In this manner the image of the current film frame is displayed on the monitor for a period of 5 seconds. In the next step S1009 (referring now to FIG. 17) the timer is stopped, and then in the next step S1010 a decision is taken as to whether or not the film frame which is currently opposed to the image area 12 is the last film frame in series (the last film frame which is to be displayed) from the set of film frames which have been mutually associated, and if the result is YES then the flow of control is transferred to the step S801 of the FIG. 12 flow chart, while if the result is NO then the flow of control proceeds to the step S1011. In this next step S1011, a decision is taken, based upon the magnetic information which was read in in the step S902, as to whether or not this is the last film frame in the series of film frames which have been mutually associated. In the step S1011 the image which was displayed in the step S1006 is held. In the next step S1012 the wind on motor 5 is started and the winding on of the film F is commenced. In the step S1013 the reading out of the magnetically recorded information on the film F by the magnetic head 7 and by the magnetic read circuit 17 is started. In the next step S1014 the storage in the information storage device 28 of this magnetic information read out in the previous step S1013 is started; and then the flow of control returns to the step S1001 of the FIG. 16 flow chart.

As explained above, when the predecessor film frame and the successor film frame have been mutually associated, in this step displacement mode, during the time interval until the successor film frame comes to be positioned so as to oppose the image area 12, an image of the predecessor film frame is held (in the step S1011). Accordingly, since images of each frame in an associated set from the first film frame to the last film frame which (for example) have been shot using continuous shooting can be displayed successively in order for an interval of about 5 seconds each with no break between them, therefore a moving image presentation becomes possible, in particular in the case of film frames which have been shot using continuous shooting.

The Frame Designation Mode

Figure 18:
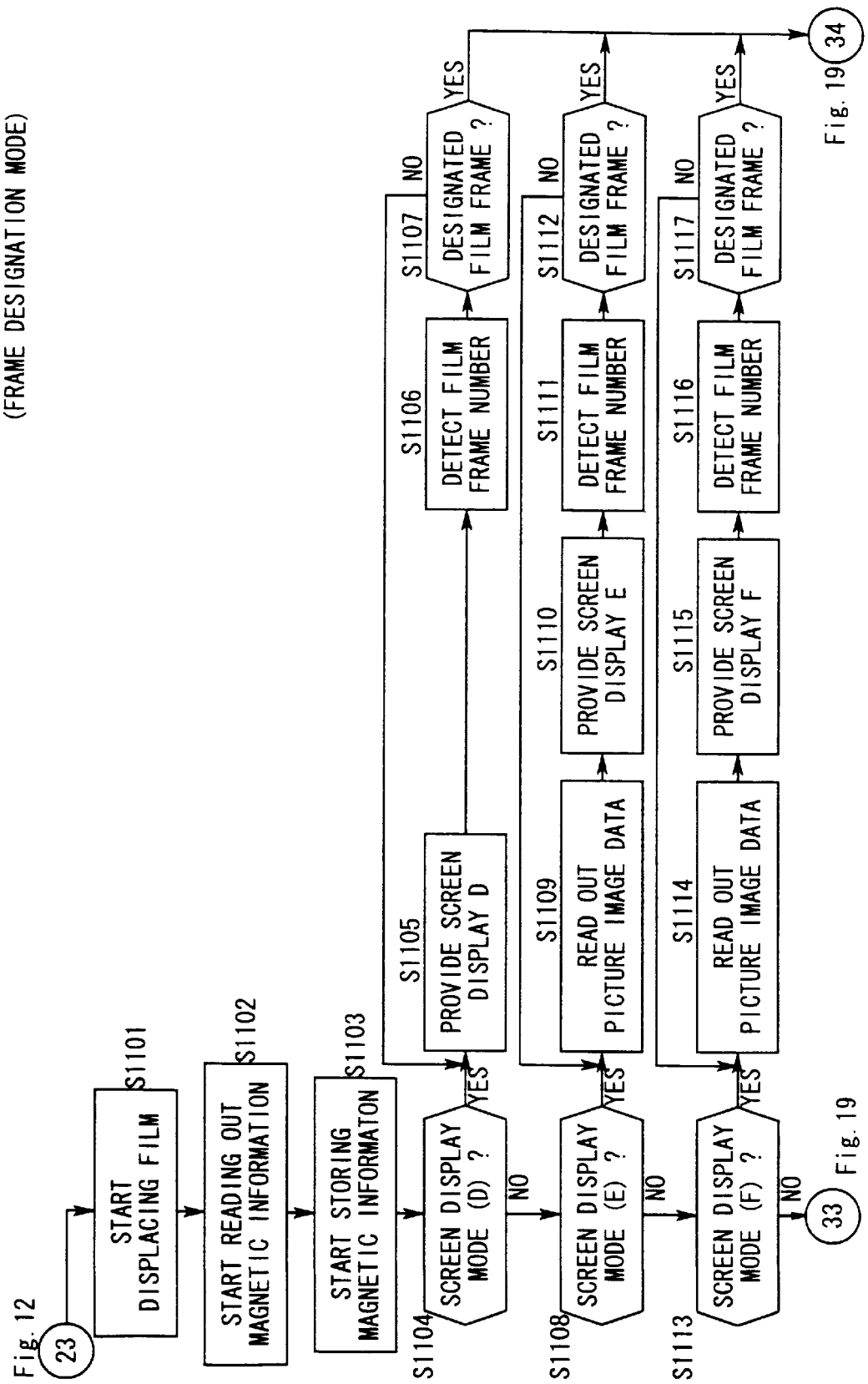
FIG. 18 is another flow chart showing another portion of the operational sequence of this preferred embodiment of the film image signal generation apparatus of the present invention.

When the frame designation mode is selected in the step S807 of the FIG. 12 flow chart, the flow of control is transferred to the step S1101 of the FIG. 18 flow chart, in which the operation of the wind on motor 5 is started so as to start the winding forwards or the rewinding of the film F. Whether the film F is to be wound forwards or backwards is determined according to which of the frame number of the film frame which currently is positioned so as to oppose the image area 12 and the frame number of the designated film frame is the greater. In the next step S1102 the reading out of magnetic information from the film F by the magnetic head 7 and by the magnetic read circuit 17 is commenced. Next in the step S1103 the magnetic information which has been read out in the previous step S1102 is stored in the information storage device 28, and the flow of control proceeds to the next step S1104.

In this step S1104 a decision is taken as to whether or not the screen display mode which is currently selected is the (D) screen display mode, and if in fact the (D) screen display mode is currently selected then the flow of control proceeds to the step S1105, while if not then the flow of control is transferred to the step S1108. In the step S1105, the screen display D is provided on the monitor 29. In the next step S1106, the frame number of the frame which is currently opposed to the image area 12 is detected from the magnetic information. And in the next step S1107 a decision is taken as to whether or not the frame number which has thus been detected in the step S1106 is equal to the number of the designated film frame, and if in fact this is the designated film frame then the flow of control is transferred to the step S1129 of the FIG. 19 flow chart, while if the designated film frame has not yet been reached then the flow of control loops back to the step S1105, so as to continue providing the display of the screen display D upon the screen of the monitor 29.

Figure 40A:
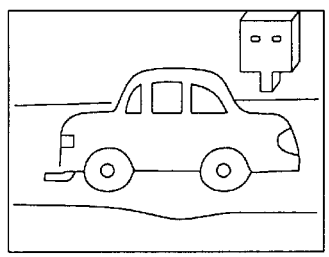
FIG. 40 is a similar figure relating to the preferred embodiment of the film image signal generation apparatus of the present invention, showing a sequence of images which are displayed in another screen display mode (E) upon a monitor during film frame forwarding, with (a) illustrating the display of a predecessor film frame, (b) illustrating the display between this predecessor film frame and a successor film frame, and (c) illustrating the display of this successor film frame.
Figure 40B:
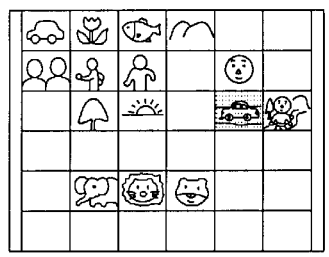
Figure 40C:
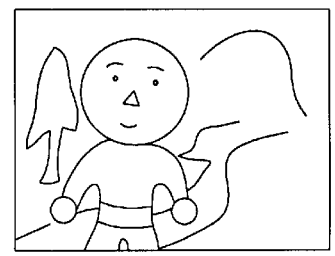
Figure 40:
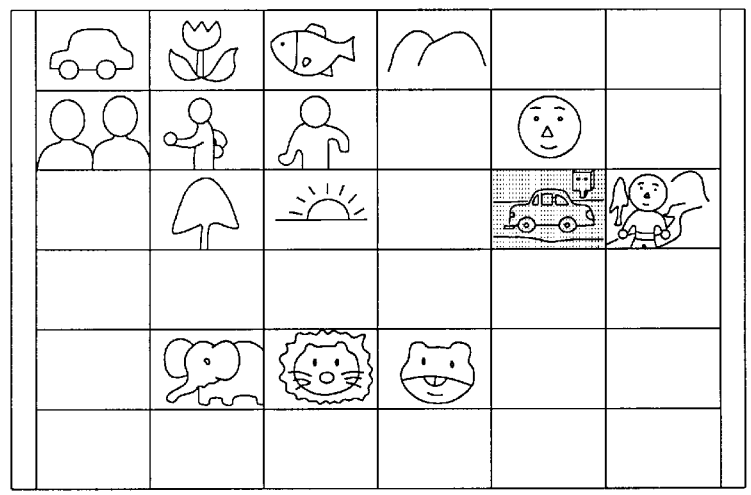

If the result of the decision in the step S1104 is NO, then in the step S1108 a decision is taken as to whether or not the screen display mode which is currently selected is the screen display mode (E), and if in fact the screen display mode (E) is currently selected then the flow of control proceeds to the step S1109, while if not then the flow of control is transferred to the step S1113. In the step S1109, the picture image data which has already been stored in the information storage device 28 is read out. In the next step S1110, the images from the film F which have been read in are processed and a series of reduced thumbnail images are generated, and the image control circuit 16 is controlled by the CPU 21 so as to provide a display in which these thumbnail images are displayed in the form of a matrix upon the monitor 29 as shown in FIG. 40(b). Those of the film frames for which images have already been read in and stored are shown by thumbnail images, while blank matrix spaces are left in correspondence to those of the film frames for which images have not yet been read in. Further, the matrix element corresponding to the film frame which currently is passing past the image area 12 is displayed as flashing. Hereinafter, this type of screen display will be referred to as the screen display E. In the next step S1111, the frame number of the frame which is currently opposed to the image area 12 is detected from the magnetic information. And in the next step S1112 a decision is taken as to whether or not the frame number which has thus been detected in the step S1111 is equal to the number of the designated film frame, and if in fact this is the designated film frame then the flow of control is transferred to the step S1129 of the FIG. 19 flow chart, while if the designated film frame has not yet been reached then the flow of control loops back to the step S1109, so as to continue providing the display of the screen display E upon the screen of the monitor 29.

Figure 19:
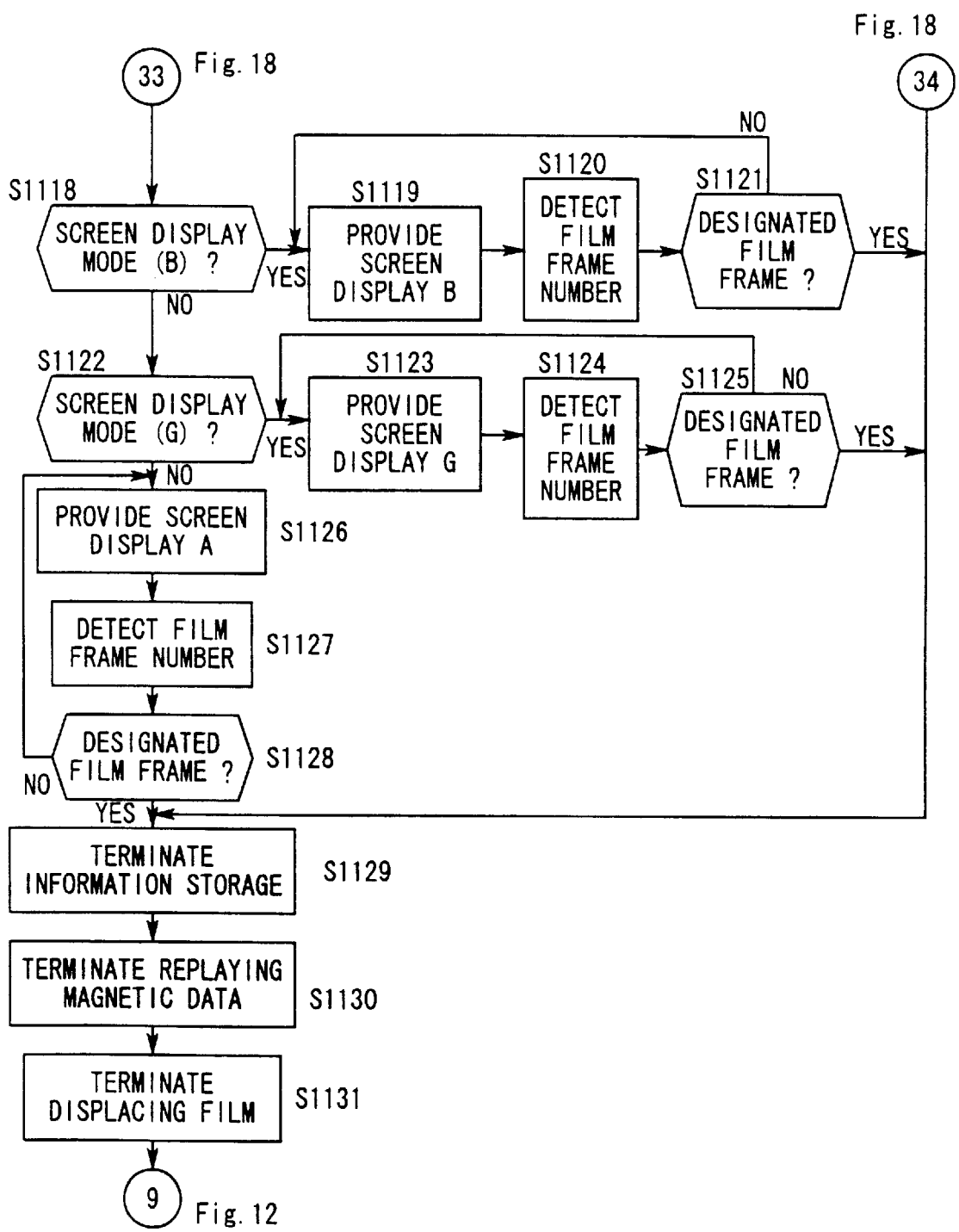
FIG. 19 is another flow chart showing another portion of the operational sequence of this preferred embodiment of the film image signal generation apparatus of the present invention.

If the result of the decision in the step S1108 is NO, then in the step S1113 a decision is taken as to whether or not the screen display mode which is currently selected is the screen display mode (F), and if in fact the screen display mode (F) is currently selected then the flow of control proceeds to the step S1114, while if not then the flow of control is transferred to the step S1118 of the FIG. 19 flow chart. In the step S1114, the picture image data which has already been stored in the information storage device 28 is read out. In the next step S1115, the images from the film F which have been read in are processed and a series of reduced thumbnail images are generated, and the image control circuit 16 is controlled by the CPU 21 so as to provide a display in which these thumbnail images are displayed in the form of a matrix upon the monitor 29 as shown in FIG. 41(b). Those of the film frames for which images have already been read in and stored are shown by thumbnail images, while in the matrix spaces which correspond to those of the film frames for which images have not yet been read in, only the frame numbers of these non available film frames are shown. Further, the matrix element corresponding to the film frame which currently is passing past the image area 12 is displayed as flashing. Hereinafter, this type of screen display will be referred to as the screen display F. In the next step S1116, the frame number of the frame which is currently opposed to the image area 12 is detected from the magnetic information. And in the next step S1117 a decision is taken as to whether or not the frame number which has thus been detected in the step S1116 is equal to the number of the designated film frame, and if in fact this is the designated film frame then the flow of control is transferred to the step S1129 of the FIG. 19 flow chart, while if the designated film frame has not yet been reached then the flow of control loops back to the step S1114, so as to continue providing the display of the screen display F upon the screen of the monitor 29.

If the result of the decision in the step S1113 is NO, then in the step S1118 of the FIG. 19 flow chart a decision is taken as to whether or not the screen display mode which is currently selected is the (B) screen display mode, and if in fact the (B) screen display mode is currently selected then the flow of control proceeds to the step S1119, while if not then the flow of control is transferred to the step S1122. In the step S1119, the screen display B is provided on the monitor 29. In the next step S1120, the frame number of the frame which is currently opposed to the image area 12 is detected from the magnetic information. And in the next step S1121 a decision is taken as to whether or not the frame number which has thus been detected in the step S1120 is equal to the number of the designated film frame, and if in fact this is the designated film frame then the flow of control is transferred to the step S1129, while if the designated film frame has not yet been reached then the flow of control loops back to the step S1119, so as to continue providing the display of the screen display B upon the screen of the monitor 29.

If the result of the decision in the step S1118 is NO, then in the step S1122 a decision is taken as to whether or not the screen display mode which is currently selected is the (G) screen display mode, and if in fact the (G) screen display mode is currently selected then the flow of control proceeds to the step S1123, while if not then the flow of control is transferred to the step S1126. In the step S1123, the screen display G is provided on the monitor 29. In the next step S1124, the frame number of the frame which is currently opposed to the image area 12 is detected from the magnetic information. And in the next step S1125 a decision is taken as to whether or not the frame number which has thus been detected in the step S1124 is equal to the number of the designated film frame, and if in fact this is the designated film frame then the flow of control is transferred to the step S1129, while if the designated film frame has not yet been reached then the flow of control loops back to the step S1123, so as to continue providing the display of the screen display G upon the screen of the monitor 29.

If the result of the decision in the step S1122 is NO, then in the step S1126 the image control circuit 16 is controlled by the CPU 21 so as to provide a display (the screen display A) upon the monitor 29 as shown in FIG. 36(b), which is blank. In the next step S1127, the frame number of the frame which is currently opposed to the image area 12 is detected from the magnetic information. And in the next step S1128 a decision is taken as to whether or not the frame number which has thus been detected in the step S1127 is equal to the number of the designated film frame, and if in fact this is the designated film frame then the flow of control is transferred to the step S1129, while otherwise the flow of control loops back to the step S1126, so as to continue providing the display of the blank screen display A upon the screen of the monitor 29. In the step S1129, since all of the magnetic information has been read in from the film F, the information storage is terminated and the flow of control proceeds to the step S1130. In the next step S1130, the reading in of magnetic information is terminated. And in the next step S1131 the wind on motor 5 is stopped in the state in which the designated film frame positioned at the image area 12 and the displacement of the film is terminated, and then the flow of control is transferred to the step S801 of the FIG. 12 flow chart.

Thus as described above, in the frame designation mode, during the time period while the film F is being displaced until the designated film frame comes to be positioned at the image area 12, the image control circuit 16 is controlled by the CPU 21 so as not to output the first picture signal S1 which is output by the CCD 14. In this manner, during the time period until an image of the designated film frame is displayed, no image of the portion of the film F which is passing past the image area 12, in other words no image of the portion of the film which is currently positioned there during the film displacement process, is displayed upon the monitor 29 (with the screen display modes (D), (E), (F), (B), (G), and (A)). Further, this time period is taken advantage of for displaying useful information upon the screen of the monitor 29 (film image modes (D), (E), (F), (B), and (G)). Furthermore, in the event that an index display showing reduced thumbnail illustrations of only the images of those frames which have already been read in is output (with the screen display modes (E) and (F)), it is possible for the operator to determine, for each film frame, whether or not it has already been viewed in this viewing session.

Moreover, although with this preferred embodiment of the film image signal generation apparatus of the present invention it was so arranged that the screen display mode (A) was selected as the default screen display mode when no screen display mode was input, as an alternative it would also be acceptable in such a case for any one of the screen display modes (D), (E), (F), (B), or (G) to be selected as the default screen display mode.

All Frames Rewind Mode

Figure 13:
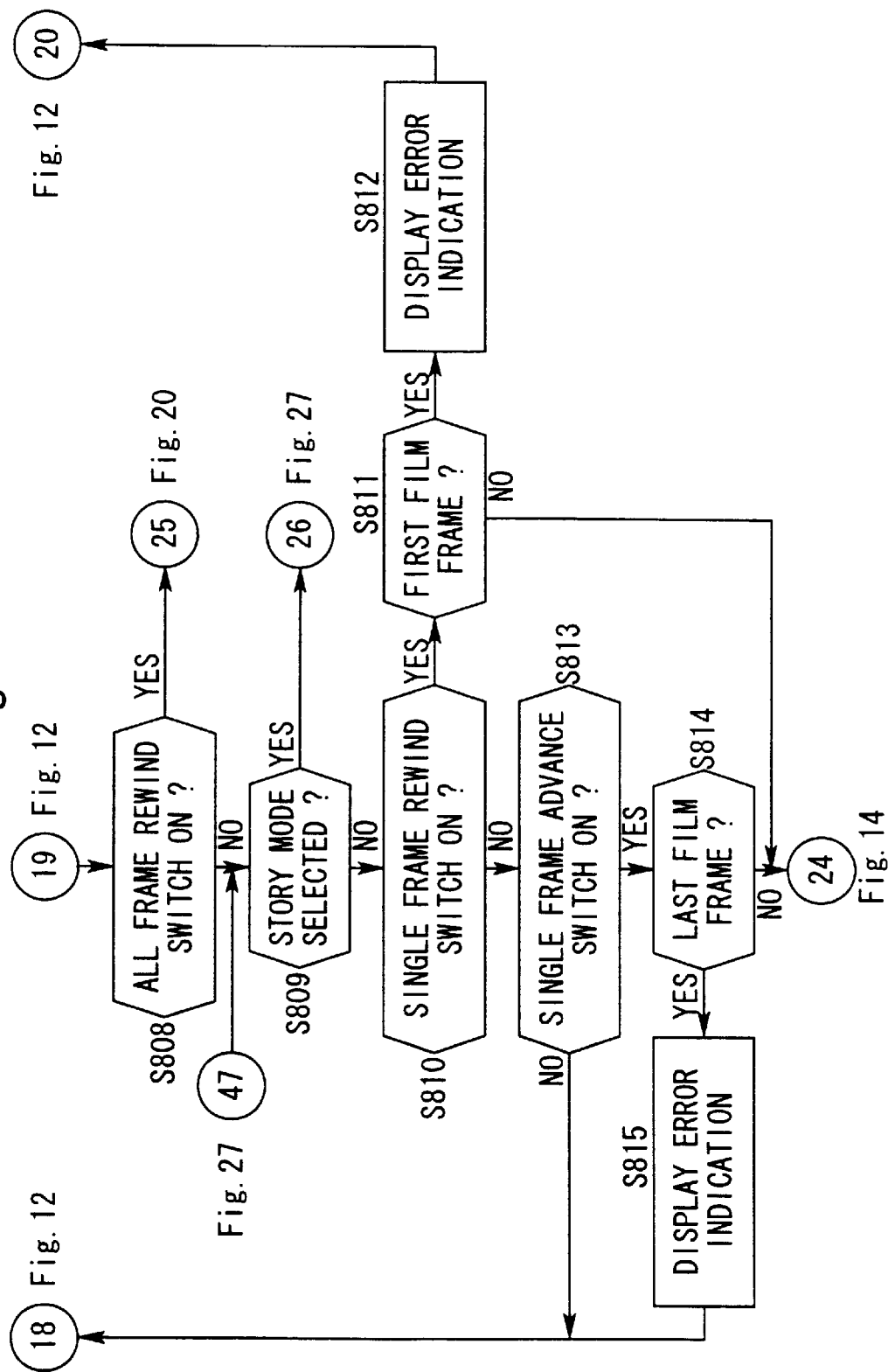
FIG. 13 is another flow chart showing another portion of the operational sequence of this preferred embodiment of the film image signal generation apparatus of the present invention.
Figure 20:
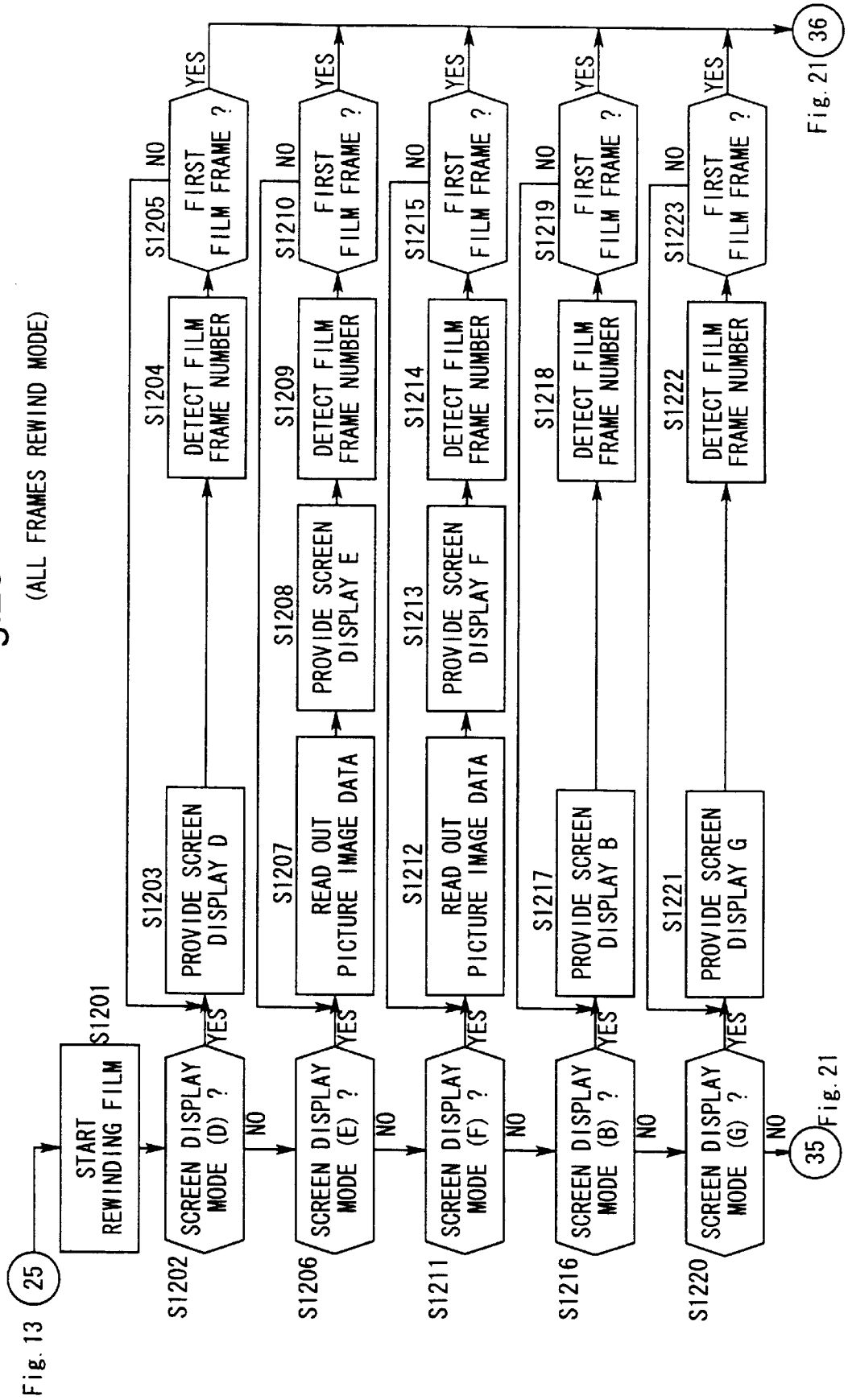
FIG. 20 is another flow chart showing another portion of the operational sequence of this preferred embodiment of the film image signal generation apparatus of the present invention.
Figure 21:
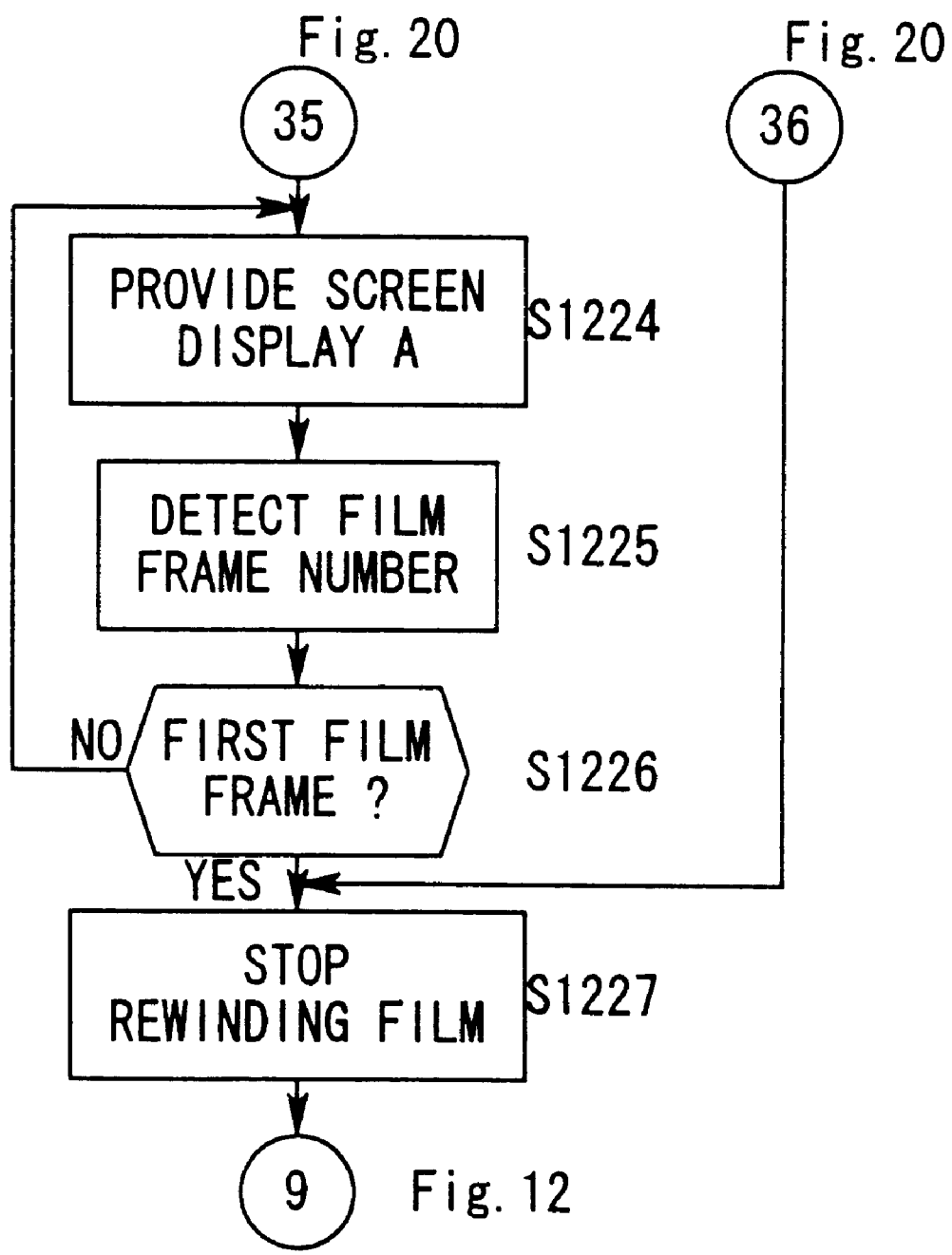
FIG. 21 is another flow chart showing another portion of the operational sequence of this preferred embodiment of the film image signal generation apparatus of the present invention.

When in the step S808 of the FIG. 13 flow chart it is decided that the all frames rewind switch is being pressed, then the flow of control is transferred to the step S1201 of the FIG. 20 flow chart, and the program whose flow chart is shown in FIGS. 20 and 21 is executed.

In this step S1201, the operation of the rewind motor 4 is started so as to start the rewinding of the film F. In the next step S1202 a decision is taken as to whether or not the screen display mode which is currently selected is the (D) screen display mode, and if in fact the (D) screen display mode is currently selected then the flow of control proceeds to the step S1203, while if not then the flow of control is transferred to the step S1206. In the step S1203, the screen display D is provided on the monitor 29. In the next step S1204, the frame number of the frame which is currently opposed to the image area 12 is detected from the magnetic information. And in the next step S1205 a decision is taken as to whether or not it has been detected in the step S1204 that it is the first film frame which is currently opposed to the image area 12, and if in fact this is the first film frame then the flow of control is transferred to the step S1227 of the FIG. 21 flow chart, while if the first film frame has not yet been reached then the flow of control loops back to the step S1203, so as to continue providing the display of the screen display D upon the screen of the monitor 29.

If the result of the decision in the step S1202 is NO, then in the step S1206 a decision is taken as to whether or not the screen display mode which is currently selected is the screen display mode (E), and if in fact the screen display mode (E) is currently selected then the flow of control proceeds to the step S1207, while if not then the flow of control is transferred to the step S1211. In the step S1207, the picture image data which has already been stored in the information storage device 28 is read out. In the next step S1208, the screen display E is provided on the monitor 29. In the next step S1209, the frame number of the frame which is currently opposed to the image area 12 is detected from the magnetic information. And in the next step S1210 a decision is taken as to whether or not the frame whose number which has thus been detected in the step S1209 is the first film frame, and if in fact this is the first film frame then the flow of control is transferred to the step S1227 of the FIG. 21 flow chart, while if the first film frame has not yet been reached then the flow of control loops back to the step S1207, so as to continue providing the display of the screen display E upon the screen of the monitor 29.

If the result of the decision in the step S1206 is NO, then in the step S1211 a decision is taken as to whether or not the screen display mode which is currently selected is the screen display mode (F), and if in fact the screen display mode (F) is currently selected then the flow of control proceeds to the step S1212, while if not then the flow of control is transferred to the step S1216. In the step S1212, the picture image data which has already been stored in the information storage device 28 is read out. In the next step S1213, the screen display F is provided on the monitor 29. In the next step S1214, the frame number of the frame which is currently opposed to the image area 12 is detected from the magnetic information. And in the next step S1215 a decision is taken as to whether or not the frame whose number which has thus been detected in the step S1214 is the first film frame, and if in fact this is the first film frame then the flow of control is transferred to the step S1227 of the FIG. 21 flow chart, while if the first film frame has not yet been reached then the flow of control loops back to the step S1212, so as to continue providing the display of the screen display F upon the screen of the monitor 29.

If the result of the decision in the step S1211 is NO, then in the step S1216 a decision is taken as to whether or not the screen display mode which is currently selected is the screen display mode (B), and if in fact the screen display mode (B) is currently selected then the flow of control proceeds to the step S1217, while if not then the flow of control is transferred to the step S1220. In the step S1217, a picture signal S for the screen display B is output to the monitor 29. In the next step S1218, the frame number of the frame which is currently opposed to the image area 12 is detected from the magnetic information. And in the next step S1219 a decision is taken as to whether or not the frame whose number which has thus been detected in the step S1218 is the first film frame, and if in fact this is the first film frame then the flow of control is transferred to the step S1227 of the FIG. 21 flow chart, while if the first film frame has not yet been reached then the flow of control loops back to the step S1217, so as to continue providing the display of the screen display B upon the screen of the monitor 29.

If the result of the decision in the step S1216 is NO, then in the step S1220 a decision is taken as to whether or not the screen display mode which is currently selected is the screen display mode (G), and if in fact the screen display mode (G) is currently selected then the flow of control proceeds to the step S1221, while if not then the flow of control is transferred to the step S1224 of the FIG. 21 flow chart. In the step S1221, the screen display G is provided upon the monitor 29. In the next step S1222, the frame number of the frame which is currently opposed to the image area 12 is detected from the magnetic information. And in the next step S1223 a decision is taken as to whether or not the frame whose number which has thus been detected in the step S1222 is the first film frame, and if in fact this is the first film frame then the flow of control is transferred to the step S1227 of the FIG. 21 flow chart, while if the first film frame has not yet been reached then the flow of control loops back to the step S1221, so as to continue providing the display of the screen display G upon the screen of the monitor 29.

If the result of the decision in the step S1220 is NO, then in the step S1224 of the FIG. 21 flow chart as shown in FIG. 36(b) a blank screen (the screen display A) is displayed upon the monitor 29. In the next step S1225, the frame number of the frame which is currently opposed to the image area 12 is detected from the magnetic information. And in the next step S1226 a decision is taken as to whether or not the frame whose number which has thus been detected in the step S1225 is the first film frame, and if in fact this is the first film frame then the flow of control is transferred to the step S1227, while if the first film frame has not yet been reached then the flow of control loops back to the step S1224, so as to continue providing the display of the blank screen display A upon the screen of the monitor 29. And in the step S1227 the operation of the rewind motor 4 is stopped so as to stop the rewinding of the film F in the state with the first film frame opposed to the image area 12; and then the flow of control returns to the step S801 of the FIG. 12 flow chart.

Thus as described above, when the all frames rewind switch is pressed, during the time period while the film F is being rewound until the first film frame comes to be positioned at the image area 12, the image control circuit 16 is controlled by the CPU 21 so as not to output the first picture signal S1. In this manner, during the time period until an image of the first film frame is displayed, no image of the portion of the film F which is passing past the image area 12, in other words no image of the portion of the film which is currently positioned there during the film rewinding process, is displayed upon the monitor 29 (with the screen display modes (D), (E), (F), (B), (G), and (A)). Further, it is possible to take advantage of this time period to display certain information upon the monitor 29, as desired (with the screen display modes (D), (E), (F), (B), and (G)). Yet further, in the event that an index display showing reduced thumbnail illustrations of only the images of those frames which have already been read in is output (with the screen display modes (E) and (F)), it is possible for the operator to determine, for each film frame, whether or not it has already been viewed in this viewing session.

Moreover, although with this preferred embodiment of the film image signal generation apparatus of the present invention it was so arranged that the screen display mode (A) was selected as the default screen display mode when no screen display mode was input, as an alternative it would also be acceptable in such a case for any one of the screen display modes (D), (E), (F), (B), or (G) to be selected as the default screen display mode.

Film Cartridge Removal

If in the step S806 of FIG. 12 it is decided that the film cartridge removal switch is being pressed in order to command removal of the film cartridge which is currently loaded, then the flow of control is transferred to the step S1301, and the program whose flow chart is shown in FIGS. 22 through 26 is executed.

In the step S1301, the operation of the rewind motor 4 or the wind on motor 5 is started so as to start the displacement of the film F. The direction for displacement of the film F, i.e. whether the film F is wound forwards or is rewound, depends upon the relative magnitude of the frame number of the current film frame which is opposed to the image area 12 at the present time and the number of the highest film frame for which amendment to, addition to, or deletion from the magnetically recorded information pertaining thereto has been performed. In the next step S1302 a decision is taken as to whether or not the screen display mode which is currently selected is the (J) screen display mode, and if in fact the (J) screen display mode is currently selected then the flow of control proceeds to the step S1303, while if not then the flow of control is transferred to the step S1306. In the step S1303, the frame numbers of the film frames for which amendment to, addition to, or deletion from the magnetically recorded information has been performed are shown upon the monitor 29, as shown in FIG. 44(a); hereinafter, this type of screen display will be termed the screen display J. In the next step S1304, the frame number of the frame which is currently opposed to the image area 12 is detected from the magnetic information. And in the next step S1305 a decision is taken as to whether or not this number of the film frame which is currently opposed to the image area 12 is equal to that of the highest numbered film frame among those film frames for which amendment to, addition to, or deletion from the magnetically recorded information has been performed; and if in fact this is the highest numbered such film frame then the flow of control is transferred to the step S1323 of the FIG. 23 flow chart, while if the highest numbered such film frame has not yet been reached then the flow of control loops back to the step S1303, so as to continue providing the display of the screen display J upon the screen of the monitor 29.

If the result of the decision in the step S1302 is NO, then in the step S1306 a decision is taken as to whether or not the screen display mode which is currently selected is the (K) screen display mode, and if in fact the (K) screen display mode is currently selected then the flow of control proceeds to the step S1307, while if not then the flow of control is transferred to the step S1310. In the step S1307, all of the film frame numbers are displayed in a matrix upon the monitor 29, with the frame numbers of the film frames for which amendment to, addition to, or deletion from the magnetically recorded information has been performed being shown as flashing, as shown in FIG. 44(b); hereinafter, this type of screen display will be termed the screen display K. In the next step S1308, the frame number of the frame which is currently opposed to the image area 12 is detected from the magnetic information. And in the next step S1309 a decision is taken as to whether or not this number of the film frame which is currently opposed to the image area 12 is equal to that of the highest numbered film frame among those film frames for which amendment to, addition to, or deletion from the magnetically recorded information has been performed; and if in fact this is the highest numbered such film frame then the flow of control is transferred to the step S1323 of the FIG. 23 flow chart, while if the highest numbered such film frame has not yet been reached then the flow of control loops back to the step S1307, so as to continue providing the display of the screen display K upon the screen of the monitor 29.

Figure 23:
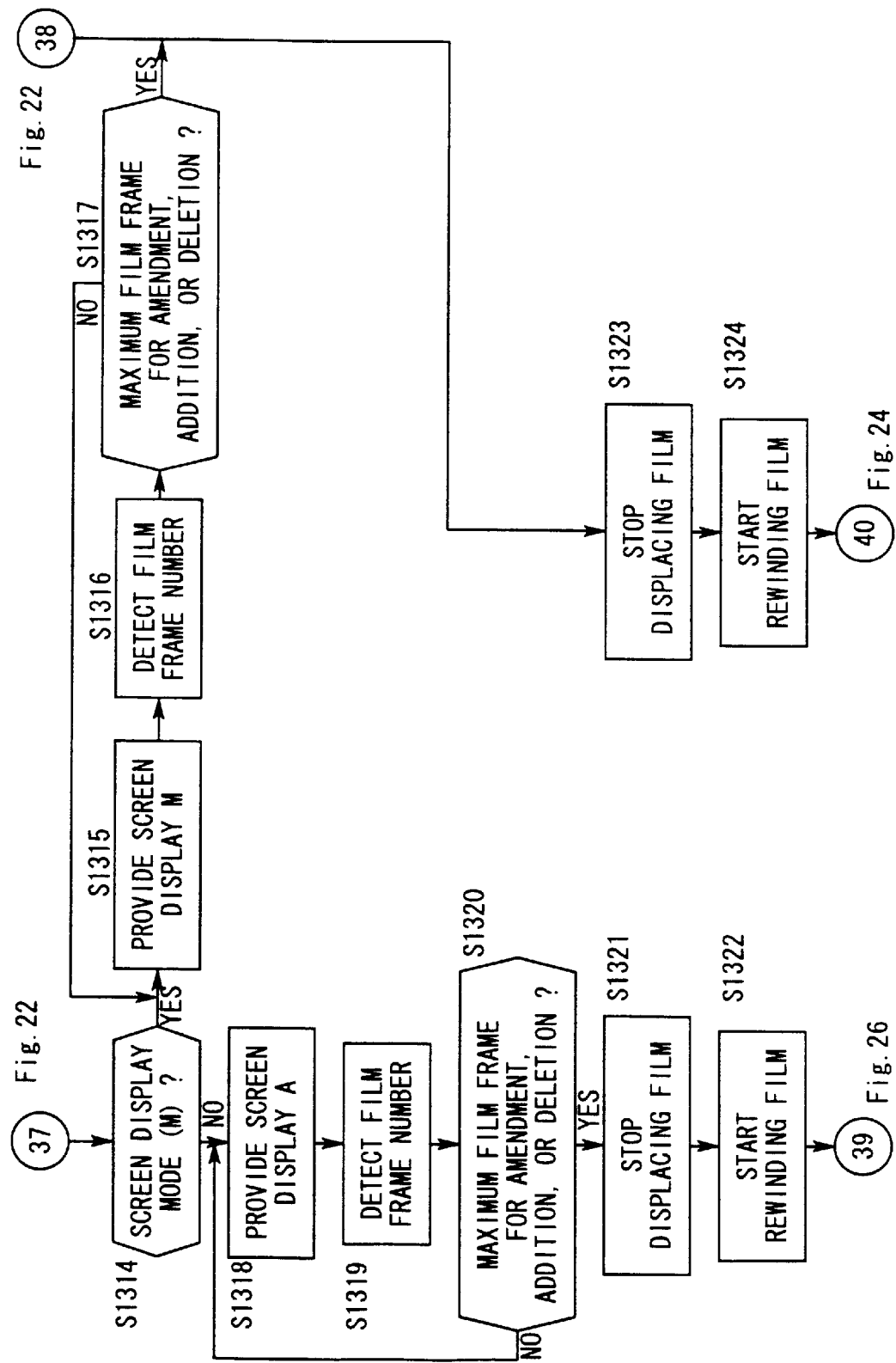
FIG. 23 is another flow chart showing another portion of the operational sequence of this preferred embodiment of the film image signal generation apparatus of the present invention.
Figure 24:
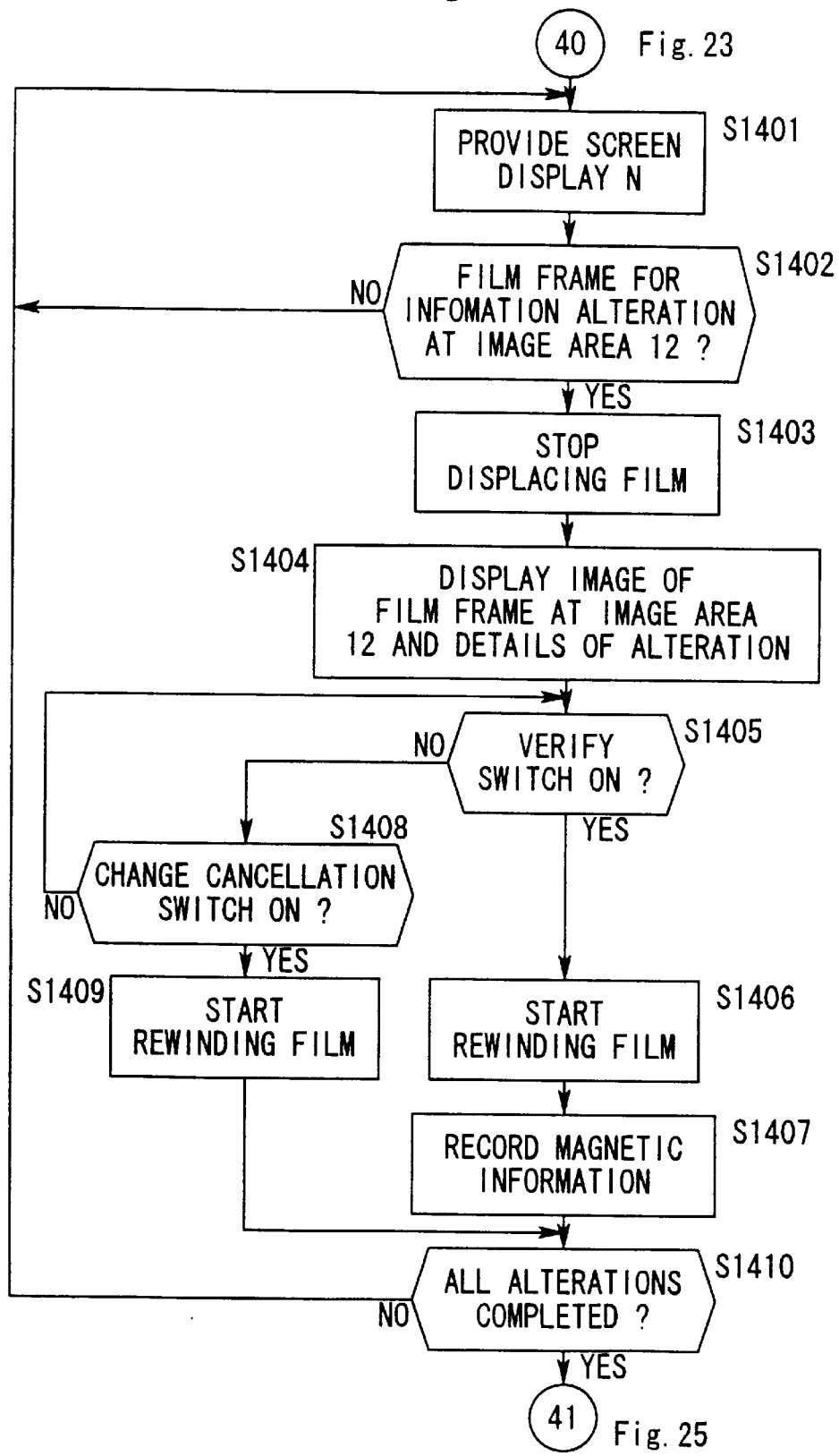
FIG. 24 is another flow chart showing another portion of the operational sequence of this preferred embodiment of the film image signal generation apparatus of the present invention.

If the result of the decision in the step S1306 is NO, then in the step S1310 a decision is taken as to whether or not the screen display mode which is currently selected is the (L) screen display mode, and if in fact the (L) screen display mode is currently selected then the flow of control proceeds to the step S1311, while if not then the flow of control is transferred to the step S1314 of the FIG. 23 flow chart. In the step S1311, reduced thumbnail illustrations of some of the film frames (those film frames for which image data has already been read in and is therefore available) and the frame numbers of the others are displayed in a matrix upon the monitor 29, with the items corresponding to the film frames for which amendment to, addition to, or deletion from the magnetically recorded information has been performed being shown as flashing, as shown in FIG. 44(c); hereinafter, this type of screen display will be termed the screen display L. In the next step S1312, the frame number of the frame which is currently opposed to the image area 12 is detected from the magnetic information. And in the next step S1313 a decision is taken as to whether or not this number of the film frame which is currently opposed to the image area 12 is equal to that of the highest numbered film frame among those film frames for which amendment to, addition to, or deletion from the magnetically recorded information has been performed; and if in fact this is the highest numbered such film frame then the flow of control is transferred to the step S1323 of the FIG. 23 flow chart, while if the highest numbered such film frame has not yet been reached then the flow of control loops back to the step S1311, so as to continue providing the display of the screen display L upon the screen of the monitor 29.

If the result of the decision in the step S1310 is NO, then in the step S1314 of the FIG. 23 flow chart a decision is taken as to whether or not the screen display mode which is currently selected is the (M) screen display mode, and if in fact the (M) screen display mode is currently selected then the flow of control proceeds to the step S1315, while if not then the flow of control is transferred to the step S1318. In the step S1315, the frame numbers of the film frames for which amendment to, addition to, or deletion from the magnetically recorded information has been performed are displayed upon the monitor 29, along with the details of the amendment, addition, or deletion, as shown in FIG. 44(d); hereinafter, this type of screen display will be termed the screen display M. In the next step S1316, the frame number of the frame which is currently opposed to the image area 12 is detected from the magnetic information. And in the next step S1317 a decision is taken as to whether or not this number of the film frame which is currently opposed to the image area 12 is equal to that of the highest numbered film frame among those film frames for which amendment to, addition to, or deletion from the magnetically recorded information has been performed; and if in fact this is the highest numbered such film frame then the flow of control is transferred to the step S1323, while if the highest numbered such film frame has not yet been reached then the flow of control loops back to the step S1315, so as to continue providing the display of the screen display M upon the screen of the monitor 29.

If the result of the decision in the step S1314 is NO, then in the step S1318 as shown in FIG. 36(b) a blank screen (the screen display A) is displayed upon the monitor 29. In the next step S1319, the frame number of the frame which is currently opposed to the image area 12 is detected from the magnetic information. And in the next step S1320 a decision is taken as to whether or not this number of the film frame which is currently opposed to the image area 12 is equal to that of the highest numbered film frame among those film frames for which amendment to, addition to, or deletion from the magnetically recorded information has been performed; and if in fact this is the highest numbered such film frame then the flow of control is transferred to the step S1321, while if the highest numbered such film frame has not yet been reached then the flow of control loops back to the step S1318, so as to continue providing the display of the blank screen display A upon the screen of the monitor 29.

And in the step S1321 the operation of the wind on motor 5 is stopped so as to stop the displacement of the film F. Then in the next step S1322 the rewind motor 4 is started, so as to start the rewinding of the film F, and the flow of control is transferred to the step S1501 of the FIG. 26 flow chart. In the step S1323 the operation of the rewind motor 4 or of the wind on motor 5 is stopped in the state in which the highest numbered film frame among those film frames for which amendment to, addition to, or deletion from the magnetically recorded information has been performed is opposed to the image area 12, and then the flow of control continues to the next step S1324. In this step S1324, the rewind motor 4 is started, so as to start the rewinding of the film F, and the flow of control is transferred to the step S1401 of the FIG. 24 flow chart.

When as described above the film cartridge removal switch is pressed, first, in the steps S1301 through S1324, the film F is displaced (is either wound forwards or backwards) until the highest numbered film frame among those film frames for which amendment to, addition to, or deletion from the magnetically recorded information has been performed is brought to oppose the image area 12. During this displacement, the film frames for which the magnetic information has been altered, and/or the details of the required alterations for the magnetic information, are displayed upon the monitor 29, as explained above with reference to the screen display modes (J), (K), (L), and (M).

Moreover, although with this preferred embodiment of the film image signal generation apparatus of the present invention it was so arranged that in these operational circumstances the screen display mode (A) was selected as the default screen display mode when no screen display mode was input, as an alternative it would also be acceptable in such a case for any one of the screen display modes (J), (K), (L), or (M) to be selected as the default screen display mode. In such a case, when the screen display mode (A) is input, the flow of control should be transferred to the step S1501 of the FIG. 26 flow chart, while when any one of the screen display modes (J), (K), (L), or (M) is selected the flow of control should be transferred to the step S1401 of the FIG. 24 flow chart.

In this step S1401, a list is displayed upon the monitor 29 of the frame numbers of the film frames for which amendment to, addition to, or deletion from the magnetically recorded information has been performed, along with the details of the amendment, addition, or deletion, as shown in FIGS. 44(a) and 44(c); and the frame for which magnetic recording is next to be performed is shown as flashing. Hereinafter, this type of screen display will be termed the screen display N. In the next step S1402, a decision is taken as to whether or not the frame for which the magnetic information is to be altered is currently positioned to oppose the image area 12, and if it is then the flow of control proceeds to the step S1403, while if the frame for which the magnetic information is to be altered has not yet reached the image area 12 then the flow of control loops back to the step S1401. In the next step S1403, since the frame for which the magnetic information is to be altered is currently positioned to oppose the image area 12, the rewind motor 4 is stopped, so that the displacement of the film is stopped. In the next step S1404, an image of the film frame which is currently positioned to oppose the image area 12 is output upon the monitor 29. Further, at the same time, as shown in FIG. 45(b), the number of this current film frame for which the magnetic information is to be rewritten and the details of the required alterations to the magnetic information for this current film frame are displayed upon the monitor 29 as a legend superimposed upon the film frame display. By doing this, it is possible for the operator to check whether or not the alteration to the magnetic information for this film frame is correct.

In the step S1405 a decision is taken as to whether or not a verify switch is being pressed, and if it is on then the flow of control proceeds to the step S1406, while if this verify switch is not being pressed then the flow of control is transferred to the step S1408. In the step S1406, the rewind motor 4 is operated so as to start rewinding the film F. In the next step S1407, the magnetic information which should be amended, added, or deleted for this film frame is rewritten onto the film F by the magnetic head 7 under the control of the magnetic write circuit 18. On the other hand, in the step S1408 a decision is taken as to whether or not a change cancellation switch is being pressed, and if it is being pressed then the flow of control continues to the step S1409, while if this change cancellation switch is not being pressed then the flow of control loops back to the step S1405. In the step S1409 the rewind motor 4 is operated so as to start rewinding the film F. And in the next step S1410 a decision is taken as to whether or not all required amendments to, additions to, or deletions from the magnetic information for all of the film frames for which such alterations are required have been completed, and if so then the flow of control is transferred to the step S1411 of the FIG. 25 flow chart, while if at least one film frame still remains for which the alteration to the magnetic information has not yet been executed then the flow of control loops back to the step S1401, so that the operations detailed above in the steps S1401 through S1410 are repeated for the next film frame whose magnetic information is to be altered.

Figure 25:
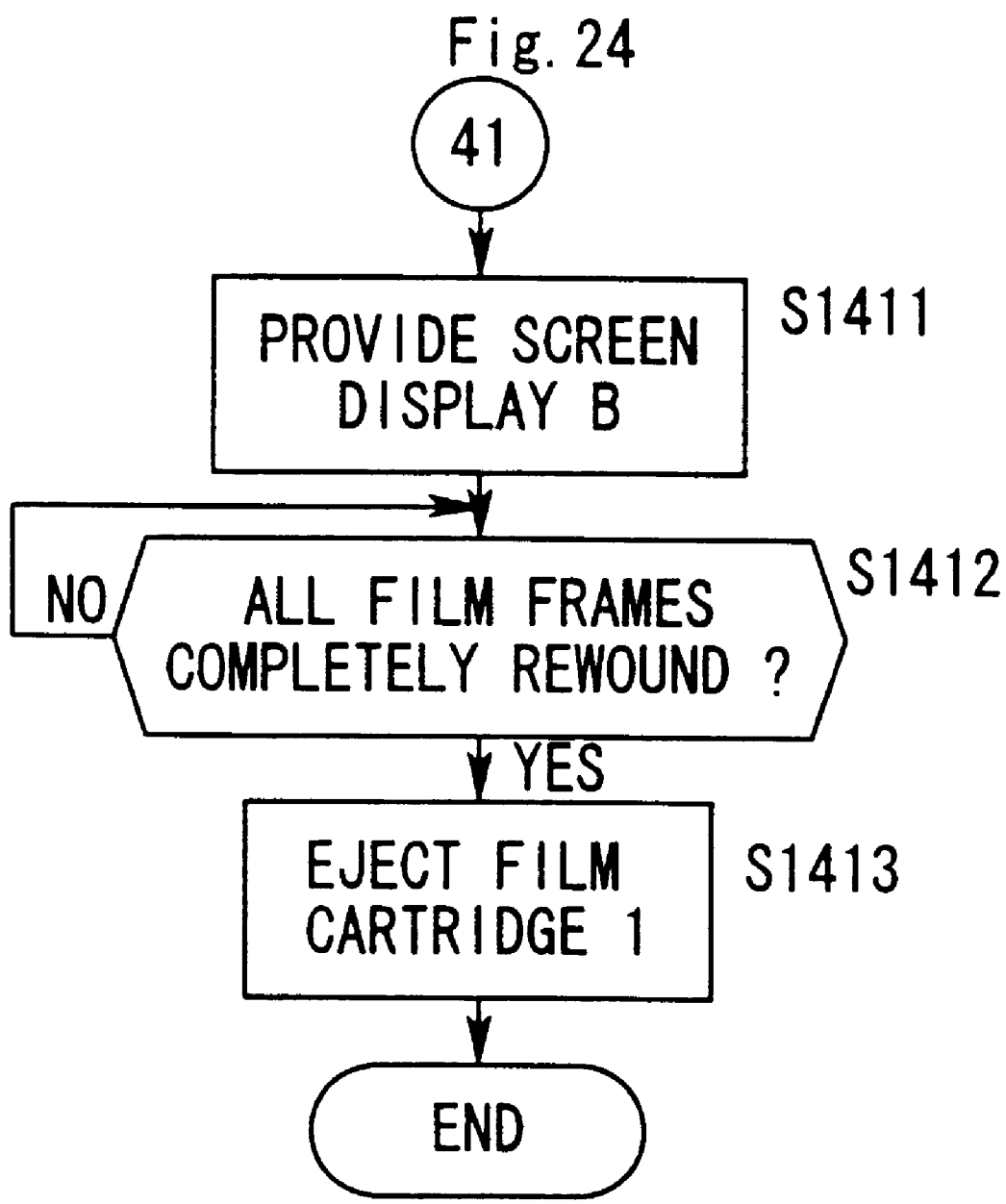
FIG. 25 is another flow chart showing another portion of the operational sequence of this preferred embodiment of the film image signal generation apparatus of the present invention.

In the step S1411 of the FIG. 25 flow chart, the screen display B is provided. In the next step S1412, the system loops round to wait until the film F has been completely rewound through all of the film frames thereof. After all of the film frames have been rewound, in the next step S1413 ejection operation for the film cartridge 1 is performed, and then this operational sequence terminates.

As described above, the magnetic information for each of the film frames for which amendment to, addition to, or deletion from its magnetic information is required is rewritten in the steps S1401 through S1413 while the film is being rewound. In the step S1401, each time the rewriting for one film frame is completed, the frame for which the magnetic information has been rewritten and its magnetic information are displayed. Further, in the step S1404, the details of the rewritten magnetic information are displayed along with an image of the frame. Accordingly, the operator can check whether or not to perform the rewriting of the magnetic information by observing these displays. If no rewriting of this film frame is required, then he can skip past this film frame, so as to rewrite the next film frame.

Figure 26:
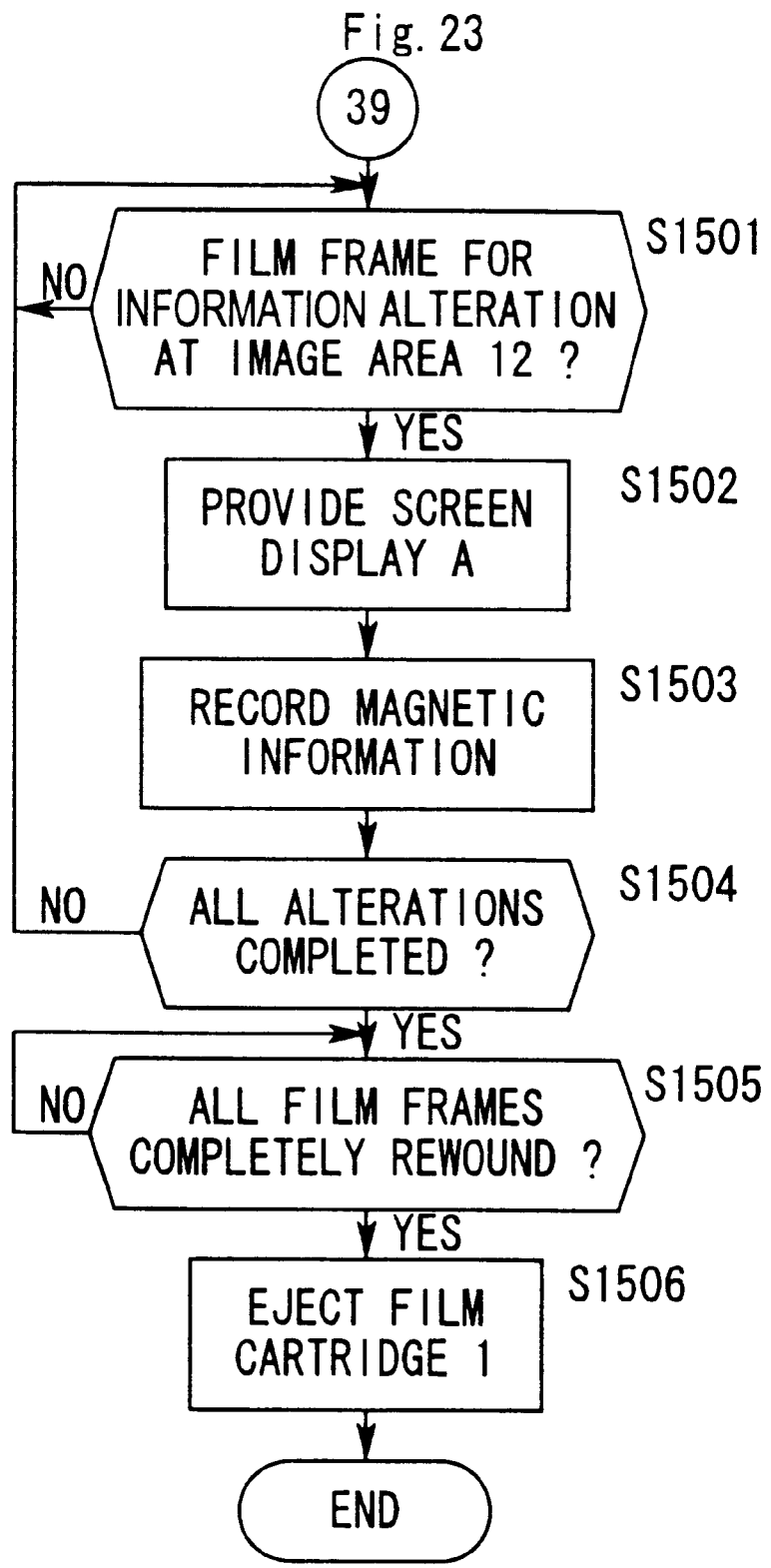
FIG. 26 is another flow chart showing another portion of the operational sequence of this preferred embodiment of the film image signal generation apparatus of the present invention.

In the step S1501 of the FIG. 26 flow chart, the system loops around to wait until a film frame for which amendment to, addition to, or deletion from its magnetic information is required is currently positioned so as to be opposed to the image area 12, and when this condition is satisfied the flow of control proceeds to the next step S1502. In this step S1502, as shown in FIG. 36(b), a blank screen (the screen display A) is displayed upon the monitor 29. In the next step S1503, the magnetic information which should be amended, added, or deleted for this film frame is rewritten onto the film F by the magnetic head 7 under the control of the magnetic write circuit 18. In the next step S1504, a decision is taken as to whether or not all required amendments to, additions to, or deletions from the magnetic information for all of the film frames for which such alterations are required have been completed, and if so then the flow of control proceeds to the next step S1505, while if at least one film frame still remains for which the alteration to the magnetic information has not yet been executed then the flow of control loops back to the step S1501, so that the operations detailed above in the steps S1501 through S1504 are repeated for the next film frame whose magnetic information is to be altered. In the next step S1505, the system loops around to continue with rewinding the film F until all of the film frames have been rewound. In the final step S1506, ejection operation for the film cartridge 1 is performed, and then this operational sequence terminates.

According to this preferred embodiment of the film image signal generation apparatus of the present invention, when the film cartridge eject switch is pressed, the rewriting of the portions of the magnetic information upon the film which are required to be altered is performed while the film F is being rewound directly before ejecting the film cartridge 1; but this is not to be considered as essential to the concept of the present invention; it would also be possible, as an alternative, for the magnetic information upon the film to be rewritten when a separately provided magnetic information record switch was actuated in order to command such information rewriting. After the rewriting of the magnetic information had been completed at the command of such a magnetic information record switch, it would be acceptable, for instance, for the first film frame to be left positioned at the image area 12; or, alternatively, it would also be acceptable for the film frame for which alteration to its magnetic information was required which had the lowest frame number to be left positioned at the image area 12.

Further, although the explanation of this preferred embodiment of the film image signal generation apparatus of the present invention has been made in terms of the rewriting of the portions of the magnetic information upon the film which are required to be altered being performed while the film F is being rewound, it would also be possible, as an alternative, for the rewriting of these portions of the magnetic information upon the film to be performed while the film F is being wound forwards. Moreover, it is not absolutely necessary for the rewriting of all of the items of magnetic information for which rewriting is required to be performed all at once, as was the case with the shown preferred embodiment of the film image signal generation apparatus of the present invention; alternatively, it would be acceptable for the items of magnetic information to be rewritten piece by piece, as they are input. Furthermore, although with the preferred embodiment of the film image signal generation apparatus of the present invention the details of the amendments to, additions to, or deletions from each item of the magnetic information were shown upon the monitor 29 when the corresponding magnetic recording was being performed, this is not to be considered as limitative of the present invention; it would also be possible, as an alternative, for example, for a list of these details of alteration to the various items of magnetic information to be shown at any time when a separately provided switch was pressed. Still further, in this disclosed preferred embodiment, since the reading out of the magnetic information is performed while the film is being wound forwards, it would be acceptable for no reading out of the magnetic information to be performed while the film was being rewound. Even further, it would also be acceptable to perform reading out of the magnetic information when the film was being rewound as well, so as to check the data which was read out against the version thereof which was read out when the film was being wound forwards.

Film Displacement Mode E

The operational sequence when the story mode is selected is shown in FIGS. 27 through 34. In the step S1601 of the FIG. 27 flow chart, which is reached from the step S809 of the FIG. 13 flow chart, a decision is taken as to whether or not the story composition mode is currently selected, and if in fact it is then the flow of control is transferred to the step S1603, while if the story composition mode is not currently selected then the flow of control continues to the step S1602. In this step S1602, a decision is taken as to whether or not the story replay mode is currently selected, and if in fact it is then the flow of control is transferred to the step S1901 of the FIG. 33 flow chart, while if the story replay mode is not currently selected then the flow of control returns to the step S809 of the FIG. 13 flow chart. In the step S1603, the wind on motor 5 is started and the winding on of the film F is commenced, and then the flow of control is transferred to the step S1608 of the FIG. 28 flow chart.

Figure 27:
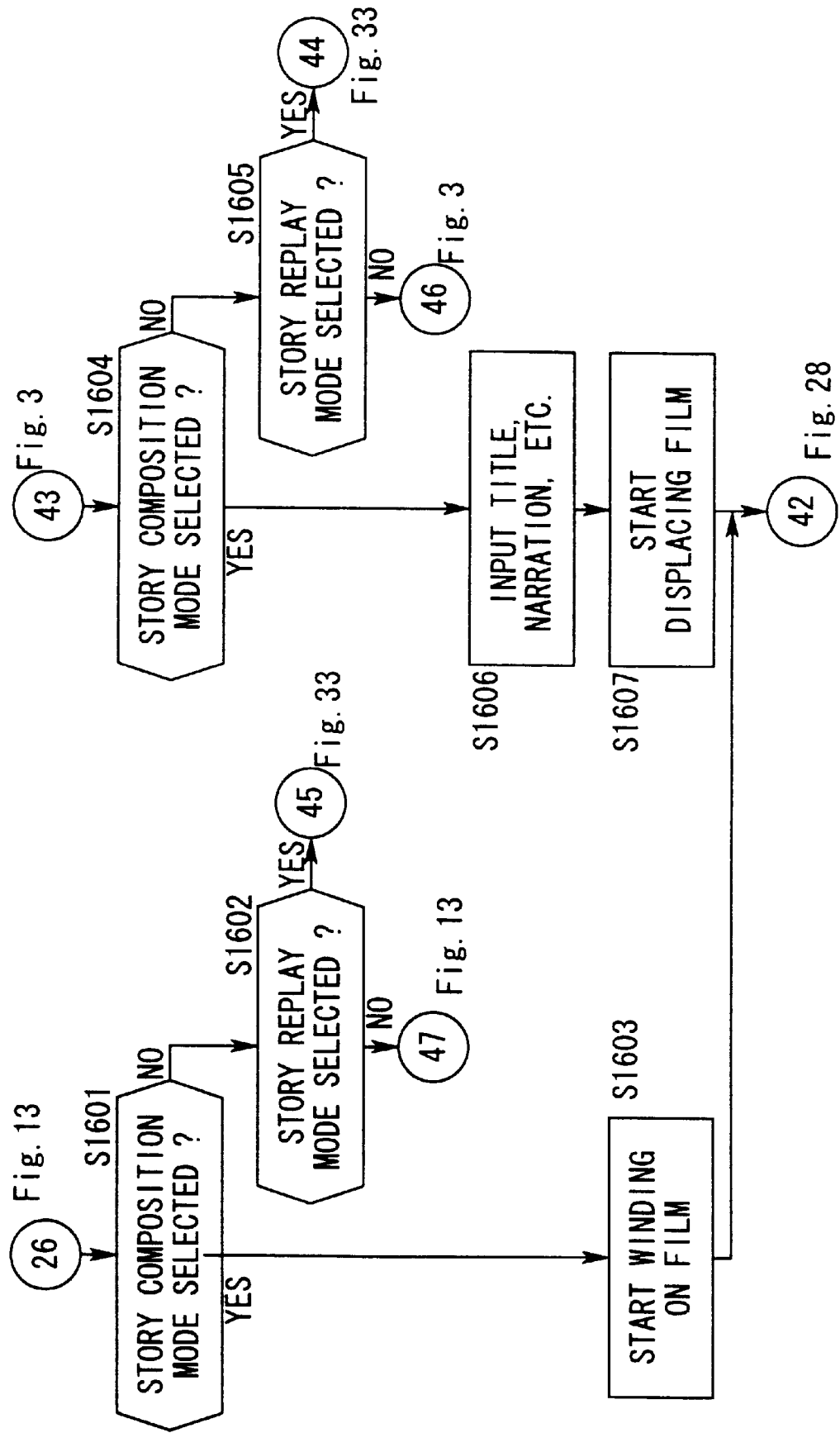
FIG. 27 is another flow chart showing another portion of the operational sequence of this preferred embodiment of the film image signal generation apparatus of the present invention.
Figure 28:
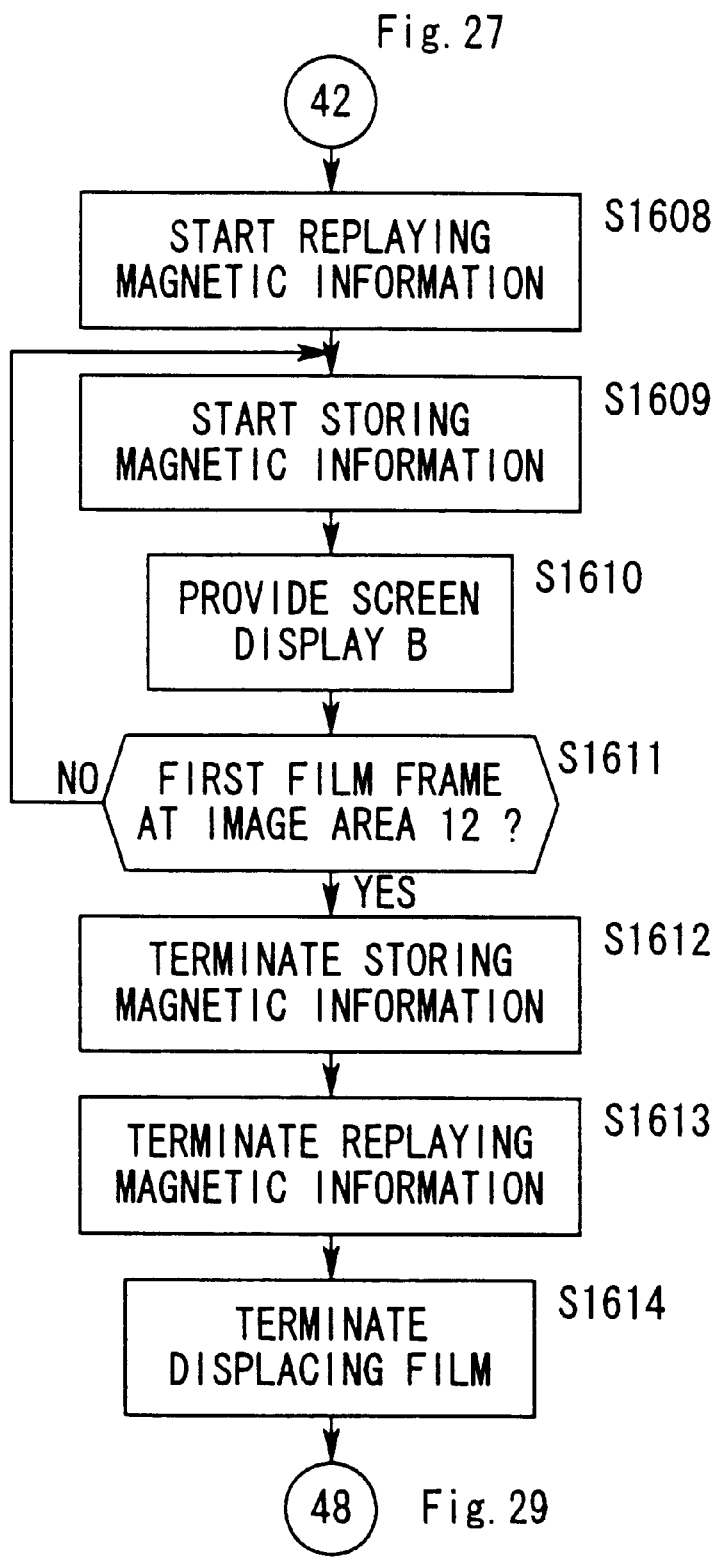
FIG. 28 is another flow chart showing another portion of the operational sequence of this preferred embodiment of the film image signal generation apparatus of the present invention.

On the other hand, in the step S1604 of the FIG. 27 flow chart, which is reached from the step S311 of the FIG. 3 flow chart, a decision is taken as to whether or not the story composition mode is currently selected, and if in fact it is then the flow of control is transferred to the step S1606, while if the story composition mode is not currently selected then the flow of control continues to the step S1605. In this step S1605, a decision is taken as to whether or not the story replay mode is currently selected, and if in fact it is then the flow of control is transferred to the step S1903 of the FIG. 33 flow chart, while if the story replay mode is not currently selected then the flow of control returns to the step S311 of the FIG. 3 flow chart. In the step S1606, the title, the narration, etc. for this story are input via the information input device 27 and are stored in the information storage device 28, and then the flow of control continues to the next step S1607. In this step S1607, the rewind motor 4 and the wind on motor 5 are started and the displacement of the film F is commenced, and then the flow of control is transferred to the step S1608 of the FIG. 28 flow chart. In this step S1608, the reading out of magnetic information from the film F by the magnetic head 7 and by the magnetic read circuit 17 is commenced. Next in the step S1609 the magnetic information which has been read out in the previous step S1608 is stored in the information storage device 28, and the flow of control proceeds to the next step S1610. In this step S1610, as shown in FIG. 37(*b*), a display (the screen display B) is provided upon the monitor 29 which says that the film is being forwarded and which displays the frame number which designates the portion of the film which is currently closest to the image area 12. In the next step S1611 the system loops back to the previous step S1610 so as to continue providing the screen display B, until the first film frame has arrived to oppose the image area 12; and when the first film frame is opposed to the image area 12 then the flow of control continues to the next step S1612. In this step S1612, the storage of the magnetic information is terminated since now it has all been read in, and the flow of control continues to the next step S1613. In this step S1613, the reading out of the magnetic information is terminated, and the flow of control continues to the next step S1614. In this step S1614, the wind on motor 5 is stopped in this current state with the first film frame being opposed to the image area 12, and the displacement of the film is terminated. And finally the flow of control is transferred to the step S1701 of the FIG. 29 flow chart.

Figure 29:
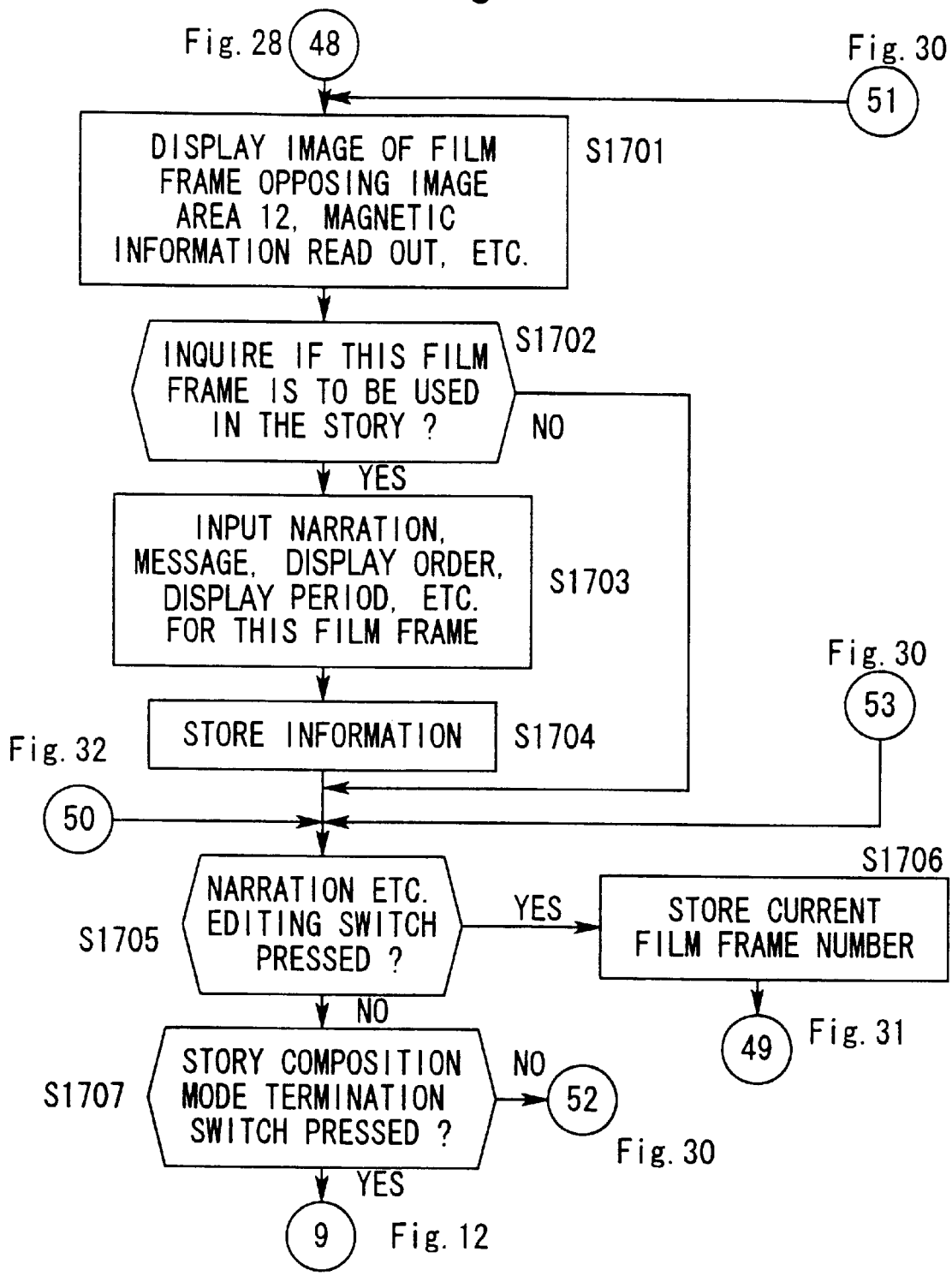
FIG. 29 is another flow chart showing another portion of the operational sequence of this preferred embodiment of the film image signal generation apparatus of the present invention.
Figure 30:
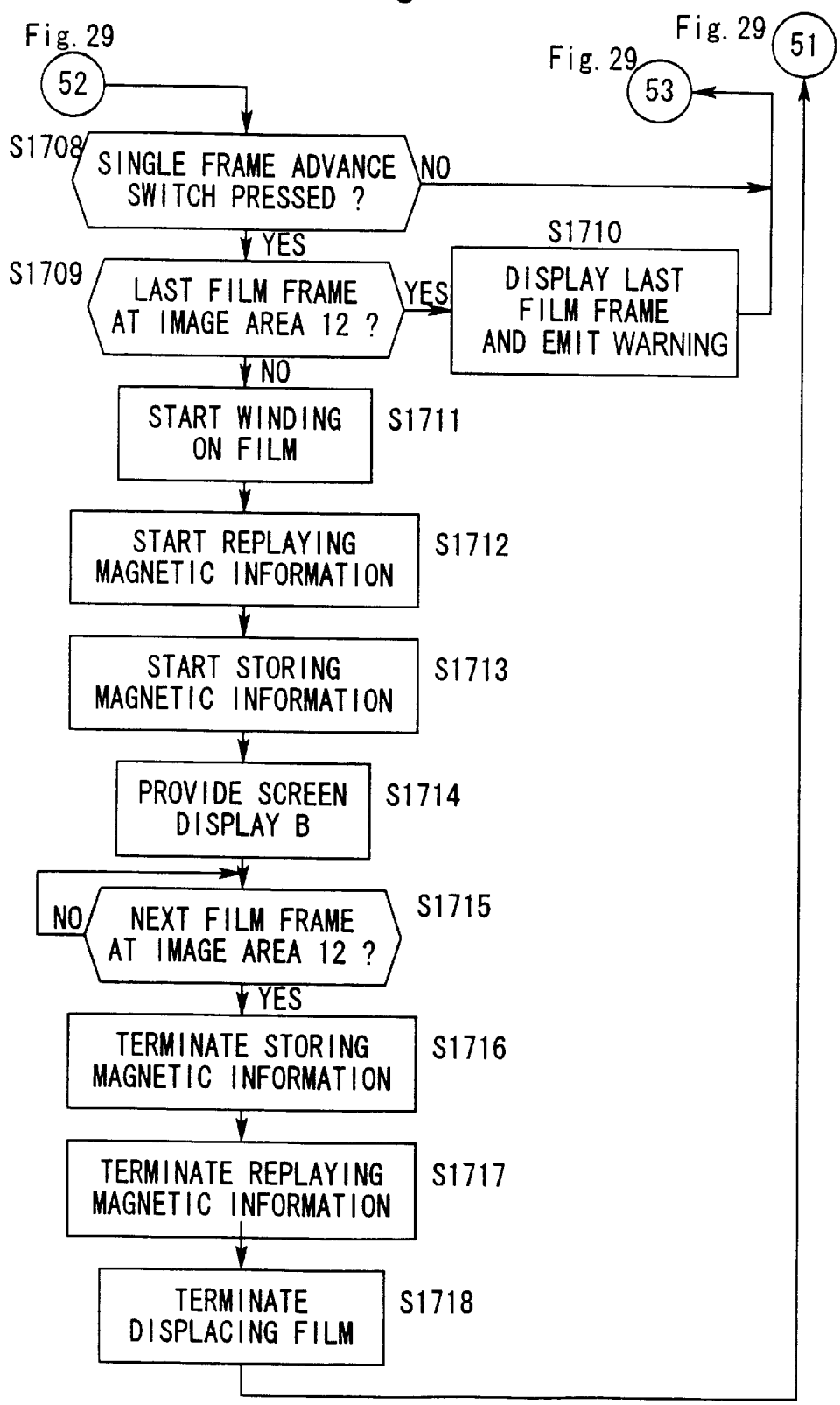
FIG. 30 is another flow chart showing another portion of the operational sequence of this preferred embodiment of the film image signal generation apparatus of the present invention.

As shown in FIG. 29, in the step S1701 an image of the film frame which is currently opposing the image area 12 is output to the monitor 29. Further, the magnetically recorded information upon the film F, the frame number of the film frame which is currently opposed to the image area 12, and the like are superimposed by the image control circuit 16 and output to the monitor 29 for display. In the next step S1702, the operator is asked whether or not the film frame which is being displayed is to be used in the story, and if the answer which is input is YES then the flow of control continues to the next step S1703, while if the answer which is input is NO then the flow of control is transferred to the step S1705. In the step S1703, information for this film frame which is being displayed is input which specifies its narration, its message, the order in which this frame is to be displayed in the story, and the time period for which it is to be displayed. And then in the next step S1704 this information which has been input is stored in the information storage device 28. In the step S1705, a decision is taken as to whether or not an editing switch for the narration etc. is being pressed, and if it is being pressed the flow of control continues to the step S1706, while if the narration editing switch is not being pressed then the flow of control is transferred to the step S1707. In the step S1706, the frame number of the film frame which is currently opposing the image area 12 is stored in the information storage device 28, and the flow of control is transferred to the step 1801 of the FIG. 31 flow chart. On the other hand, in the step S1707 of this FIG. 29 flow chart, a decision is taken as to whether or not a story composition mode termination switch is being pressed, and if it is then the flow of control is returned to the step S801 of the FIG. 12 flow chart, while if this story composition mode termination switch is not being pressed then the flow of control is transferred to the step S1708 of the FIG. 30 flow chart.

In this step S1708, a decision is taken as to whether or not the single frame advance switch is being pressed, and if it is being pressed then the flow of control proceeds to the next step S1709, while if the single frame advance switch is not being pressed then the flow of control returns to the step S1705 of the FIG. 29 flow chart. In the step S1709, a decision is taken as to whether or not the film frame which currently is positioned to oppose the image area 12 is the last film frame, and if so then the flow of control proceeds to the next step S1710, while if the film frame currently opposing the image area 12 is not the last film frame then the flow of control is transferred to the step S1711. In the step S1710, this final film frame is displayed upon the monitor 29, and a warning is emitted for the operator to inform him of mistaken operation, and then the flow of control returns to the step S1705 of the FIG. 29 flow chart. In the step S1711, the wind on motor 5 is started and the winding on of the film F is commenced, and then the flow of control proceeds to the next step S1712. In this step S1712, the reading out of magnetic information from the film F by the magnetic head 7 and by the magnetic read circuit 17 is commenced. Next in the step S1713 the magnetic information which has been read out in the previous step S1712 is stored in the information storage device 28, and the flow of control proceeds to the next step S1714. In this step S1714, as shown in FIG. 37(*b*), a display (the screen display B) is provided upon the monitor 29 which says that the film is being forwarded and which displays the frame number which designates the portion of the film which is currently closest to the image area 12. In the next step S1715 the system loops back to the previous step S1714 so as to continue providing the screen display B, until the next film frame has arrived to oppose the image area 12; and when the next film frame is opposed to the image area 12 then the flow of control continues to the next step S1716. In this step S1716, the storage of the magnetic information is terminated, and the flow of control continues to the next step S1717. In this step S1717, the reading out of the magnetic information is terminated, and the flow of control continues to the next step S1718. In this step S1718, the wind on motor 5 is stopped in this current state with the next film frame being opposed to the image area 12, and the displacement of the film is terminated. And finally the flow of control is returned to the step S1701 of the FIG. 29 flow chart.

In the story composition routine whose flow chart has been described in the above steps S1604 through S1718, along with inputting a title and narration which are to be affixed to the film cartridge 1 (in the step S1606), for each film frame separately, narration, the order in which it is to be displayed in sequence, the time period for which it is to be displayed, and the like are input (in the step S1703), and all this information is stored in the information storage device 28 (in the step S1704). Accordingly it is possible to compose and to store any story, as desired, by lining up the images of the film frames in any desired order, and by inserting any desired narration or the like between the film frame images. Further, it is also possible to set the time periods for display of the images and the narrations and the like as desired, so as to regulate the overall flow of the story.

Figure 31:
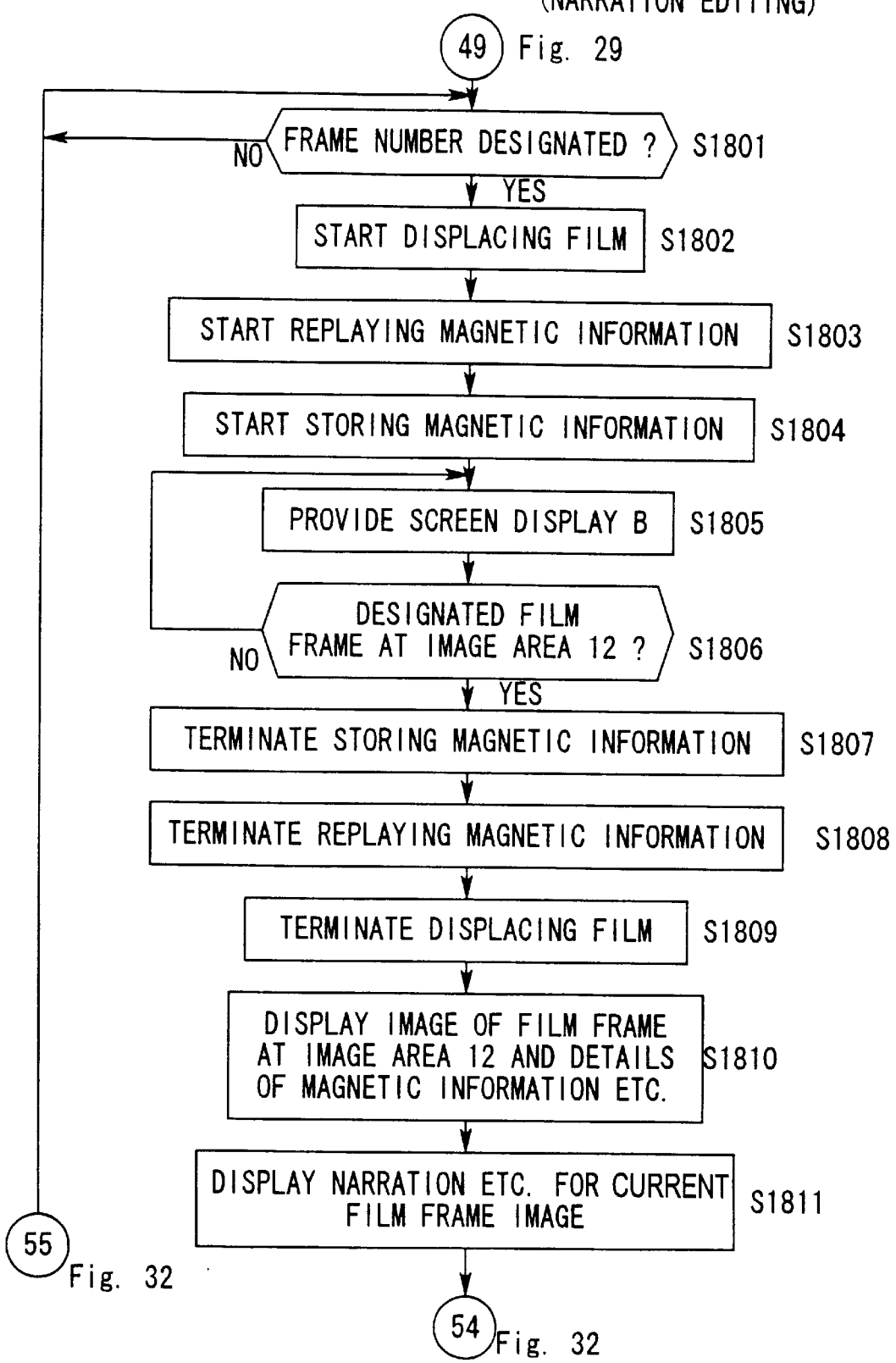
FIG. 31 is another flow chart showing another portion of the operational sequence of this preferred embodiment of the film image signal generation apparatus of the present invention.
Figure 32:
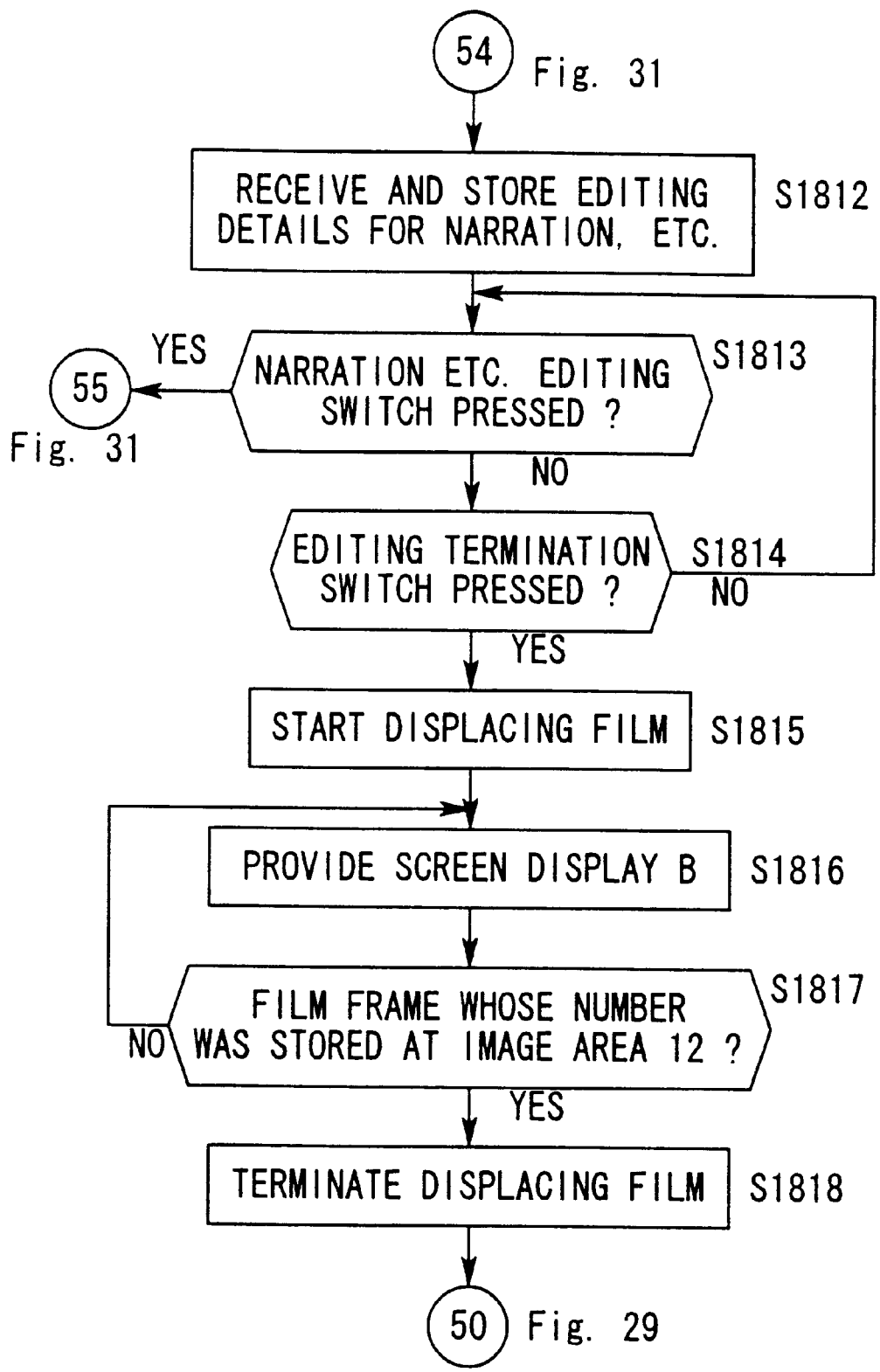
FIG. 32 is another flow chart showing another portion of the operational sequence of this preferred embodiment of the film image signal generation apparatus of the present invention.

Referring now to the flow chart of FIG. 31, in the first step S1801 the system loops around and waits until a frame number is selected for which narration or the like is to be edited, and when such a frame number is selected then the flow of control continues to the step S1802. In this next step S1802, the rewind motor 4 and/or the wind on motor 5 is started, so as to start displacing the film F. The direction for displacement of the film F, i.e. whether the film F is wound forwards or is rewound, depends upon the relative magnitude of the frame number of the current film frame which is opposed to the image area 12 at the present time, which was stored in the step S1706 of the FIG. 29 flow chart, and the number of the film frame which is selected for editing of the like of its narration. In the next step S1803, the reading out of magnetic information from the film F by the magnetic head 7 and by the magnetic read circuit 17 is commenced. Next in the step S1804 the magnetic information which has been read out in the previous step S1803 is stored in the information storage device 28, and the flow of control proceeds to the next step S1805. In this step S1805 the screen display B is provided upon the monitor 29. In the next step S1806 the system loops back to the previous step S1805 so as to continue providing the screen display B, until the designated film frame has arrived to oppose the image area 12; and when the designated film frame is opposed to the image area 12 then the flow of control continues to the next step S1807. In this step S1807, the storage of the magnetic information is terminated since now it has all been performed, and the flow of control continues to the next step S1808. In this step S1808, the reading out of the magnetic information is terminated, and the flow of control continues to the next step S1809. In this step S1809, the rewind motor 4 and/or the wind on motor 5 is stopped in this current state with the designated film frame being opposed to the image area 12, and the displacement of the film is terminated, and the flow of control continues to the next step S1810. In this step S1810, an image of the film frame which is currently positioned to oppose the image area 12 is output upon the monitor 29, and at the same time the image control circuit 16 also displays the magnetic information for this current film frame at the image area 12, its frame number, and the like upon the monitor 29 as a legend superimposed upon the film frame display. And in the next step S1811 the information for this film frame which is being displayed, including its narration, a message, the order in which it is to be displayed in sequence, the time period for which it is to be displayed, and the like, is read out from the information storage device 28, and the details thereof are displayed upon the monitor 29 as a superimposed display. Then the flow of control is transferred to the step S1812 of the FIG. 32 flow chart.

In this step S1812, input of the details of the narration etc. is received, and these details are stored in the information storage device 28. In the next step S1813, a decision is taken as to whether or not the narration editing switch is being pressed, and if it is then the flow of control returns to the step S1801 of the FIG. 31 flow chart, while if the narration editing switch is not being pressed then the flow of control proceeds to the next step S1814. In this step S1814, a decision is taken as to whether or not an editing termination switch is being pressed, and if it is then the flow of control proceeds to the next step S1815, while if this editing termination switch is not being pressed then the flow of control loops back to the step S1813. In the step S1815, the rewind motor 4 and/or the wind on motor 5 is started, so as to start the displacement of the film F. The direction for displacement of the film F, i.e. whether the film F is wound forwards or is rewound, depends upon the relative magnitude of the frame number of the current film frame which is opposed to the image area 12 and the number of the film frame which was stored in the step S1706 of the FIG. 29 flow chart. In the next step S1816 the screen display B is provided upon the monitor 29. In the next step S1817 the system loops back to the previous step S1816 so as to continue providing the screen display B, until the film frame whose frame number was stored in the step S1706 of the FIG. 29 flow chart has arrived to oppose the image area 12; and when this film frame is opposed to the image area 12 then the flow of control continues to the next step S1818. In this step S1818, the rewind motor 4 and/or the wind on motor 5 is stopped in this current state with the film frame whose frame number was stored in the step S1706 of the FIG. 29 flow chart being opposed to the image area 12, and the displacement of the film is terminated, and then the flow of control is transferred to the step S1705 of the FIG. 29 flow chart.

As described above it is possible, in the steps S1801 through S1818, to select the frame for which the narration etc. is to be edited, and to add to or change the narration for this selected frame.

Figure 33:
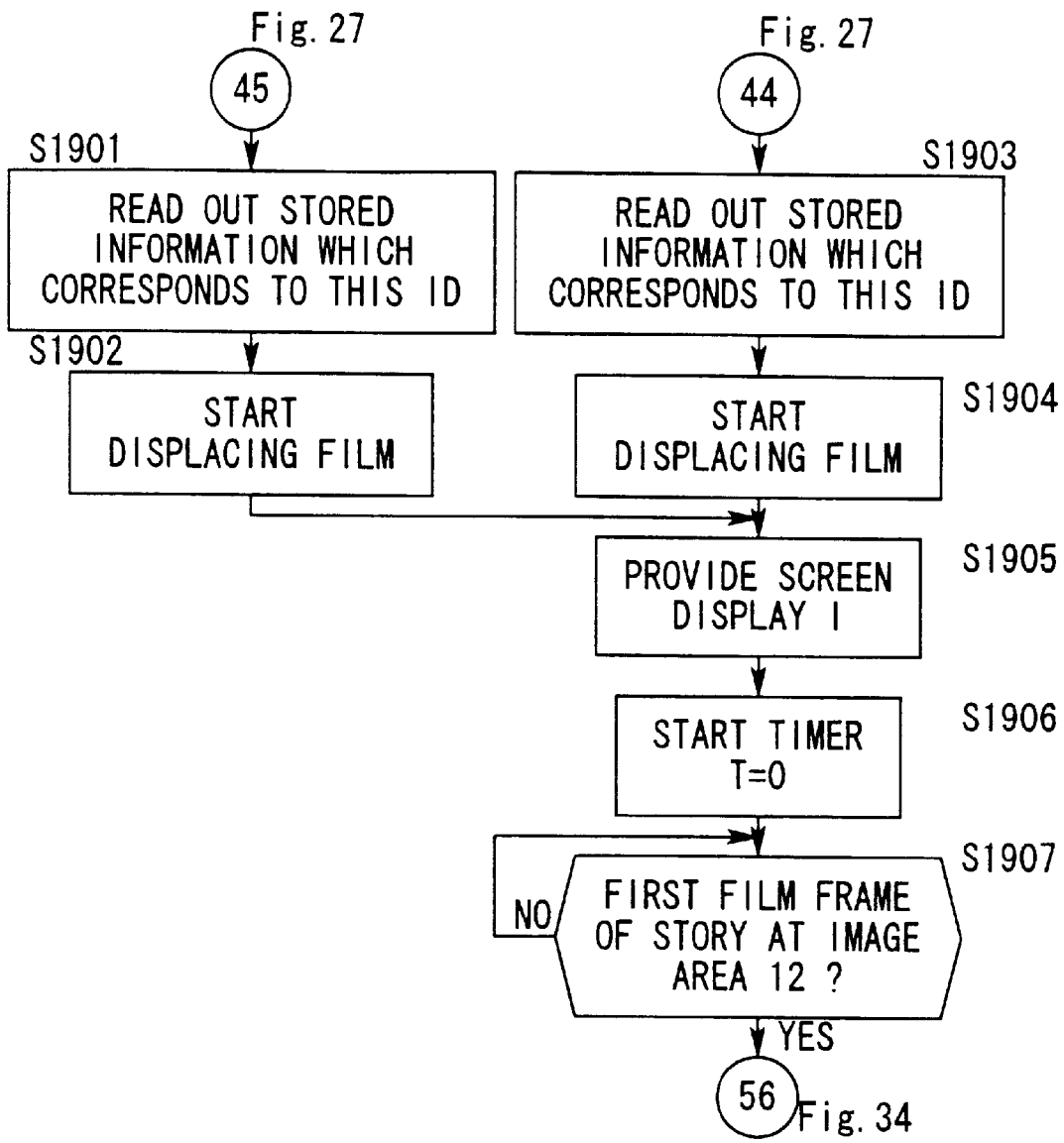
FIG. 33 is another flow chart showing another portion of the operational sequence of this preferred embodiment of the film image signal generation apparatus of the present invention.

In the step S1901 of the FIG. 33 flow chart, the stored information for the film cartridge 1 which is specified by the cartridge ID which was stored in the information storage device 28 in the step S303 of the FIG. 3 flow chart is read out from the information storage device 28. This stored information may comprise, for instance, a title, a narration, the order in which the film frames should be displayed, and the time periods for display of each of the film frame and/or of its narration, which may be input via the information input device 27 in advance, and information about the magnetic recording layer of the film etc. In the next step S1902, the rewind motor 4 or the wind on motor 5 is started, so as to start the displacement of the film F, and then the flow of control is transferred to the step S1905. On the other hand, in the step S1903, just as in the step S1901, the stored information for the film cartridge 1 is read out from the information storage device 28, and then in the next step S1904 the rewind motor 4 and/or the wind on motor 5 is started, so as to start the displacement of the film F, and then the flow of control proceeds to the step S1905. The direction for displacement of the film F, i.e. whether the film F is wound forwards or is rewound, depends upon the relative magnitude of the frame number of the current film frame which is opposed to the image area 12 and the number of the first film frame in the story. In the step S1905, the narration etc. is displayed upon the monitor 29 as shown in FIG. 43(a) (the screen display I). In the next step S1906, the timer is set to zero and is started so as to count time. In the next step S1907, the system loops around to wait while the displacement of the film F is continued until the film is positioned with the first frame of this story being opposed to the image area 12, and then the flow of control is transferred to the step S1908 of the FIG. 34 flow chart. During this time interval until the flow of control reaches the step S1908, the stored narration etc. is displayed in the proper order, according to the settings which are stored in the information storage device 28.

Figure 34:
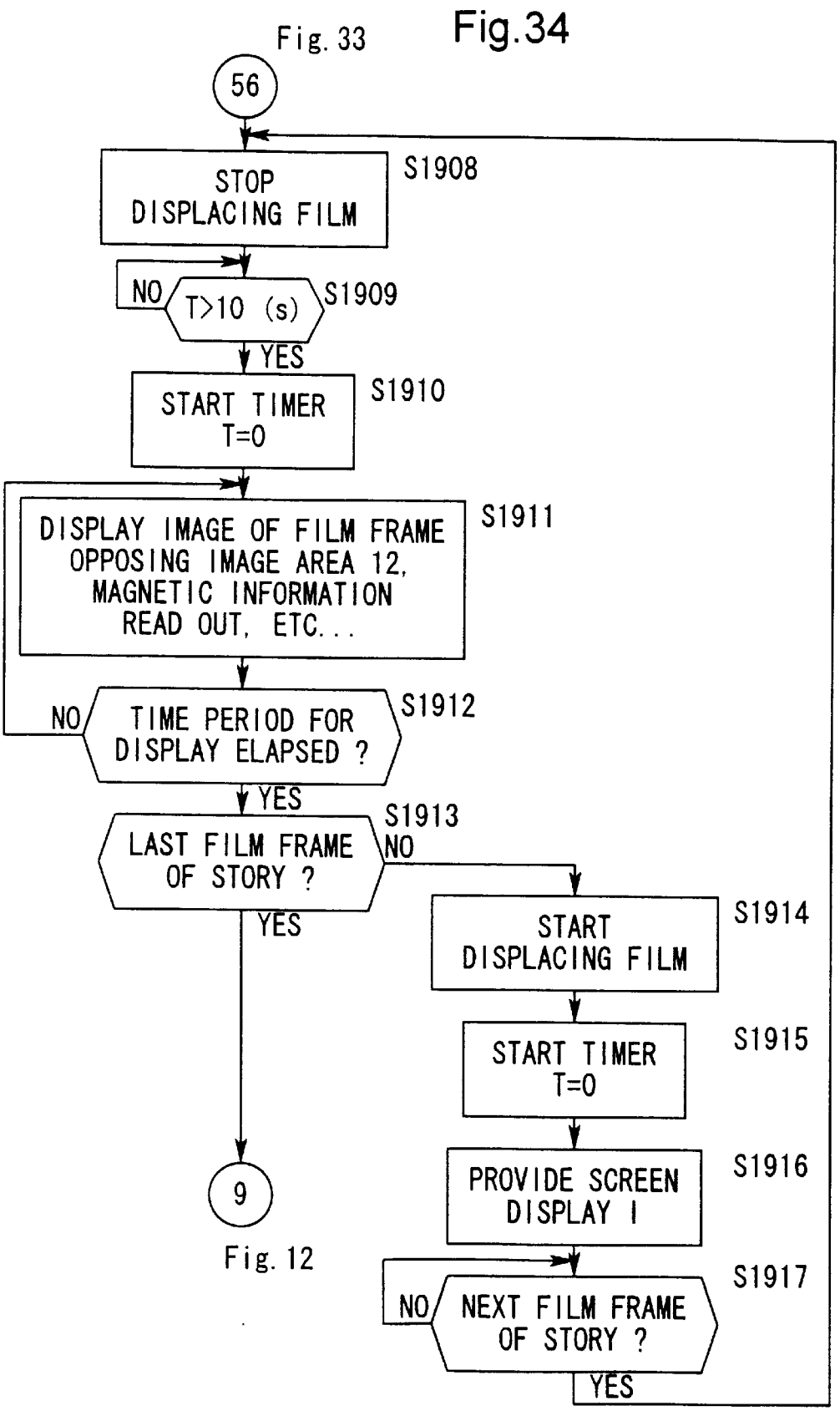
FIG. 34 is another flow chart showing another portion of the operational sequence of this preferred embodiment of the film image signal generation apparatus of the present invention.

In the step S1908 of the FIG. 34 flow chart, the rewind motor 4 and/or the wind on motor 5 is stopped since the specified film frame is now positioned as opposed to the image area 12. In the next step S1909, the system waits in a loop until the timer has timed a period of ten seconds (for example), and then the flow of control continues to the next step S1910. In this step S1910, the timer is reset to zero and is restarted so as to start counting time again. And in the next step S1911 an image of the film frame which is currently opposing the image area 12 is output as a first picture signal S1 to the monitor 29. Further, the magnetically recorded information upon the film F, the frame number of the film frame which is currently opposed to the image area 12, and the like are superimposed by the image control circuit 16 and output to the monitor 29 for display. In the next step S1912, the system keeps looping back to the previous step S1911 until the display time period which was set for the image of this film frame during the story composition mode has elapsed, thus continuing the display of this film frame, and then the flow of control proceeds to the next step S1913. In this step S1913, a decision is taken as to whether or not the film frame which currently is positioned as opposed to the image area 12 is the last film frame of this story, and if so then the flow of control is returned to the step S801 of the FIG. 12 flow chart, while if this story has not yet proceeded as far as its last film frame then the flow of control proceeds to the next step S1914. In this step S1914, the rewind motor 4 and/or the wind on motor 5 is started, so as to start the displacement of the film F, and then the flow of control proceeds to the step S1915. The direction for displacement of the film F, i.e. whether the film F is wound forwards or is rewound, depends upon the relative magnitude of the frame number of the current film frame which is opposed to the image area 12 and the number of the next film frame which is to appear in the story. In the next step S1915, the timer is reset to zero and is restarted so as to start counting time again. In the next step S1916, the narration etc. read out from the information storage device 28 is displayed upon the monitor 29 as shown in FIGS. 43(b), (d), and (f) (the screen display I). And in the final step S1917 a decision is taken as to whether or not the film frame which currently is positioned as opposed to the image area 12 is the next film frame of this story, and if the forwarding of the film has not yet proceeded as far as the next film frame of this story then the flow of control loops back to this step S1917 and waits, while when the next story film frame is reached the flow of control returns to the step S1908.

In this manner, in the story replay mode, the film frames and the narration are replayed in the order and according to the timing which were established in the story composition mode. That is to say, the story is replayed just as it was composed in the story composition mode.

Although the above explanation of this preferred embodiment of the present invention was made in terms of using the film frames upon a single film cartridge for the composition of just one story, it would also be possible to use the film frames upon a single cartridge for the composition of a plurality of stories; and, further, it would also be possible to use the film frames upon a plurality of cartridges for the composition of a single story, or indeed of a plurality of stories. For example, in the case of using the set of film frames upon a single cartridge for the composition of a plurality of stories, it would be possible to arrange for the stories to be told apart by their titles, so that, in the story replay mode, a list of stories would be displayed when reading the ID of the film cartridge, and then the operator would be able to select the desired story by referring to it by its title.

In the case of using the set of film frames upon a plurality of cartridges for the composition of a single story, when replaying the story, it would be desirable, for example, to output a display signal requesting the next cartridge to be loaded after the replaying of each cartridge has been completed. The complete story can then be replayed in the proper order by the operator inserting the next cartridge according to this request display signal.

The above explanation of the story replay mode of this preferred embodiment of the present invention was made in terms of the displays of the title screen, the narration screens, and the frame images being performed according to display time periods determined in advance, and of this sequence of displays being automatically performed up to its very end. However, it would also be acceptable to provide a pause switch, by the use of which the replaying of the story could be interrupted at any desired time point as required, to be subsequently restarted from this point of interruption. Further, it would also be possible not simply to perform the display of each of the screens in the story for a predetermined time period, but instead to provide an advance switch and optionally also a backup switch, in which case it would be possible to step through a story manually, and optionally also to back up within it.

Figure 55:
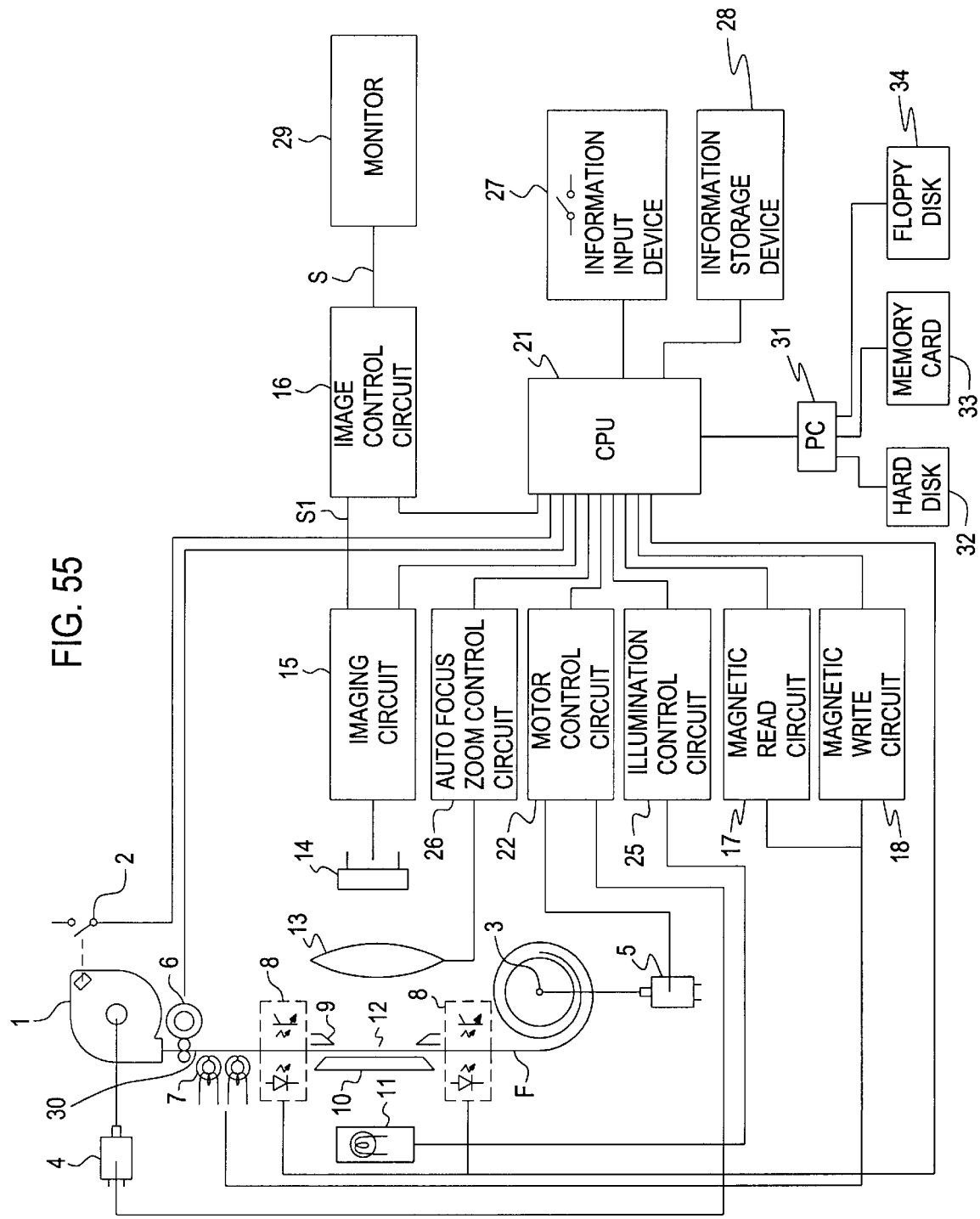
FIG. 55 is a schematic view showing the overall structure of a second embodiment of the film image signal generation apparatus of the present invention.

Further, although in the shown preferred embodiment of the film image signal generation apparatus of the present invention an internal RAM 28 was used as the information storage device, this is not to be considered as limitative of the present invention; as an alternative, it would also be possible to connect this film image signal generation apparatus to a personal computer 31 (FIG. 55) or the like, and then to store the information relating to a story upon some other recording medium, such as a hard disk 32 (FIG. 55), a memory card 33 (FIG. 55), a floppy disk 34 (FIG. 55), or the like. Further, it would also be possible to use a magnetic recording layer upon the film as the storage medium. For example, it would be possible to store the replay order of a story in a chained format, in which the title, the initial narration, and the frame number of the first film frame in the story were stored upon the leader portion of the film, and subsequently the magnetic recording layer corresponding to each film frame in the story was used for storage of the title (if any) to be displayed after it, the narration (if any) to be displayed after it, the frame number of the next film frame in the story, and the time period for display thereof. With such a system, in the story replay mode it would be possible to replay a story by reading out this magnetic information in sequence, and the final replay result would be analogous to that which was obtained using the preferred embodiment of the present invention described above.

Yet further, although in the shown preferred embodiment of the film image signal generation apparatus of the present invention the information input device 27 was provided and was used as the device for inputting the various items of information which were required for alteration to, addition to, or deletion of the magnetic information upon the film F, and for inputting the narration and the like for the story composition mode, this is not to be considered as limitative of the present invention; as an alternative, it would also be possible to input this information by connecting this film image signal generation apparatus to a personal computer, to an electronic notebook, or the like. Further, it would also be possible to insert magnetic information which was previously magnetically recorded upon the film or upon the film cartridge as titles or narration between the images of the film frames.

The sequencing process in the story composition mode is not to be considered as being limited to that which was shown above with reference to the preferred embodiment of the present invention; for example, it would be also acceptable, and desirable, for it to be possible later to edit a story after it has initially been composed. Further, although with reference to the preferred embodiment of the present invention the description assumed that in the story composition mode the system stepped through all the film frames one at a time, and queried the operator as to whether or not each film frame was to be used in the story which was being composed, this is not to be considered as being limitative of the present invention; it would also be possible, as an alternative, for it be arranged for the operator to be able to input the frame numbers of the film frames which he desired to designate to be included in the story, then he could input their narrations and etc. in the order of the designated frames. Yet further, in the story composition mode, it would also be possible, as another alternative, for it be arranged for the operator to be able to input the frame numbers of the film frames which he desired to designate to be included in the story, along with their display order, narration, time periods for display, etc., without looking at individual images of the various film frames, but merely by looking at printed versions of each of the film frames, or at a matrix display of thumbnail versions thereof.

Although in the shown preferred embodiment of the film image signal generation apparatus of the present invention no facilities were provided for zooming and/or scrolling the frame image of the film frame, as an additional feature, for example, it would also be possible to arrange for the operator to be able to input, during the composition of a story, information which specified the scope and/or degree of zooming and/or scrolling, etc., for each one of the film frames included in the story. In this case facilities would also be provided for, during the replaying of this story, the specified scope and/or degree of zooming and/or scrolling, etc., to be performed automatically for each film frame. Further, the system is not to be considered as being limited to displaying a single narration screen between each of the film frame images in the story; it would also be possible for a plurality of narration screens to be interposed between the display of one film frame image and the display of its successor, and for some film frame image displays to give way directly to their successors, without any narration screen being interposed between them. If in this manner no narration screen is interposed between two film frame image displays, it would be desirable to continue the output of the predecessor film frame image display until its successor is ready to be displayed, by storing the predecessor film frame image in a memory device.

It would be possible to connect the picture signal output of the film image signal generation apparatus of the present invention to a video recorder or the like, and thereby to record a story which was being replayed. In such a case, it would be desirable for the apparatus of the present invention to be started automatically upon receipt of a recording start signal from the video recorder, in order to replay the story for recording thereof.

Embodiment Utilizing Cartridge ID and Story ID

When a story is being displayed, it is possible to replay it without error by establishing a relationship when composing the story between the display information for the story (narration, order for display, time periods for display, etc.) and a cartridge ID (identification) which specifies the film cartridge. Further, when a specific story is to be displayed, it is possible to replay the desired story without erroneously selecting a wrong one by establishing a relationship when composing the story between the display information for the story and a story ID which specifies the story. An embodiment of the film image signal generation apparatus of the present invention which utilizes such a cartridge ID and such a story ID will now be explained.

Figure 53:
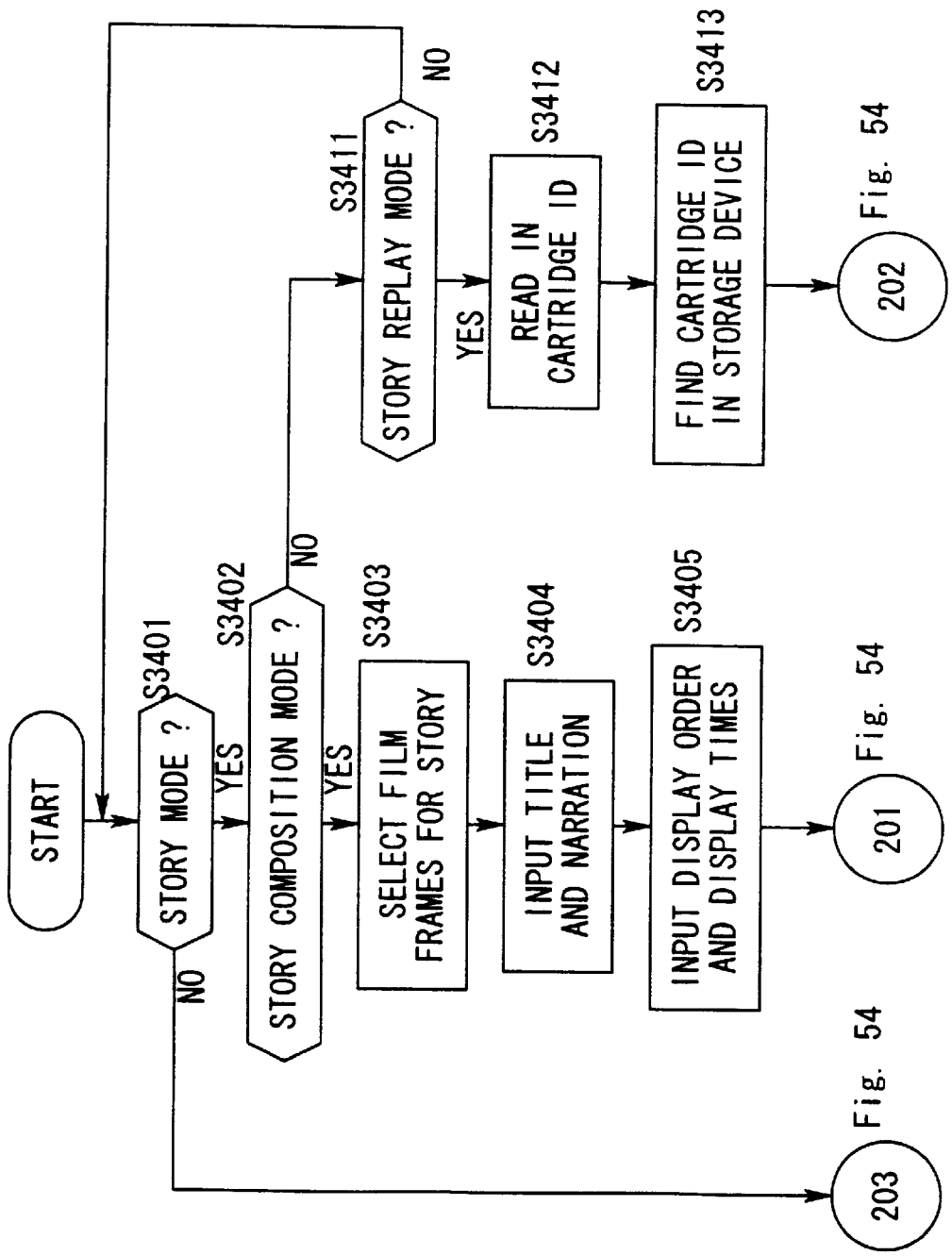
FIG. 53 is another flow chart showing another portion of the operational sequence of this preferred embodiment of the film image signal generation apparatus of the present invention.
Figure 54:
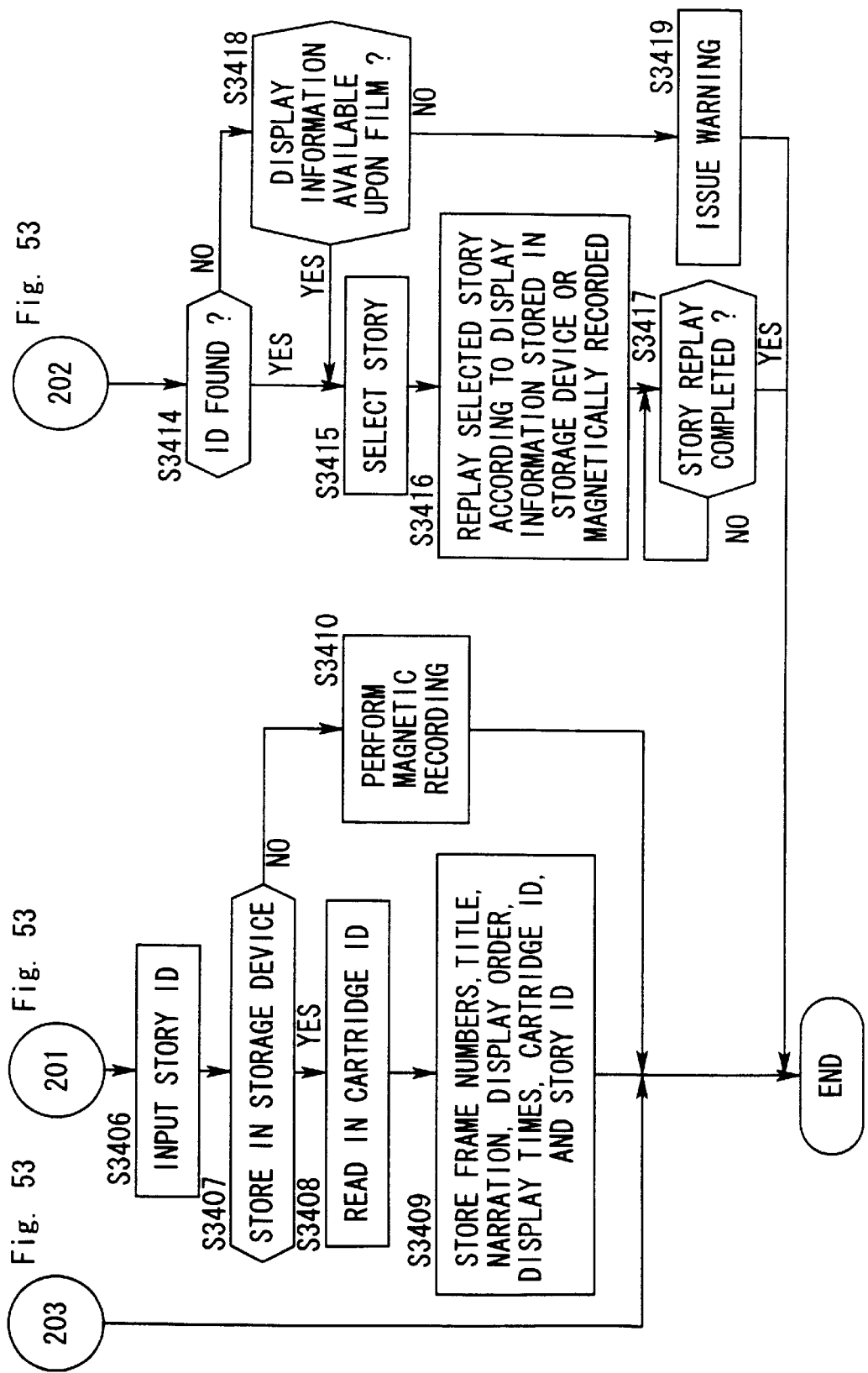
FIG. 54 is another flow chart showing another portion of the operational sequence of this preferred embodiment of the film image signal generation apparatus of the present invention.

FIGS. 53 and 54 are flow charts showing the flow of control when a cartridge ID is utilized and when a story ID is utilized. In the step S3401 of the FIG. 53 flow chart, a decision is taken as to whether or not the story mode is selected, and if it is then the flow of control proceeds to the step S3402, while if the story mode is not selected then the control flow of this sequence terminates (via the FIG. 54 flow chart). In the step S3402 of FIG. 53, a decision is taken as to whether or not the story composition mode is selected, and if it is then the flow of control proceeds to the step S3403, while if the story composition mode is not selected then the flow of control is transferred to the step S3411. In the step S3403, the film frames which are to be used in the story are input, and in the next step S3404 the title and the narration which are to be used in the story are input. In the next step S3405 the order in which the film frames are to be displayed and the time periods for displaying them are input. Then next in the step S3406 of the FIG. 54 flow chart a story ID number is input, and the flow of control continues to the step S3407. The operator may input the various items of information which are input in these steps S3403 through S3405 described above by using a keyboard or the like. In the step S3407, a decision is taken as to whether or not an item of information, which shows that the above described narration and the like should be stored in the information storage device 28, has been input, and if so then the flow of control continues to the step S3408, while if such an item of information has not been input then the flow of control is transferred to the step S3410. In the step S3408 a cartridge ID number which was previously written upon the magnetic layer upon the film (at the time of manufacture) is read in therefrom by the magnetic head 7 and the magnetic read circuit 17, and in the next step S3409 the display information such as the frame numbers, title, narration, order of display, time periods for display, and the like, as well as the cartridge ID number and the story ID number, are stored in the information storage device 28, and then the control flow of this sequence ends. At this time a mutual relationship is established and stored between this display information and the cartridge ID number and the story ID number. In the step S3410 the display information and the story ID number are written upon the magnetic layer of the film by the magnetic head 7 and the magnetic write circuit 18, and then the control flow of this sequence ends. At this time a mutual relationship is established and stored between this display information and the story ID number. In this manner, after composing the story in the story composition mode, a relationship is established and is stored between the display information and the order for display and so on and the cartridge ID number and/or the story ID number.

On the other hand, if in the step S3402 of the FIG. 53 flow chart it is decided that the story composition mode is not selected, then the flow of control is transferred to the step S3411. In this step S3411, a decision is taken as to whether or not the story replay mode is selected, and if it is then the flow of control proceeds to the step S3412, while if the story replay mode is not selected then the flow of control is returned to the step S3401. In the step S3412, the cartridge ID number is read by the magnetic head 7. In the next step S3413, the system attempts to find whether or not this cartridge ID number which was read in the previous step S3412 has been stored in the information storage device 28. In the next step S3414 of the FIG. 54 flow chart, a decision is made as to whether or not this cartridge ID number has been already stored in the information storage device 28, and if so then the flow of control proceeds to the step S3415, while if not then the flow of control is transferred to the step S3418. In the step S3415, the particular story which is to be replayed is selected, according to a story ID number which is input by the operator. In the next step S3416, the display information related to the story which is specified by the cartridge ID number which was read in and by the story ID number which was selected is read in, and then this specified story is replayed according to its display information. In the final step S3417 the system waits until the replaying of the story is completed, and then the flow of control of this sequence terminates.

On the other hand, if in the above described step S3414 it is determined that the cartridge ID number which was read in has not been stored in the information storage device 28 previously, i.e. that the display information for the story which is required to be replayed is not currently available in the memory, then the flow of control is transferred to the step S3418. In this step S3418, the information in the magnetic recording layer of the film is read in by the magnetic head 7 and the magnetic read circuit 17, and a decision is made to whether or not the required display information is included therein. If the display information is available then the flow of control is transferred back to the step S3415, while if it is determined that the required display information was not recorded in the magnetic recording layer of the film then the flow of control continues to the step S3419, in which a warning is issued to the operator via the display screen, and the control flow of this sequence terminates. Accordingly the desired story can be correctly replayed, since in this manner the display information for the story which is specified by the cartridge ID number and by the story ID number is read in when a story is to be replayed.

Although in the above described preferred embodiment of the film image signal generation apparatus of the present invention it was supposed that a cartridge ID number which was written at the time of manufacture was thereafter used just as it stood as a cartridge ID, it would also be acceptable, as an alternative, to insert another cartridge ID during the story composition mode. In the case of using such a separate ID in this manner, it would be desirable to write this ID upon the magnetic recording layer of the film at the time of writing the display information for the story on the magnetic recording layer of the film in the cartridge or in the storage device. Moreover, although in the shown preferred embodiment of the film image signal generation apparatus of the present invention ID numbers were used as the film cartridge ID and as the story ID, this is not to be considered as being limitative of the present invention; for example, by employing character strings like file names, the titles of the stories could be desirably used as the IDs for them. Furthermore, although in the explanation given above of the shown preferred embodiment of the film image signal generation apparatus of the present invention it was assumed that a photographic film was used as the recording medium upon which the images were recorded, this need not be limitative of the present invention; the present invention can also be applied to using a photo-CD, a media for an electronic still camera, or other different type of recording medium.

Film Displacement Mode F

The film displacement mode F is a search mode in which the information in the magnetic recording layer of the film is read out, and only those film frames for which the corresponding information satisfies certain selected conditions are displayed in order. These certain conditions may include that the film frame is one which was shot using continuous shooting, that it is a film frame which was shot as a series scene, that it is a film frame which was shot in sports mode, that it is a film frame which was shot on a particular date or at a particular time, that it is a film frame which was shot in relation to a particular event, or that it is a film frame which was shot using a particular focal distance. In this connection, the attribute of being a series scene means that this film frame was one of a series which were shot under identical photographic conditions (aperture, shutter speed, etc.), while the attribute of being shot in sports mode means that this film frame was shot under photographic conditions appropriate for shooting sports scenes (high speed events); and these are attributes which are under the control of the photographer, and their occurrence is recorded in the magnetic recording layer at the time of photography. Further, the attributes of shooting date, particular event (sports meeting, university entrance ceremony, Christmas, birthday, etc., as well as individual name, place name, etc.), focal distance (how much zooming was utilized, etc.) and the like are also recorded in the magnetic recording layer at the time of photography.

In this preferred embodiment of the film image signal generation apparatus of the present invention, the film displacement mode F is further controlled according to three different sequences. When the film displacement mode F is selected, one of these three sequences is executed. In the following, the explanation will be made as though the flow of control was independent for the purposes of convenience of the explanation. Of course it would also be acceptable, in the control process shown in FIG. 2 and FIG. 3, for the flow of control to branch to the film displacement mode F which has the following explanation.

The above mentioned three sequences are: (1) the sequence shown from the step S3101 to the step S3121 in FIGS. 46 and 47; (2) the sequence shown from the step S3201 to the step S3222 in FIGS. 48 through 50; and (3) the sequence shown from the step S3301 to the step S3319 in FIGS. 51 and 52.

Figure 46:
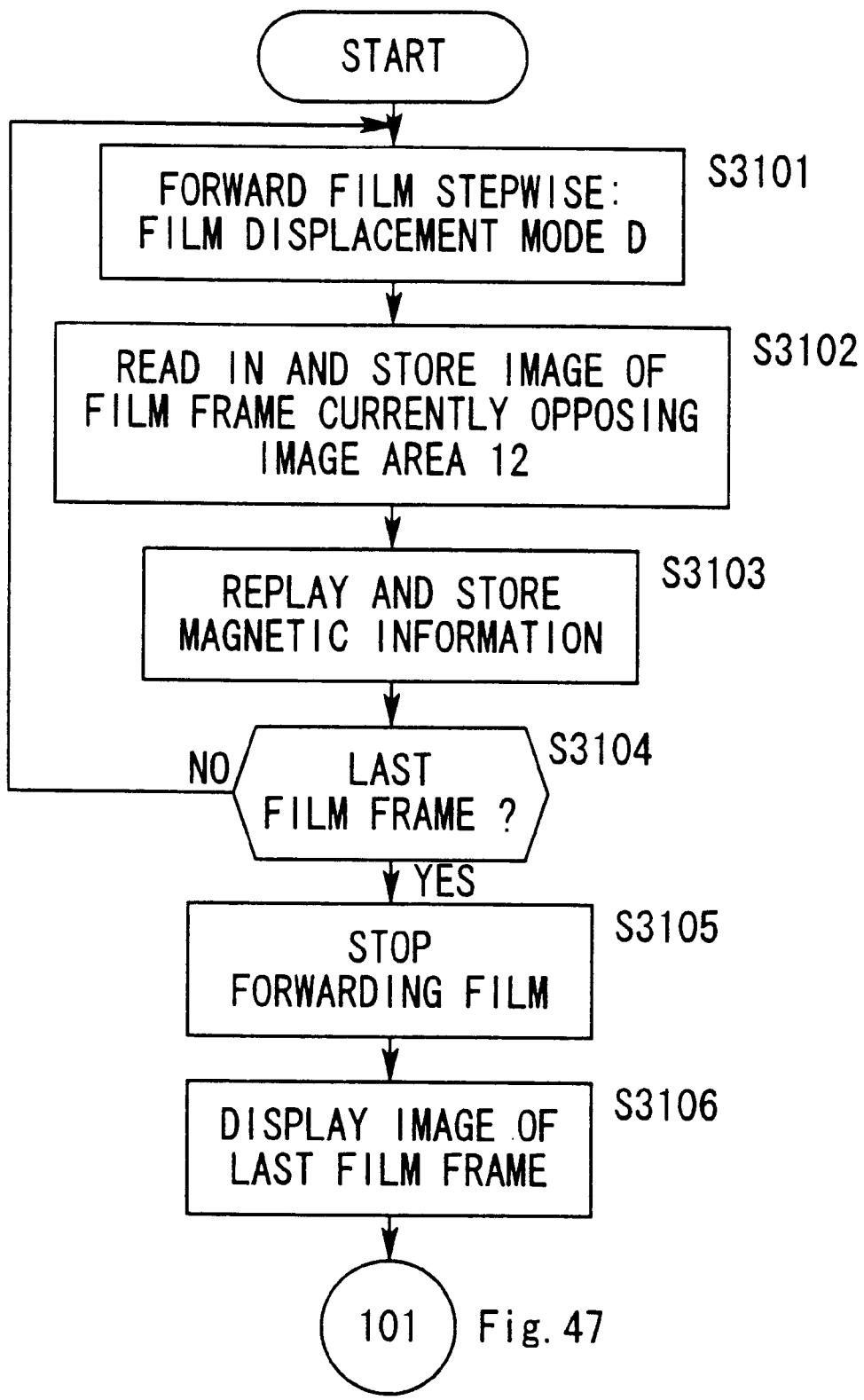
FIG. 46 is another flow chart showing another portion of the operational sequence of this preferred embodiment of the film image signal generation apparatus of the present invention.
Figure 47:
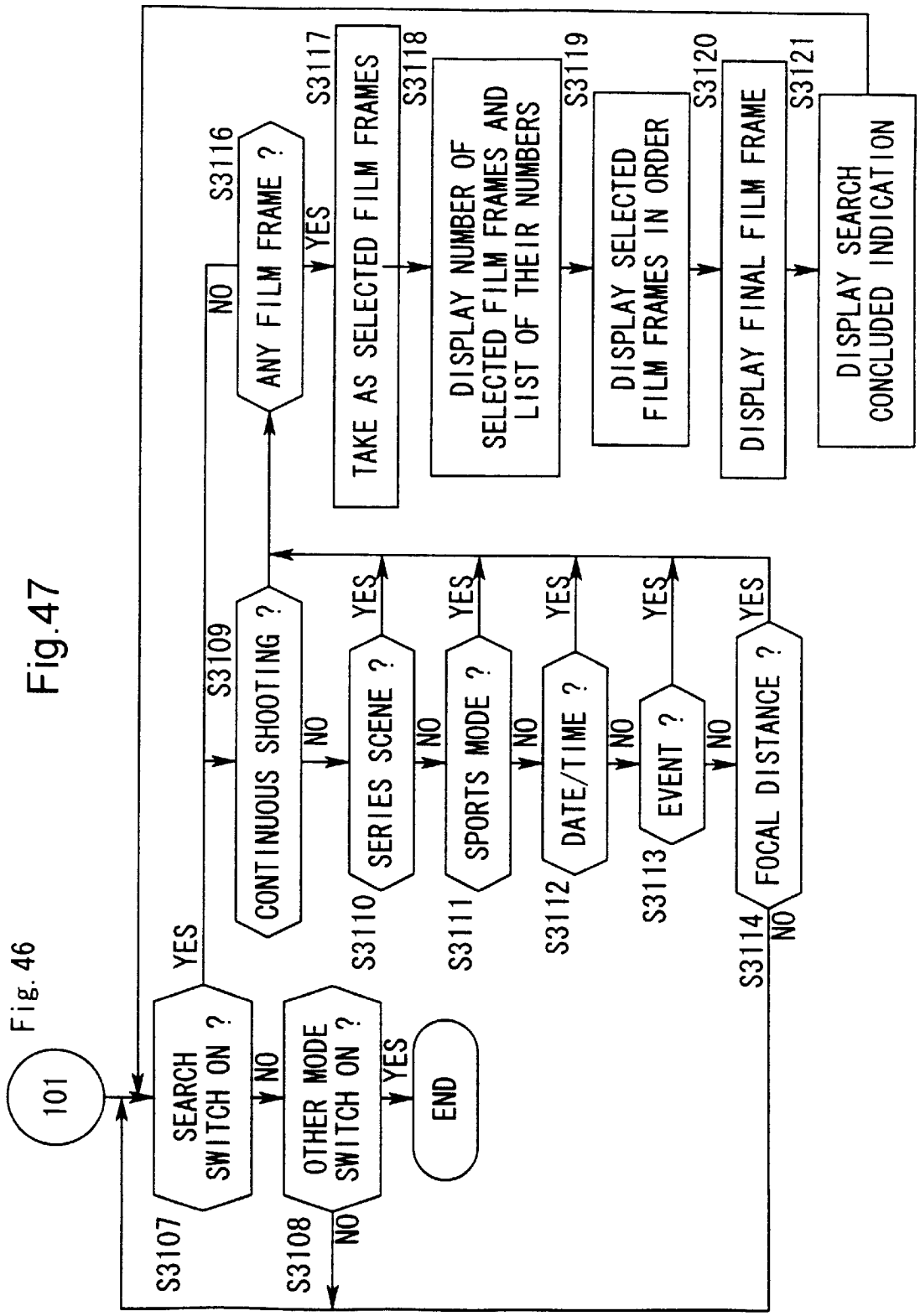
FIG. 47 is another flow chart showing another portion of the operational sequence of this preferred embodiment of the film image signal generation apparatus of the present invention.

According to the sequence shown from the step S3101 to the step S3121 in FIGS. 46 and 47 (the above mentioned control sequence (1)), the following control is performed. In the step S3101 of the FIG. 46 flow chart the wind on motor 5 is started so as to commence winding on the film F, and the film forwarding stops when the first film frame has been brought to oppose the image area 12. In the next step S3102, the image data of the film frame which is opposing the image area 12 is read in and is stored in the information storage device 28. In the next step S3103, the system waits for 5 seconds before again starting the forwarding of the film F, and also the information which is stored in the magnetic recording layer of the film F in correspondence to the film frame which was brought to oppose the image area 12 in the step S3101 is read in and is stored in the information storage device 28. Then in the next step S3104 a decision is taken as to whether or not the film frame which is currently opposing the image area 12 is the last film frame, and if not then the flow of control loops back to the step S3101 to bring the next film frame to oppose the image area 12; while, if in this step S3104 it is decided that the film frame which is currently opposing the image area 12 is indeed the last film frame, then the flow of control proceeds to the next step S3105, in which the forwarding of the film is stopped. And then in the next step S3106 an image of the final film frame is output, and the flow of control continues to the step S3107 of the FIG. 47 flow chart. With the above described steps S3101 through S3106, along with forwarding the film F stepwise past the image area 12 from the first film frame to the last film frame at intervals of about 5 seconds, the information in the magnetic recording layer upon the film F for all of the film frames, and also images of all of the film frames, are stored in the information storage device 28. Moreover, although the details of the explanation of the above steps have been somewhat curtailed in the interests of brevity of description, they correspond to the steps S701 through S714 described above of the flow charts shown in FIGS. 10 and 11, relating to the film advancement mode D.

In the step S3107 of the FIG. 47 flow chart, a decision is taken as to whether a search switch is on or off, and if this search switch is off then the flow of control continues to the next step S3108, while if the search switch is on then the flow of control is transferred to the step S3109. In the step S3108, a decision is taken as to whether or not any other film displacement mode switch is on, and if so then the control flow of this routine for version (1) of the film displacement mode F is terminated, while if no other film displacement mode switch is on then the flow of control returns to the step S3107. In each of the steps S3109 through S3114, if a decision is taken that any one of the selection conditions for the film frames in relation to each of continuous shooting, series scene, sports mode, date and/or time, event, and focal distance is input or set, then the flow of control is transferred to the step S3116, while if a decision is taken that none of these selection conditions is input or set then the flow of control returns to the step S3107. In the step S3116, a decision is taken as to whether or not any film frames exist which satisfy the conditions of selection, and if no such film frames exist then the flow of control returns to the step S3109, while if such film frames exist then the flow of control proceeds to the step S3117, in which these film frames are taken as the selected film frames. In the next step S3118, the total number of selected film frames and a list of their frame numbers are displayed. Next, in the step S3119, the images of the selected film frames are read out from the information storage device 28 and are displayed in sequence according to a predetermined order. Then, after in the step S3120 an image of the last film frame for display (the final selected film frame) has been displayed, in the last step S3121 a message is displayed to the effect that the search has concluded, and the flow of control returns to the step S3107. In this manner, in the steps S3107 through S3121, the frame images stored in the information storage device 28 for the film frames (the selected film frames) which satisfy the conditions for selection are displayed in order.

Figure 48:
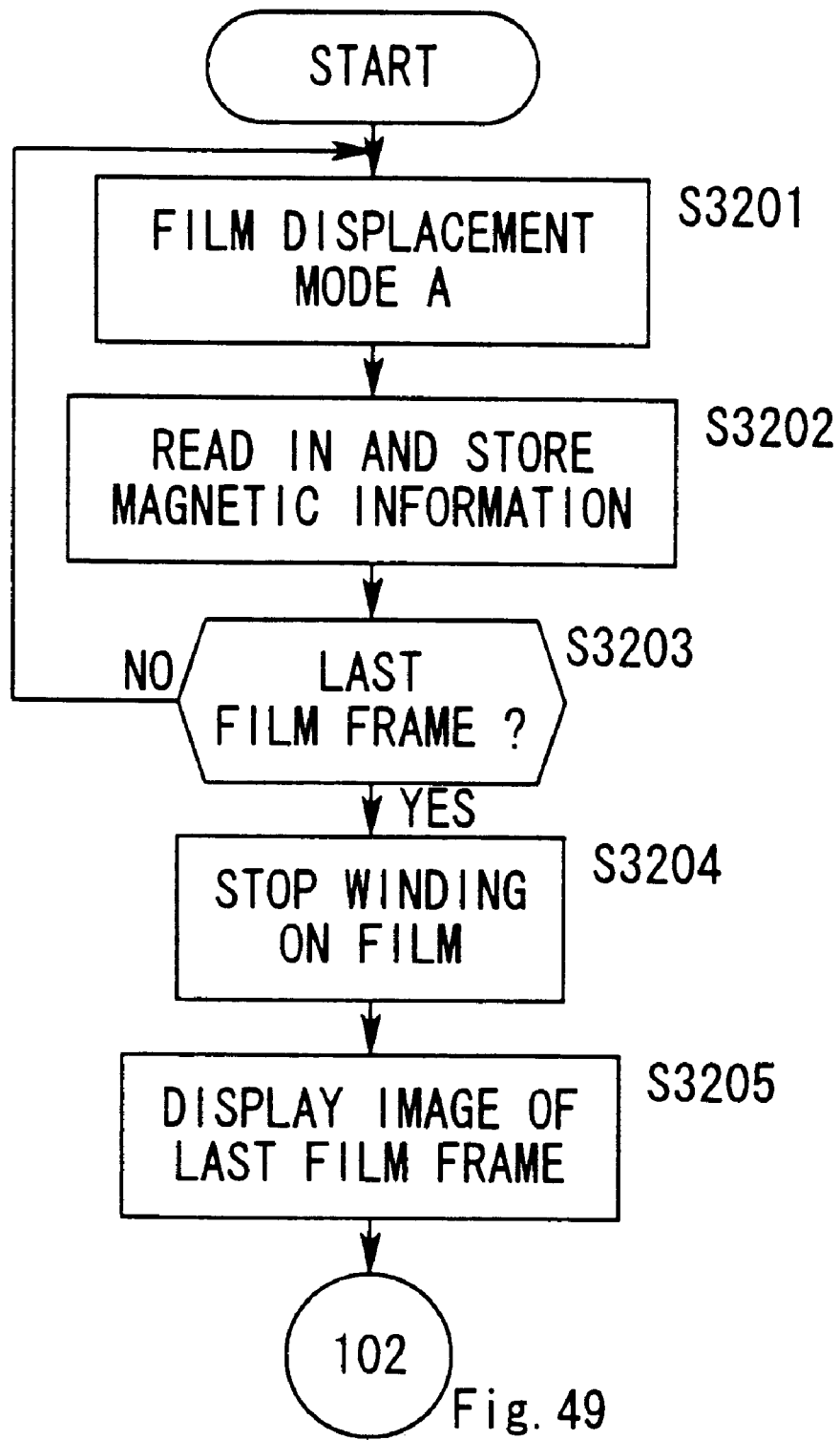
FIG. 48 is another flow chart showing another portion of the operational sequence of this preferred embodiment of the film image signal generation apparatus of the present invention.
Figure 49:
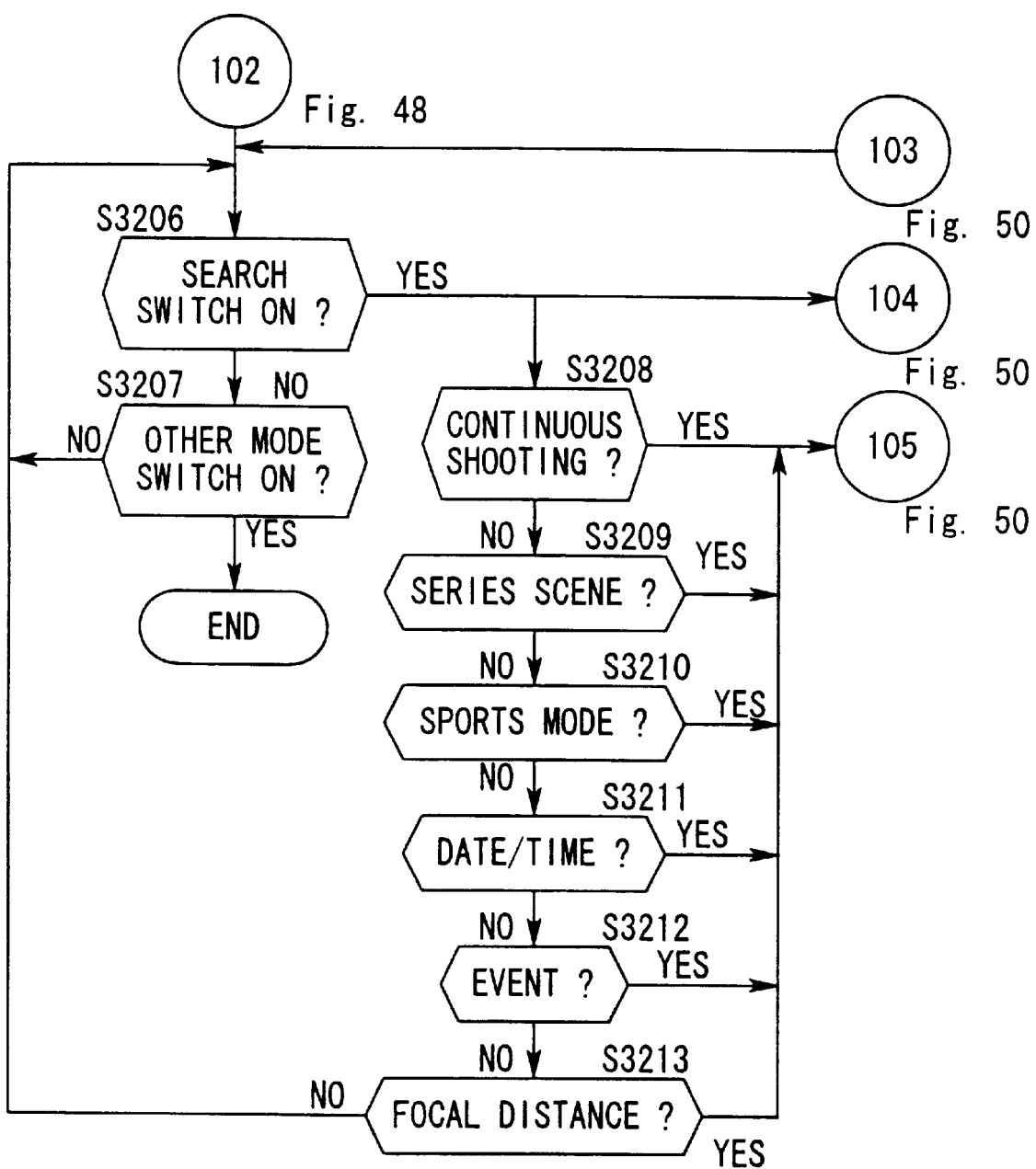
FIG. 49 is another flow chart showing another portion of the operational sequence of this preferred embodiment of the film image signal generation apparatus of the present invention.
Figure 50:
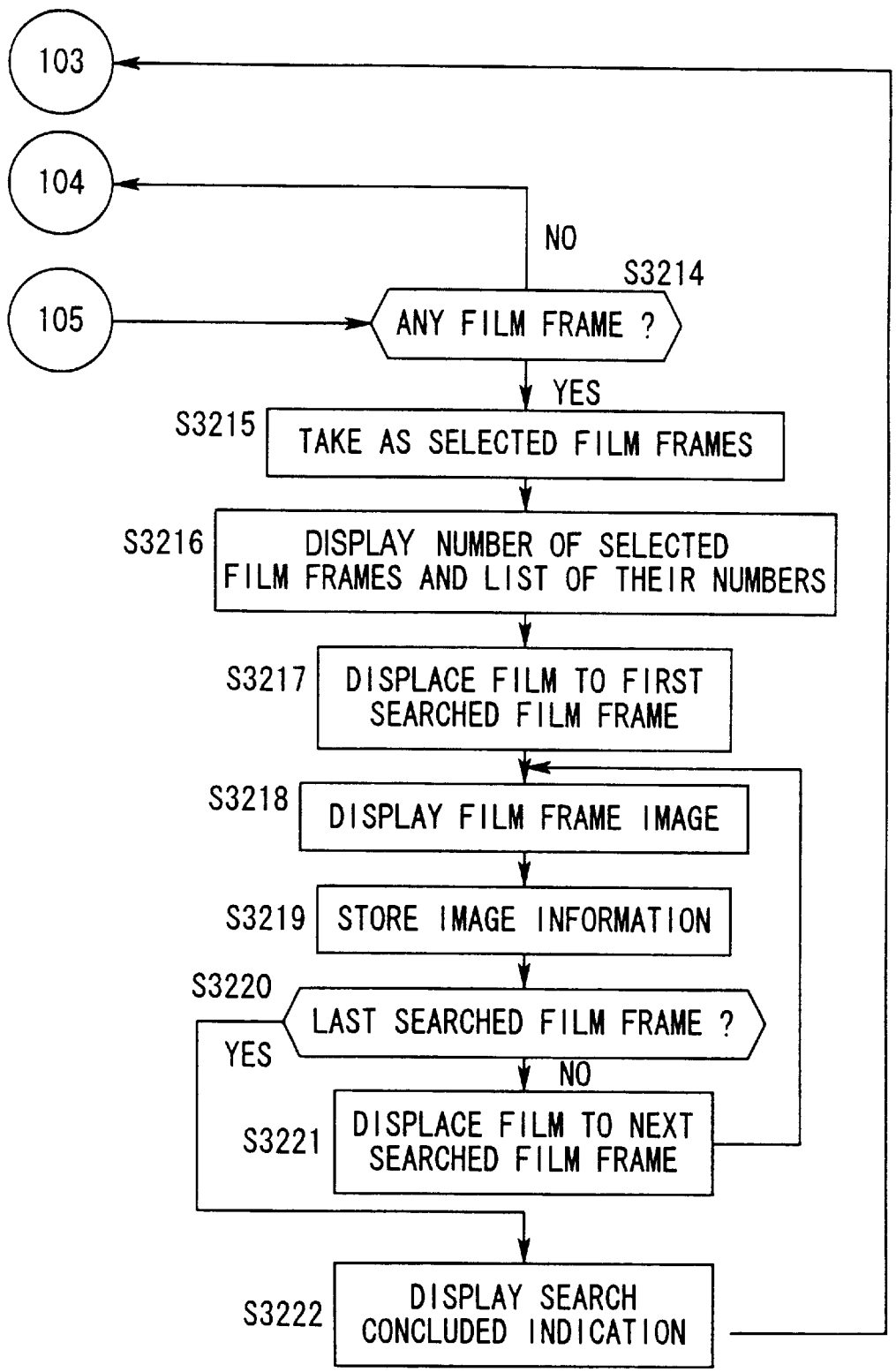
FIG. 50 is another flow chart showing another portion of the operational sequence of this preferred embodiment of the film image signal generation apparatus of the present invention.

According to the sequence shown from the step S3201 to the step S3222 in FIGS. 48 through 50 (the above mentioned control sequence (2)), the following control is performed. In the first step S3201 of the FIG. 48 flow chart, the rewind motor 4 and/or the wind on motor 5 is started so as to commence winding on the film F. In the next step S3202, the information in the magnetic recording layer for each frame of the film is read in and is stored in the information storage device 28. In the next step S3203 the system loops back to the first step S3201 until the last film frame comes to oppose the image area 12, and when the last film frame is reached then the flow of control continues to the next step S3204. In this step S3204, the winding on of the film F is stopped. And in the next step S3205 an image of the last film frame is displayed upon the monitor 29. With the above described steps S3201 through S3205, the information in the magnetic recording layer upon the film F for all of the film frames is stored in the information storage device 28, but in this case (2), as opposed to the previous case (1), no images of any of the film frames are stored.

In the step S3206 of the FIG. 49 flow chart, a decision is taken as to whether a search switch is on or off, and if this search switch is off then the flow of control continues to the next step S3207, while if the search switch is on then the flow of control is transferred to the step S3208. In the step S3207, a decision is taken as to whether or not any other film displacement mode switch is on, and if so then the control flow of this routine for version (2) of the film displacement mode F is terminated, while if no other film displacement mode switch is on then the flow of control returns to the step S3206. In each of the steps S3208 through S3213, if a decision is taken that any one of the selection conditions for the film frames in relation to each of continuous shooting, series scene, sports mode, date and/or time, event, and focal distance is input or set, then the flow of control is transferred to the step S3214 of the FIG. 50 flow chart, while if a decision is taken that none of these selection conditions is input or set then the flow of control returns to the step S3206 of this FIG. 49 flow chart. In this step S3214 of the FIG. 50 flow chart, a decision is taken as to whether or not any film frames exist which satisfy the conditions of selection, and if no such film frames exist then the flow of control returns to the step S3208 of the previous FIG. 49 flow chart, while if such film frames exist then the flow of control proceeds to the step S3215, in which these film frames are taken as the selected film frames. In the next step S3216, the total number of selected film frames and a list of their frame numbers are displayed. Next, in the step S3217, the film F is displaced and the first film frame for display (the first searched film frame) from the set of selected film frames is brought to oppose the image area 12; and then in the subsequent step S3218 an image of this film frame is displayed. In the step S3219 the film frame image which is being displayed is stored in the information storage device 28, and in the next step S3220 a decision is taken as to whether or not the last film frame for display (the last searched film frame) from the set of selected film frames is currently positioned to oppose the image area 12, and if it is then the flow of control is transferred to the step S3222, while if the last film frame for display has not yet arrived at the image area 12 then the flow of control continues to the next step S3221, in which the film F is displaced and the next film frame for display (the next searched film frame) from the set of selected film frames is brought to oppose the image area 12; and then the flow of control is returned to the step S3218. And in the last step S3222 a message is displayed to the effect that the search has concluded, and the flow of control returns to the step S3206 of the FIG. 49 flow chart. In this manner, in the steps s3206 through S3221, the film frames (the selected film frames) which satisfy the conditions for selection are brought in order from the first searched film frame to the last searched film frame to oppose the image area 12, and images thereof are displayed.

Figures 51, 52:
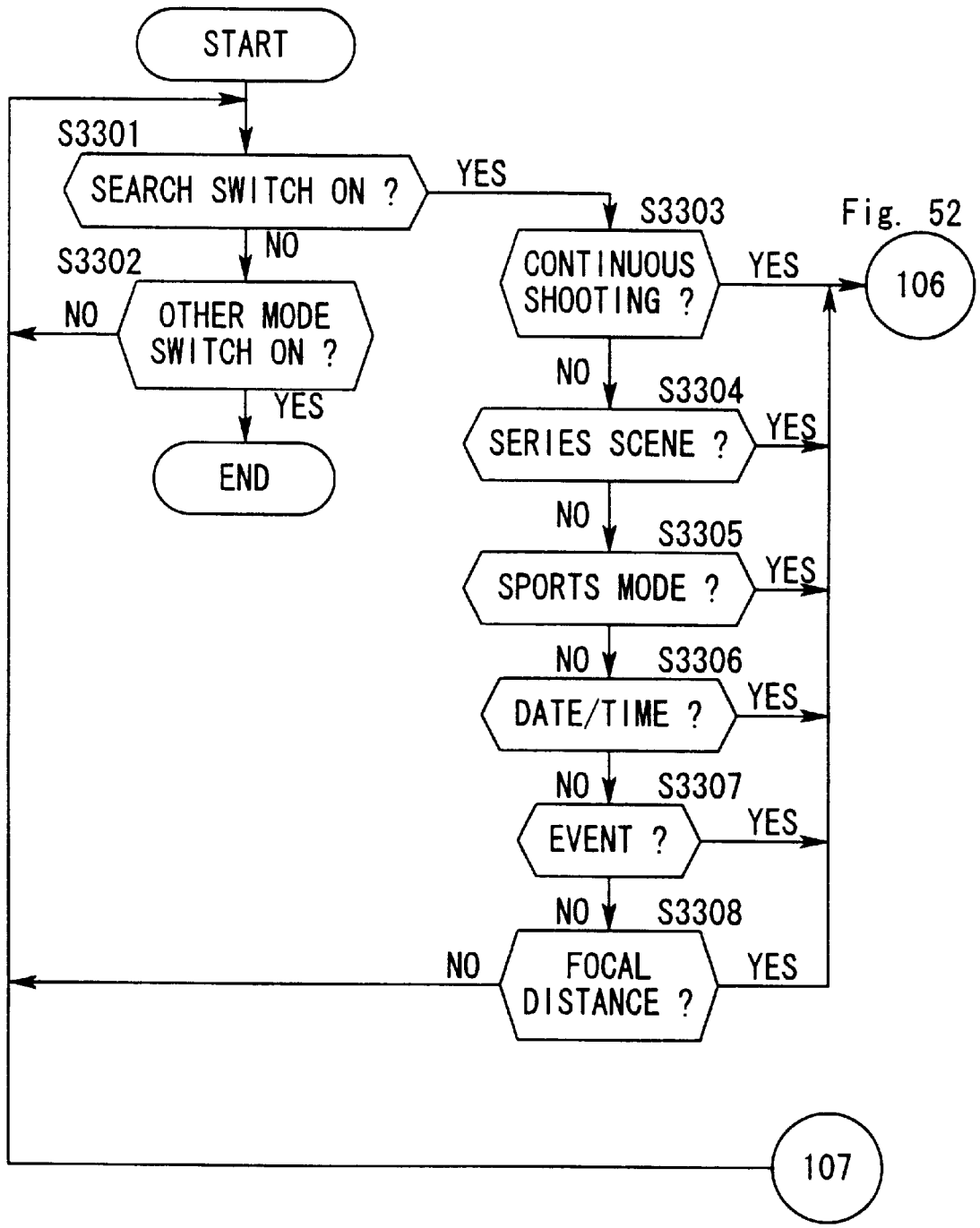
FIG. 51 is another flow chart showing another portion of the operational sequence of this preferred embodiment of the film image signal generation apparatus of the present invention.
FIG. 52 is another flow chart showing another portion of the operational sequence of this preferred embodiment of the film image signal generation apparatus of the present invention.
Figure 52:
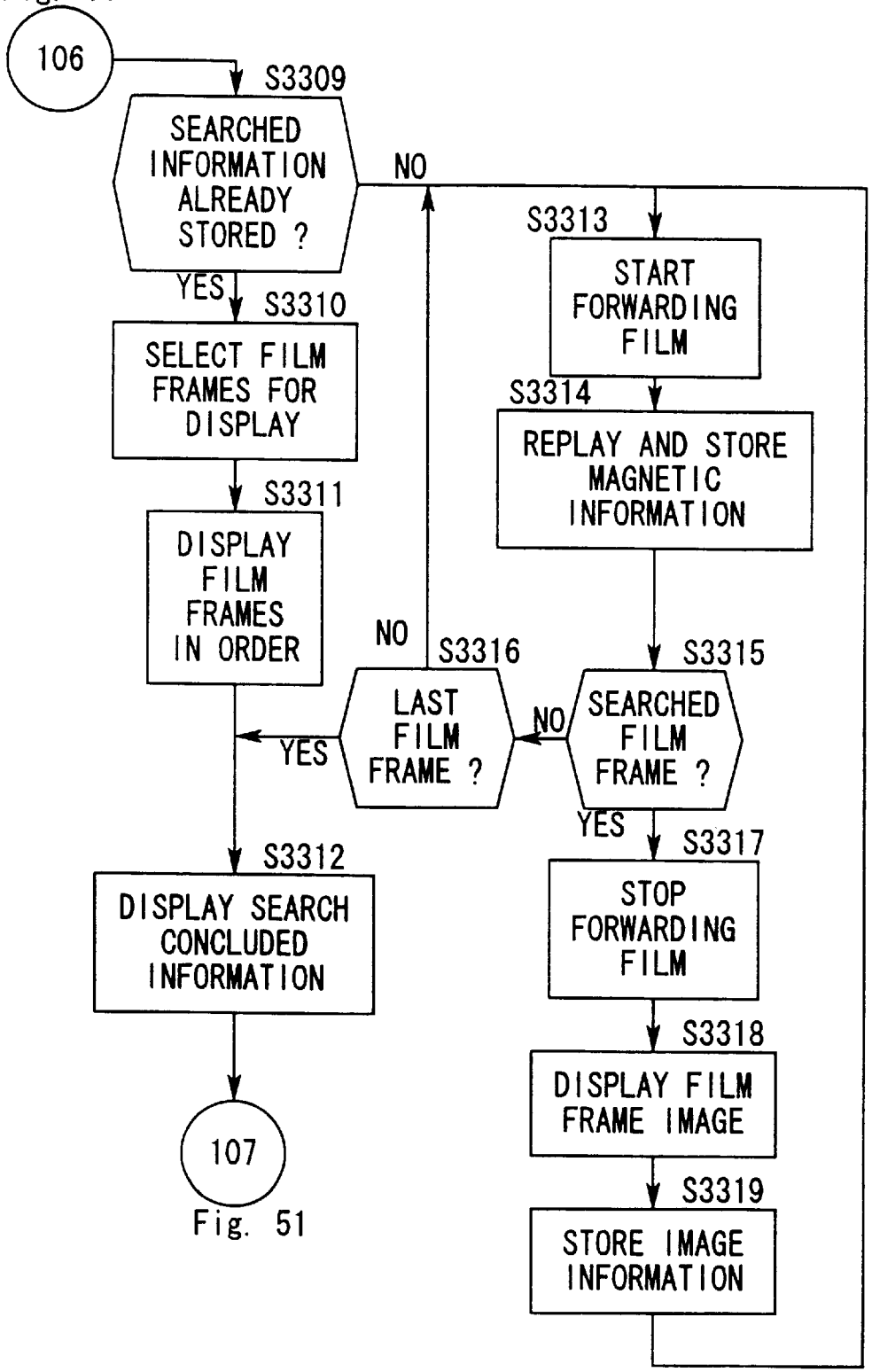

According to the sequence shown from the step S3301 to the step S3319 in FIGS. 51 and 52 (the above mentioned control sequence (3)), the following control is performed. In the step S3301 of the FIG. 51 flow chart, a decision is taken as to whether a search switch is on or off, and if this search switch is off then the flow of control continues to the next step S3302, while if the search switch is on then the flow of control is transferred to the step S3303. In the step S3302, a decision is taken as to whether or not any other film displacement mode switch is on, and if so then the control flow of this routine for version (3) of the film displacement mode F is terminated, while if no other film displacement mode switch is on then the flow of control returns to the step S3301. In each of the steps S3303 through S3308, if a decision is taken that any one of the selection conditions for the film frames in relation to each of continuous shooting, series scene, sports mode, date and/or time, event, and focal distance is set, then the flow of control is transferred to the step S3309 of the FIG. 52 flow chart, while if a decision is taken that none of these selection conditions is set then the flow of control returns to the step S3301. In the step S3309 of the FIG. 52 flow chart, a decision is taken as to whether or not the information for each film frame relating to continuous shooting and the like which is recorded in the magnetic recording layer has already been read out and stored, and as to whether or not images of these film frames have already been stored; and if so then the flow of control proceeds to the step S3310, while if not then the flow of control is transferred to the step S3313. In the step S3310, the film frames which are to be displayed (the selected film frames) are selected, and in the next step S3311 images of the selected film frames which are stored in the information storage device 28 are displayed in order. In the next step S3312 a message is displayed to the effect that the search has concluded, and the flow of control returns to the step S3301 of the FIG. 51 flow chart. On the other hand, in the step S3313 the forwarding of the film is started, and then in the next step S3314 the information in the magnetic recording layer of the film for the film frame which currently is opposing the image area 12 is read out. In the next step S3315 a decision is taken, based upon the information read in in the previous step S3314, as to whether or not this film frame which currently is opposing the image area 12 satisfies the conditions of selection, and if in fact this film frame is one which ought to be displayed (is one of the selected film frames) then the flow of control is transferred to the step S3317, while if this is not a selected film frame then the flow of control continues to the step S3316. In the step S3316, a decision is made as to whether or not this film frame which currently is opposing the image area 12 is the last film frame which should be displayed (the last searched film frame), and if it is the last searched film frame then the flow of control is transferred to the step S3312, while if it is not the last searched film frame then the flow of control returns to the step S3313. In the step S3317 the forwarding of the film F is stopped, and the flow of control proceeds to the step S3318. In this step S3318 an image of the film frame which currently is opposing the image area 12 is displayed, and next in the step S3319 this image is stored in the information storage device 28 and the flow of control returns to the step S3313. In this manner, in the sequence of the steps S3301 through S3319, after the film displacement mode F has been entered, the required information can be read in from the magnetic recording layer of the film (in the step S3314).

Although the film displacement mode F has been explained in terms of the above described three different sequences, it should not be considered as being particularly limited to these three sequences. For example, although with the above described preferred embodiment of the film image signal generation device of the present invention the film frame images were displayed in order at predetermined intervals (stepwise forwarding), the present invention should not be considered as being limited by the shown order of display, or by the shown timing. It would also be acceptable, as an alternative, for the operator to be enabled to designate the next film frame display. Further, although with the sequence described with reference to the steps S3101 through S3121 images of all of the film frames were stored, it would also be acceptable, as an alternative, only to display images for those of the film frames which already had been stored. In such a case, it would also be desirable to display a listing of those film frames which already had been stored.

What is claimed is:

1. A film image signal generation apparatus, comprising:
   a film displacement device which displaces a developed film, which is first in a film cartridge, to an image area;
   an image signal conversion device which converts an image of a film frame, which is opposed to said image area, into a first image signal;
   a control information storage circuit which stores control information which specifies at least an order for film frame display;
   a display information storage circuit which stores display information related to said film frame display as a second image signal, said display information being created in association with said control information and including character information for narration; and
   a control circuit which controls said film displacement device, said image signal conversion device, and said display information storage circuit so as selectively to output either said first image signal or said second image signal according to said control information stored in said control information storage circuit.

2. A film image signal generation apparatus according to claim 1, further comprising
   an information reading device which reads in information from said film or from said film cartridge, wherein
   said control information includes distinguishing information which is read in by said information reading device and which specifies said film cartridge which is loaded; and
   said control circuit, according to said control information which is related to a film cartridge which is specified by said distinguishing information, controls said film displacement device, said image signal conversion device, said control information storage circuit, and said display information storage circuit so as to output said display information which is related to the film cartridge which is specified by said distinguishing information as said second image signal.

3. A film image signal generation apparatus according to claim 1, wherein
   said control information storage circuit and/or said display information storage circuit uses a magnetic recording layer of said film or said film cartridge as a recording medium.

4. A film image signal generation apparatus according to claim 1, wherein
said control information storage circuit and/or said display information storage circuit includes a memory which is provided internally to said apparatus.

5. A film image signal generation apparatus according to claim 1, wherein
said control information storage circuit and/or said display information storage circuit includes a memory which is provided externally to said apparatus.

6. A film image signal generation apparatus according to claim 1, wherein
said control information storage circuit and/or said display information storage circuit includes a memory card as a recording medium.

7. A film image signal generation apparatus according to claim 1, wherein
said control information storage circuit and/or said display information storage circuit includes a floppy disk as a recording medium.

8. A film image signal generation apparatus according to claim 1, wherein
said display information includes character information which is associated with each film frame.

9. A film image signal generation apparatus according to claim 1, wherein
said control information includes information which specifies a display order for images of film frames and said display information.

10. A film image signal generation apparatus according to claim 1, wherein
said control information includes information which specifies display time periods for images of film frames and for said display information.

11. A film image signal generation apparatus according to claim 1, wherein
said control information and said display information compose a story employing images of film frames.

12. A film image signal generation apparatus, comprising:
a film displacement device which displaces a developed film, which is first in a film cartridge, to an image area;
an image signal conversion device which converts an image of a film frame, which is opposed to said image area, into a first image signal;
an input device which inputs control information which specifies at least an order for film frame display, and inputs display information related to said film frame display;
a control information storage circuit which stores said control information;
a display information storage circuit which stores said display information as a second image signal, said display information being created in association with said control information and including character information for narration; and
a control circuit which controls said film displacement device and said image signal conversion device so as to output at least said first image signal in association with inputting operation by said input device.

13. A film image signal generation apparatus according to claim 12, wherein
said control information and said display information compose a story employing images of film frames.

14. A film image signal generation apparatus, comprising:
an image signal conversion device which converts an image of a still picture frame, which is recorded upon a recording medium, into a first image signal;
an input device which, in order to compose a story employing images of said still picture frames, inputs information which includes control information which specifies at least an order for frame display and includes display information related to said frame display, said display information being created in association with said control information as a second image signal and including character information for narration;
an information storage circuit which stores said information; and
a control circuit which controls said image signal conversion device so as to output at least said first image signal in association with inputting operation by said input device.

15. A film image signal generation apparatus according to claim 14, wherein
said information includes a story distinguishing sign which specifies said story.

16. A film image signal generation apparatus according to claim 14, wherein
a recording medium distinguishing sign which specifies said recording medium is used as said story distinguishing sign.

17. A film image signal generation apparatus according to claim 14, wherein
said recording medium is a developed film.

18. A film image signal generation apparatus according to claim 14, wherein
said recording medium is a film which comprises a region which records said images optically, and a magnetic recording region which records various items of information.

19. A film image signal generation apparatus according to claim 14, wherein
said information storage circuit uses said recording medium.

20. A film image signal generation apparatus according to claim 14, further comprising
an image storage circuit which stores said first image signal, wherein
said control circuit controls said image storage circuit so as to read out said first image signal from said image storage circuit and then output said first image signal.

21. A film image signal generation apparatus, comprising:
an image signal conversion device which converts an image of a still picture frame which is recorded upon a recording medium into a first image signal;
an information storage circuit which, in order to replay a story employing images of said still picture frames, stores information comprising control information which specifies at least an order for frame display, and display information related to said frame display, said display information being created in association with said control information and including character information for narration; and
a control circuit which, according to said control information which is stored by said information storage circuit, controls said image signal conversion device and said information storage circuit so as selectively to output either said first image signal or a second image signal based upon said display information.

22. A film image signal generation apparatus according to claim 21, wherein:

said information includes a story distinguishing sign which specifies said story; and said control circuit controls said information storage circuit so as to read out from said information storage circuit said information related to a story to be replayed which is specified by said story distinguishing sign.

23. A film image signal generation apparatus according to claim 21, wherein a recording medium distinguishing sign which specifies said recording medium is used as said story distinguishing sign.

24. A film image signal generation apparatus according to claim 21, wherein said recording medium is a developed film.

25. A film image signal generation apparatus according to claim 21, wherein said recording medium is a film which comprises a region which records said images optically, and a magnetic recording region which records various items of information.

26. A film image signal generation apparatus according to claim 21, wherein said information storage circuit uses said recording medium.

27. A film image signal generation apparatus according to claim 21, further comprising an image storage circuit which stores said first image signal, wherein said control circuit controls said image storage circuit and said information storage circuit so as selectively to output either said first image signal which is read out from said image storage circuit or said second image signal based upon said display information, according to said control information which is stored by said information storage circuit.

* * * * *